US008997458B2

(12) United States Patent
Yoshioka

(10) Patent No.: US 8,997,458 B2
(45) Date of Patent: Apr. 7, 2015

(54) AIR/FUEL RATIO CONTROL DEVICE FOR INTERNAL-COMBUSTION ENGINE

(75) Inventor: Mamoru Yoshioka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 258 days.

(21) Appl. No.: 13/503,536

(22) PCT Filed: Oct. 23, 2009

(86) PCT No.: PCT/JP2009/068637
§ 371 (c)(1),
(2), (4) Date: May 23, 2012

(87) PCT Pub. No.: WO2011/048707
PCT Pub. Date: Apr. 28, 2011

(65) Prior Publication Data
US 2012/0227385 A1 Sep. 13, 2012

(51) Int. Cl.
*F01N 3/00* (2006.01)
*F02D 41/14* (2006.01)
*F02D 41/02* (2006.01)

(52) U.S. Cl.
CPC ........ *F02D 41/1475* (2013.01); *F02D 41/0235* (2013.01); *F02D 2041/0265* (2013.01); *F02D 2200/0802* (2013.01); *Y02T 10/22* (2013.01)

(58) Field of Classification Search
USPC .......................................................... 60/285
See application file for complete search history.

(56) References Cited

U.S. PATENT DOCUMENTS

| 5,678,402 A * | 10/1997 | Kitagawa et al. ............... 60/276 |
| 2009/0301437 A1 | 12/2009 | Mizoguchi et al. |
| 2010/0307135 A1 | 12/2010 | Miyamoto et al. |

FOREIGN PATENT DOCUMENTS

| JP | A-09-126015 | 5/1997 |
| JP | A-10-238338 | 9/1998 |
| JP | A-2001-152913 | 6/2001 |
| JP | A-2007-56755 | 3/2007 |
| JP | A-2007-211598 | 8/2007 |
| JP | A-2007-332867 | 12/2007 |
| JP | A-2008-025488 | 2/2008 |

(Continued)

OTHER PUBLICATIONS

International Preliminary Report on Patentability issued in International Application No. PCT/JP2009/068637 dated Nov. 30, 2011 (with translation).

(Continued)

*Primary Examiner* — Jason Shanske
(74) *Attorney, Agent, or Firm* — Oliff PLC

(57) ABSTRACT

An internal-combustion engine of the invention includes a catalyst which has an oxidizing ability and is provided in an exhaust passage, wherein an air/fuel ratio of an air/fuel mixture is controlled so that the air/fuel ratio leaner than a theoretical air/fuel ratio and the air/fuel ratio richer than the theoretical air/fuel ratio are alternated with a predetermined amplitude with respect to a target air/fuel ratio. On the assumption that the temperature of the catalyst is referred to as a catalyst temperature, an amplitude set according to the catalyst temperature is adopted as the predetermined amplitude, and the amplitude set when the catalyst temperature is higher than a predetermined temperature is smaller than the amplitude set when the catalyst temperature is lower than the predetermined temperature.

8 Claims, 22 Drawing Sheets

(56) References Cited

FOREIGN PATENT DOCUMENTS

| | | |
|---|---|---|
| JP | A-2009-167987 | 7/2009 |
| JP | A-2009-203940 | 9/2009 |

OTHER PUBLICATIONS

International Search Report issued in International Application No. PCT/JP2009/068637 dated Nov. 24, 2009.

* cited by examiner

AIR/FUEL RATIO CONTROL DEVICE FOR INTERNAL-COMBUSTION ENGINE

BACKGROUND OF THE INVENTION

1. Technical Field

The present invention relates to an air/fuel ratio control device for an internal-combustion engine.

2. Background Art

Japanese Patent Application Laid-Open No. H09-126015 discloses an air/fuel ratio control device for an internal-combustion engine. In the air/fuel ratio control device, the amount of fuel which is injected from a fuel injection valve is increased when the state of the internal-combustion engine is in a high load region, which decreases the temperature of an exhaust gas discharged from a combustion chamber and suppresses thermal degradation in the catalyst disposed in an exhaust passage. In this way, in the internal-combustion engine in which the catalyst is disposed in the exhaust passage, there has been a demand for suppressing thermal degradation in the catalyst.

Incidentally, in the field of the internal-combustion engine, there is a known three-way catalyst capable of simultaneously purifying nitrogen oxide (hereinafter, this will be indicated by 'NOx'), carbon monoxide (hereinafter, this will be indicated by 'CO'), and hydrocarbon (hereinafter, this will be indicated by 'HC') which are contained in an exhaust gas at a high purification rate when the air/fuel ratio of the exhaust gas flowing into the catalyst is a theoretical air/fuel ratio. Then, as the three-way catalyst, there is also a known three-way catalyst which has an oxygen absorbing and discharging ability in which oxygen in the exhaust gas is absorbed to the catalyst when the air/fuel ratio of the exhaust gas flowing into the catalyst is leaner than the theoretical air/fuel ratio and oxygen absorbed to the catalyst is discharged therefrom when the air/fuel ratio of the exhaust gas flowing into the catalyst is richer than the theoretical air/fuel ratio.

Furthermore, as the internal-combustion engine in which the three-way catalyst is provided in the exhaust passage, there is also a known internal-combustion engine having a following configuration. When the air/fuel ratio of an air/fuel mixture formed in a combustion chamber (hereinafter, the air/fuel mixture formed in the combustion chamber will be simply referred to as an 'air/fuel mixture') is richer than the theoretical air/fuel ratio as the target air/fuel ratio, the air/fuel ratio of the air/fuel mixture is controlled so that the air/fuel ratio of the air/fuel mixture becomes leaner than the theoretical air/fuel ratio. On the other hand, when the air/fuel ratio of the air/fuel mixture is leaner than the theoretical air/fuel ratio, the air/fuel ratio of the air/fuel mixture is controlled so that the air/fuel ratio of the air/fuel mixture becomes richer than the theoretical air/fuel ratio. That is, in the internal-combustion engine, the air/fuel mixture with the air/fuel ratio leaner than the theoretical air/fuel ratio and the air/fuel mixture with the air/fuel ratio richer than the theoretical air/fuel ratio are alternately formed in the combustion chamber, whereby the entire air/fuel ratio of the air/fuel mixture is controlled to be the theoretical air/fuel ratio, and the exhaust gas with the air/fuel mixture leaner than the theoretical air/fuel ratio and the exhaust gas with the air/fuel ratio richer than the theoretical air/fuel ratio alternately flow into the three-way catalyst. In the internal-combustion engine, such air/fuel ratio control is executed so that the air/fuel ratio of the air/fuel mixture is controlled to be the theoretical air/fuel ratio as the target air/fuel ratio and the purification performance of the three-way catalyst is improved by exhibiting the oxygen absorbing and discharging ability of the three-way catalyst.

Further, there is also a known internal-combustion engine in which the three-way catalyst is provided in an exhaust passage and which has the following configuration. In an oxygen discharged state where the entire oxygen has been discharged from the three-way catalyst, the air/fuel ratio of the air/fuel mixture is controlled so that the air/fuel ratio of the air/fuel mixture becomes leaner than the theoretical air/fuel ratio. On the other hand, in an oxygen absorbed state where the three-way catalyst has absorbed a sufficient amount of oxygen, the air/fuel ratio of the air/fuel mixture is controlled so that the air/fuel ratio of the air/fuel mixture becomes richer than the theoretical air/fuel ratio. That is, in the internal-combustion engine, the air/fuel mixture with the air/fuel ratio leaner than the theoretical air/fuel ratio and the air/fuel mixture with the air/fuel ratio richer than the theoretical air/fuel ratio are alternately formed in the combustion chamber, and the exhaust gas with the air/fuel ratio leaner than the theoretical air/fuel ratio and the exhaust gas with the air/fuel ratio richer than the theoretical air/fuel ratio alternately flow into the three-way catalyst. In the internal-combustion engine, such air/fuel ratio control is executed in order to improve the purification performance of the three-way catalyst by exhibiting the oxygen absorbing and discharging ability of the three-way catalyst.

SUMMARY OF THE INVENTION

Incidentally, in the above-described internal-combustion engine, that is, the internal-combustion engine in which the exhaust gas with the air/fuel ratio leaner than the theoretical air/fuel ratio and the exhaust gas with the air/fuel ratio richer than the theoretical air/fuel ratio alternately flow into the three-way catalyst, a comparatively large amount of hydrocarbon flows into the three-way catalyst when the air/fuel ratio of the exhaust gas which flows into the three-way catalyst is richer than the theoretical air/fuel ratio, and a comparatively large amount of oxygen flows into the three-way catalyst when the air/fuel ratio of the exhaust gas flowing into the three-way catalyst is leaner than the theoretical air/fuel ratio. Here, when a comparatively large amount of hydrocarbon flows into the three-way catalyst, part of hydrocarbon is accumulated in the three-way catalyst. Then, when a comparatively large amount of oxygen flows into the three-way catalyst, the hydrocarbon which is accumulated in the three-way catalyst is immediately burned, and hence the temperature of the three-way catalyst increases. Here, when an increase in the temperature of the three-way catalyst is very large, there is a possibility that thermal degradation in the three-way catalyst may occur.

Further, in the internal-combustion engine in which the air/fuel ratio richer than the theoretical air/fuel ratio or the air/fuel ratio leaner than the theoretical air/fuel ratio is set as the target air/fuel ratio, even when the air/fuel ratio of the air/fuel mixture is controlled to be the target air/fuel ratio in a manner such that the air/fuel mixture with the air/fuel ratio leaner than the target air/fuel ratio and the air/fuel ratio leaner than the theoretical air/fuel ratio and the air/fuel mixture with the air/fuel ratio richer than the target air/fuel ratio and the air/fuel ratio richer than the theoretical air/fuel ratio are alternately formed in a fuel chamber, the exhaust gas with the air/fuel ratio leaner than the theoretical air/fuel ratio and the exhaust gas with the air/fuel ratio richer than the theoretical air/fuel ratio alternately flow into the three-way catalyst. For this reason, there is a possibility that thermal degradation in the three-way catalyst may occur as in the above-described internal-combustion engine.

Further, in these internal-combustion engines, the exhaust gas with the air/fuel ratio leaner than the theoretical air/fuel ratio and the exhaust gas with the air/fuel ratio richer than the theoretical air/fuel ratio alternately flow into the three-way catalyst in order to exhibit the oxygen absorbing and discharging ability of the three-way catalyst. However, also in the internal-combustion engine in which the catalyst having the oxidizing ability is provided in the exhaust passage, when the exhaust gas with the air/fuel ratio leaner than the theoretical air/fuel ratio and the exhaust gas with the air/fuel ratio richer than the theoretical air/fuel ratio alternately flow into the catalyst for amother purpose, there is a possibility that thermal degradation in the catalyst may occur as in the above-described internal-combustion engine.

Therefore, it is an object of the invention to suppress thermal degradation in the catalyst in the internal-combustion engine which includes the catalyst having an oxidizing ability and provided in the exhaust passage, wherein the entire air/fuel ratio of the air/fuel mixture is controlled to be the target air/fuel ratio in a manner such that the air/fuel mixture with the air/fuel ratio leaner than the target air/fuel ratio and the air/fuel ratio leaner than the theoretical air/fuel ratio and the air/fuel mixture with the air/fuel ratio richer than the target air/fuel ratio and the air/fuel ratio richer than the theoretical air/fuel ratio are formed in the combustion chamber.

In view of the above-described object, in a first aspect, there is provided an air/fuel ratio control device for an internal-combustion engine including: a catalyst which has an oxidizing ability and is provided in an exhaust passage, wherein an air/fuel ratio of an air/fuel mixture is controlled so that the air/fuel ratio of the air/fuel mixture becomes leaner than a target air/fuel ratio by a predetermined degree and becomes leaner than a theoretical air/fuel ratio when the air/fuel ratio of the air/fuel mixture formed in a combustion chamber is richer than the target air/fuel ratio and the air/fuel ratio of the air/fuel mixture is controlled so that the air/fuel ratio of the air/fuel mixture becomes richer than the target air/fuel ratio by the predetermined degree and becomes richer than the theoretical air/fuel ratio when the air/fuel ratio of the air/fuel mixture is leaner than the target air/fuel ratio, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the target air/fuel ratio, and wherein on the assumption that the temperature of the catalyst is referred to as a catalyst temperature, an amplitude set according to the catalyst temperature is adopted as the predetermined amplitude, and an amplitude set when the catalyst temperature is higher than the predetermined temperature is smaller than an amplitude set when the catalyst temperature is lower than the predetermined temperature.

According to the first aspect, as the amplitude of the air/fuel ratio of the air/fuel mixture in which the air/fuel ratio of the air/fuel mixture alternately becomes leaner than the target air/fuel ratio or richer than the target air/fuel ratio with respect to the target air/fuel ratio, the amplitude set when the catalyst temperature is high is set to a value smaller than that of the amplitude set when the catalyst temperature is low. Accordingly, thermal degradation in the catalyst is suppressed. That is, the catalyst of the invention has an oxidizing ability. For this reason, when the amounts of oxygen and unburned fuel in the exhaust gas which flows into the catalyst are unchanged, the combustion amount of the unburned fuel in the catalyst becomes larger as the catalyst temperature becomes higher, and therefore the heat generation amount generated by the combustion of the unburned fuel in the catalyst becomes larger. In other words, if the amounts of oxygen and unburned fuel in the exhaust gas which flows into the catalyst are large when the catalyst temperature is high, the heat generation amount generated by the combustion of the unburned fuel in the catalyst is large, and hence there is a possibility that thermal degradation in the catalyst may occur. On the contrary, according to the invention, when the catalyst temperature is high, the amplitude of the air/fuel ratio of the air/fuel mixture is set to a value smaller than that of the amplitude of the air/fuel ratio of the air/fuel mixture when the catalyst temperature is low, and the amounts of oxygen and unburned fuel in the exhaust gas which flows into the catalyst decrease. As a result, thermal degradation in the catalyst is suppressed.

In a second aspect, there is provided an air/fuel ratio control device for an internal-combustion engine including: a catalyst which has an oxygen absorbing and discharging ability in which oxygen in an exhaust gas is absorbed to the catalyst when an air/fuel ratio of the exhaust gas flowing into the catalyst is leaner than a theoretical air/fuel ratio and oxygen absorbed to the catalyst is discharged therefrom when the air/fuel ratio of the exhaust gas flowing into the catalyst is richer than the theoretical air/fuel ratio, which has an oxidizing ability, and which is provided in an exhaust passage, wherein an air/fuel ratio of an air/fuel mixture is controlled so that the air/fuel ratio of the air/fuel mixture becomes leaner than a theoretical air/fuel ratio when the catalyst is in an oxygen discharged state where the amount of oxygen absorbed to the catalyst is smaller than a predetermined first oxygen amount and the air/fuel ratio of the air/fuel mixture is controlled to become richer than when the catalyst is in an oxygen absorbed state where the amount of oxygen absorbed to the catalyst is larger than a predetermined second oxygen amount, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the theoretical air/fuel ratio, and wherein on the assumption that the temperature of the catalyst is referred to as a catalyst temperature, an amplitude set according to the catalyst temperature is adopted as the predetermined amplitude, and an amplitude set when the catalyst temperature is higher than the predetermined temperature is smaller than an amplitude set when the catalyst temperature is lower than the predetermined temperature.

According to the second aspect, as the amplitude of the air/fuel ratio of the air/fuel mixture in which the air/fuel ratio of the air/fuel mixture alternately becomes leaner than the theoretical air/fuel ratio or richer than the theoretical air/fuel ratio with respect to the theoretical air/fuel ratio, the amplitude set when the catalyst temperature is high is set to a value smaller than that of the amplitude set when the catalyst temperature is low. Accordingly, thermal degradation in the catalyst is suppressed. That is, the catalyst of the invention has an oxidizing ability. For this reason, when the amounts of oxygen and unburned fuel in the exhaust gas which flows into the catalyst are unchanged, the combustion amount of the unburned fuel in the catalyst becomes larger as the catalyst temperature becomes higher, so that the heat generation amount generated by the combustion of the unburned fuel in the catalyst is large. In other words, if the amounts of oxygen and unburned fuel in the exhaust gas which flows into the catalyst are large when the catalyst temperature is high, the heat generation amount generated by the combustion of the unburned fuel in the catalyst becomes larger, and hence there is a possibility that thermal degradation in the catalyst may occur. On the contrary, according to the invention, when the catalyst temperature is high, the amplitude of the air/fuel ratio of the air/fuel mixture is set to a value smaller than that of the amplitude of the air/fuel ratio of the air/fuel mixture when the catalyst temperature is low, and the amounts of oxygen and unburned fuel in the exhaust gas which flows into the catalyst decrease. As a result, thermal degradation in the catalyst is suppressed.

In a third aspect, there is provided an air/fuel ratio control device for an internal-combustion engine including: a catalyst which has an oxidizing ability and is provided in an exhaust passage, wherein an air/fuel ratio of an air/fuel mixture is controlled so that the air/fuel ratio of the air/fuel mixture becomes leaner than a target air/fuel ratio by a predetermined degree and becomes leaner than a theoretical air/fuel ratio when the air/fuel ratio of the air/fuel mixture formed in a combustion chamber is richer than the target air/fuel ratio and the air/fuel ratio of the air/fuel mixture is controlled so that the air/fuel ratio of the air/fuel mixture becomes richer than the target air/fuel ratio by the predetermined degree and becomes richer than the theoretical air/fuel ratio when the air/fuel ratio of the air/fuel mixture is leaner than the target air/fuel ratio, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the target air/fuel ratio, and wherein on the assumption that the amount of air suctioned to the combustion chamber is referred to as an air intake amount and the temperature of the catalyst is referred to as a catalyst temperature, an amplitude set according to the air intake amount or the catalyst temperature is adopted as the predetermined amplitude, an amplitude set according to the air intake amount when the air intake amount is larger than a predetermined amount is smaller than an amplitude set according to the air intake amount when the air intake amount is smaller than the predetermined amount, an amplitude set according to the catalyst temperature when the catalyst temperature is higher than a predetermined temperature is smaller than an amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

According to the third aspect, as the amplitude of the air/fuel ratio of the air/fuel mixture when the air/fuel ratio of the air/fuel mixture alternately becomes leaner than the target air/fuel ratio or richer than the target air/fuel ratio with respect to the target air/fuel ratio, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the catalyst temperature is adopted. In other words, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the air intake amount is guarded by the amplitude of the air/fuel ratio of the air/fuel mixture set according to the catalyst temperature. Accordingly, thermal degradation in the catalyst is suppressed. That is, the catalyst of the invention has an oxidizing ability. For this reason, when the amounts of oxygen and unburned fuel of the exhaust gas which flows into the catalyst are unchanged, the combustion amount of the unburned fuel in the catalyst becomes larger as the temperature of the catalyst becomes higher, so that the heat generation amount generated by the combustion of the unburned fuel in the catalyst is large. In other words, if the amounts of oxygen and unburned fuel in the exhaust gas which flows into the catalyst are large when the temperature of the catalyst is high, the heat generation amount generated by the combustion of the unburned fuel in the catalyst becomes larger, and hence there is a possibility that thermal degradation in the catalyst may occur. On the contrary, according to the invention, when the amplitude of the air/fuel ratio of the air/fuel mixture set according to the air intake amount is larger than the amplitude of the air/fuel ratio of the air/fuel mixture set according to the catalyst temperature, that is, the amplitude of the air/fuel ratio of the air/fuel mixture set according to the catalyst temperature concerned with thermal degradation in the catalyst, the amplitude of the air/fuel ratio of the air/fuel mixture is guarded by the amplitude of the air/fuel ratio of the air/fuel mixture set according to the catalyst temperature, and the amounts of oxygen and unburned fuel in the exhaust gas which flows into the catalyst decreases. As a result, thermal degradation in the catalyst is suppressed.

In a fourth aspect, there is provided an air/fuel ratio control device for an internal-combustion engine including: a catalyst which has oxidizing ability and is provided in an exhaust passage, wherein an air/fuel ratio of an air/fuel mixture is controlled so that the air/fuel ratio of the air/fuel mixture becomes leaner than a target air/fuel ratio by a predetermined degree and becomes leaner than a theoretical air/fuel ratio when the air/fuel ratio of the air/fuel mixture formed in a combustion chamber is richer than the target air/fuel ratio and the air/fuel ratio of the air/fuel mixture is controlled so that the air/fuel ratio of the air/fuel mixture becomes richer than the target air/fuel ratio by the predetermined degree and becomes richer than the theoretical air/fuel ratio when the air/fuel ratio of the air/fuel mixture is leaner than the target air/fuel ratio, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the target air/fuel ratio, and wherein on the assumption that the amount of air suctioned to the combustion chamber is referred to as an air intake amount and the temperature of the catalyst is referred to as a catalyst temperature, an amplitude set according to the air intake amount or the catalyst temperature is adopted as the predetermined amplitude when the catalyst temperature is higher than a predetermined temperature, an amplitude set according to the air intake amount when the air intake amount is larger than the predetermined amount is smaller than an amplitude set according to the air intake amount when the air intake amount is smaller than the predetermined amount, an amplitude set according to the catalyst temperature when the catalyst temperature is higher than a predetermined temperature is smaller than an amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

According to the fourth aspect, as the amplitude of the air/fuel ratio of the air/fuel mixture when the air/fuel ratio of the air/fuel mixture alternately becomes leaner than the target air/fuel ratio or richer than the target air/fuel ratio with respect to the target air/fuel ratio, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the catalyst temperature is adopted. In other words, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the air intake amount is guarded by the amplitude of the air/fuel ratio of the air/fuel mixture set according to the catalyst temperature. Accordingly, thermal degradation in the catalyst is suppressed. That is, the catalyst of the invention has an oxidizing ability. For this reason, when the amounts of oxygen and unburned fuel of the exhaust gas which flows into the catalyst are unchanged, the combustion amount of the unburned fuel in the catalyst becomes larger as the temperature of the catalyst becomes higher, so that the heat generation amount generated by the combustion of the unburned fuel in the catalyst becomes larger. In other words, if the amounts of oxygen and unburned fuel in the exhaust gas which flows into the catalyst are large when the temperature of the catalyst is high, the heat generation amount generated by the combustion of the unburned fuel in the catalyst becomes larger, and hence there is a possibility that thermal degradation in the catalyst may occur. On the contrary, according to the invention, when the amplitude of the air/fuel ratio of the air/fuel mixture set according to the air intake amount is larger than the amplitude of the air/fuel ratio of the air/fuel mixture set according to the catalyst temperature, that is, the amplitude of the air/fuel ratio of the air/fuel mixture set according to the catalyst temperature concerned with thermal degradation in the catalyst, the amplitude of the air/fuel ratio of the air/fuel mixture is guarded by the amplitude of the air/fuel ratio of the air/fuel mixture set according to the catalyst temperature, and the amounts of oxygen and unburned fuel in the exhaust gas which flows into the catalyst decreases. As a result, thermal degradation in the catalyst is suppressed.

Further, according to the fourth aspect, it is determined whether the amplitude set according to the air intake amount is adopted as the amplitude for the actual air/fuel ratio control or the amplitude set according to the catalyst temperature is adopted as the amplitude for the actual air/fuel ratio control when the catalyst temperature is higher than a predetermined temperature, that is, there is an increasing possibility that thermal degradation in the catalyst may occur. For this reason, thermal degradation in the catalyst is further efficiently suppressed.

In a fifth aspect, there is provided an air/fuel ratio control device for an internal-combustion engine including: a catalyst which has an oxygen absorbing and discharging ability in which oxygen in an exhaust gas is absorbed to the catalyst when an air/fuel ratio of the exhaust gas flowing into the catalyst is leaner than a theoretical air/fuel ratio and oxygen absorbed to the catalyst is discharged therefrom when the air/fuel ratio of the exhaust gas flowing into the catalyst is richer than the theoretical air/fuel ratio, which has an oxidizing ability, and which is provided in an exhaust passage, wherein an air/fuel ratio of an air/fuel mixture is controlled so that the air/fuel ratio of the air/fuel mixture becomes leaner than a theoretical air/fuel ratio when the catalyst is in an oxygen discharged state where the amount of oxygen absorbed to the catalyst is smaller than a predetermined first oxygen amount and the air/fuel ratio of the air/fuel mixture is controlled to become richer than when the catalyst is in an oxygen absorbed state where the amount of oxygen absorbed to the catalyst is larger than a predetermined second oxygen amount, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the theoretical air/fuel ratio, and wherein on the assumption that the amount of air suctioned to the combustion chamber is referred to as an air intake amount and the temperature of the catalyst is referred to as a catalyst temperature, an amplitude set according to the air intake amount or the catalyst temperature is adopted as the predetermined amplitude, an amplitude set according to the air intake amount when the air intake amount is larger than a predetermined amount is smaller than an amplitude set according to the air intake amount when the air intake amount is smaller than the predetermined amount, an amplitude set according to the catalyst temperature when the catalyst temperature is higher than a predetermined temperature is smaller than an amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

According to the fifth aspect, as the amplitude of the air/fuel ratio of the air/fuel mixture when the air/fuel ratio of the air/fuel mixture alternately becomes leaner than the theoretical air/fuel ratio or becomes richer than the theoretical air/fuel ratio with respect to the theoretical air/fuel ratio, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the catalyst temperature is adopted. In other words, when the amplitude of the air/fuel ratio of the Air/fuel mixture set according to the air intake amount is larger than the amplitude of the air/fuel ratio of the air/fuel mixture set according to the catalyst temperature, the amplitude of the air/fuel ratio of the air/fuel mixture set according to the air intake amount is guarded by the amplitude of the air/fuel ratio of the air/fuel mixture set according to the catalyst temperature. Accordingly, thermal degradation in the catalyst is suppressed. That is, the catalyst of the invention has an oxidizing ability. For this reason, when the amounts of oxygen and unburned fuel in the exhaust gas which flows into the catalyst are unchanged, the combustion amount of the unburned fuel in the catalyst becomes larger as the temperature of the catalyst becomes higher, so that the heat generation amount generated by the combustion of the unburned fuel in the catalyst becomes larger. In other words, if the amounts of oxygen and unburned fuel in the exhaust gas which flows into the catalyst are large when the temperature of the catalyst is high, the heat generation amount generated by the combustion of the unburned fuel in the catalyst becomes larger, and hence there is a possibility that thermal degradation in the catalyst may occur. On the contrary, according to the invention, when the amplitude of the air/fuel ratio of the air/fuel mixture set according to the air intake amount is larger than the amplitude of the air/fuel ratio of the air/fuel mixture set according to the catalyst temperature, that is, the amplitude of the air/fuel ratio of the air/fuel mixture set according to the catalyst temperature concerned with thermal degradation in the catalyst, the amplitude of the air/fuel ratio of the air/fuel mixture is guarded by the amplitude of the air/fuel ratio of the air/fuel mixture set according to the catalyst temperature, and the amounts of oxygen and unburned fuel in the exhaust gas which flows into the catalyst decrease. As a result, thermal degradation in the catalyst is suppressed.

In a sixth aspect, there is provided an air/fuel ratio control device for an internal-combustion engine including; a catalyst which has an oxygen absorbing and discharging ability in which oxygen in an exhaust gas is absorbed to the catalyst when an air/fuel ratio of the exhaust gas flowing into the catalyst is leaner than a theoretical air/fuel ratio and oxygen absorbed to the catalyst is discharged therefrom when the air/fuel ratio of the exhaust gas flowing into the catalyst is richer than the theoretical air/fuel ratio, which has an oxidizing ability, and which is provided in an exhaust passage, wherein an air/fuel ratio of an air/fuel mixture is controlled so that the air/fuel ratio of the air/fuel mixture becomes leaner than a theoretical air/fuel ratio when the catalyst is in an oxygen discharged state where the amount of oxygen absorbed to the catalyst is smaller than a predetermined first oxygen amount and the air/fuel ratio of the air/fuel mixture is controlled to become richer than when the catalyst is in an oxygen absorbed state where the amount of oxygen absorbed to the catalyst is larger than a predetermined second oxygen amount, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the theoretical air/fuel ratio, and wherein on the assumption that the amount of air suctioned to the combustion chamber is referred to as an air intake amount and the temperature of the catalyst is referred to as a catalyst temperature, an amplitude set according to the air intake amount or the catalyst temperature is adopted as the predetermined amplitude when the catalyst temperature is higher than a predetermined temperature, an amplitude set according to the air intake amount when the air intake amount is larger than the predetermined amount is smaller than an amplitude set according to the air intake amount when the air intake amount is smaller than the predetermined amount, an amplitude set according to the catalyst temperature when the catalyst temperature is higher than a predetermined temperature is smaller than an amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

According to the sixth aspect, as the amplitude of the air/fuel ratio of the air/fuel mixture when the air/fuel ratio of the air/fuel mixture alternately becomes leaner than the theoretical air/fuel ratio or becomes richer than the theoretical air/fuel ratio with respect to the theoretical air/fuel ratio, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the catalyst temperature is adopted. In other words, when the amplitude of the air/fuel ratio of the air/fuel mixture set according to the air intake amount is larger than the amplitude of the air/fuel ratio of the air/fuel mixture set according to the catalyst temperature, the amplitude of the air/fuel ratio of the air/fuel mixture set according to the air intake amount is guarded by the amplitude of the air/fuel ratio of the air/fuel mixture set according to the catalyst temperature. Accordingly, thermal degradation in the catalyst is suppressed. That is, the catalyst of the invention has an oxidizing ability. For this reason, when the amounts of oxygen and unburned fuel in the exhaust gas which flows into the catalyst are unchanged, the combustion amount of the unburned fuel in the catalyst becomes larger as the temperature of the catalyst becomes higher, so that the heat generation amount generated by the combustion of the unburned fuel in the catalyst is large. In other words, if the amounts of oxygen and unburned fuel in the exhaust gas which flows into the catalyst are large when the temperature of the catalyst is high, the heat generation amount generated by the combustion of the unburned fuel in the catalyst becomes larger, and hence there is a possibility that thermal degradation in the catalyst may occur. On the contrary, according to the invention, when the amplitude of the air/fuel ratio of the air/fuel mixture set according to the air intake amount is larger than the amplitude of the air/fuel ratio of the air/fuel mixture set according to the catalyst temperature, that is, the amplitude of the air/fuel ratio of the air/fuel mixture set according to the catalyst temperature concerned with thermal degradation in the catalyst, the amplitude of the air/fuel ratio of the air/fuel mixture is guarded by the amplitude of the air/fuel ratio of the air/fuel mixture set according to the catalyst temperature, and the amounts of oxygen and unburned fuel in the exhaust gas which flows into the catalyst decrease. As a result, thermal degradation in the catalyst is suppressed.

Further, according to the sixth aspect, it is determined whether the amplitude set according to the air intake amount is adopted as the amplitude for the actual air/fuel ratio control or the amplitude set according to the catalyst temperature is adopted as the amplitude for the actual air/fuel ratio control when the catalyst temperature is higher than a predetermined temperature, that is, there is an increasing possibility that thermal degradation in the catalyst may occur. For this reason, thermal degradation in the catalyst is further efficiently suppressed.

In a seventh aspect according to any one of third to sixth aspects, the amplitude set according to the air intake amount becomes smaller as the air intake amount becomes larger.

According to the seventh aspect, the amplitude of the air/fuel ratio of the air/fuel mixture set according to the air intake amount is set to a value which becomes smaller as the air intake amount becomes larger. That is, the amplitude of the air/fuel ratio of the air/fuel mixture set according to the air intake amount is set according to the air intake amount. Accordingly, when the amplitude set according to the air intake amount is adopted as the amplitude for the actual air/fuel ratio control, thermal degradation in the catalyst is further reliably suppressed. That is, when the amplitudes of the air/fuel ratios of the air/fuel mixtures are equal to each other, the amount of oxygen in the exhaust gas which flows into the catalyst becomes larger as the air intake amount becomes larger. Then, when the amount of oxygen flowing into the catalyst is large, the combustion amount of the unburned fuel in the catalyst increases. As a result, the temperature of the catalyst increases, and hence there is an increasing possibility that thermal degradation in the catalyst may occur. Here, according to the invention, as the air intake amount is large and the amount of oxygen flowing into the catalyst increases, the amplitude of the air/fuel ratio of the air/fuel mixture is set to a small value, and the amount of oxygen flowing into the catalyst decreases. For this reason, when the amplitude set according to the air intake amount is adopted, thermal degradation in the catalyst is further reliably suppressed.

In an eighth aspect according to any one of first to seventh aspects, the amplitude set according to the catalyst temperature becomes smaller as the catalyst temperature becomes higher.

According to the eighth aspect, as the catalyst temperature increases, the air/fuel ratio of the air/fuel mixture set according to the catalyst temperature is set to a smaller value. That is, the amplitude of the air/fuel ratio of the air/fuel mixture set according to the catalyst temperature is set according to the catalyst temperature. Accordingly, when the amplitude set according to the catalyst temperature is adopted as the amplitude for the actual air/fuel ratio control, thermal degradation in the catalyst is further reliably suppressed. That is, when the amounts of oxygen and unburned fuel in the exhaust gas which flows into the catalyst are unchanged, the combustion amount of the unburned fuel in the catalyst becomes larger as the catalyst temperature becomes higher, so that the heat generation amount generated by the combustion of the unburned fuel in the catalyst becomes larger. In other words, if the amounts of oxygen and unburned fuel in the exhaust gas which flows into the catalyst are large when the catalyst temperature is high, the heat generation amount generated by the combustion of the unburned fuel in the catalyst becomes larger, and hence there is a possibility that thermal degradation in the catalyst may occur. On the contrary, according to the invention, as the catalyst temperature increases, the amplitude of the air/fuel ratio of the air/fuel mixture set according to the catalyst temperature is set to a smaller value, and the amounts of oxygen and unburned fuel in the exhaust gas which flows into the catalyst decrease. For this reason, when the amplitude set according to the catalyst temperature is adopted as the amplitude for the actual air/fuel ratio control, thermal degradation in the catalyst is further reliably suppressed.

In a ninth aspect according to any one of first to eighth aspects, the catalyst is a three-way catalyst which simultaneously purifies nitrogen oxide, carbon monoxide, and hydrocarbon at a predetermined purification rate when the air/fuel ratio of the exhaust gas flowing into the catalyst is an air/fuel ratio near the theoretical air/fuel ratio. Then, the three-way catalyst has an oxygen absorbing and discharging ability in which oxygen in the exhaust gas is absorbed to the catalyst when the air/fuel ratio of the exhaust gas flowing into the catalyst is leaner than the theoretical air/fuel ratio and oxygen absorbed to the catalyst is discharged therefrom when the air/fuel ratio of the exhaust gas flowing into the catalyst is richer than the theoretical air/fuel ratio.

In a tenth aspect according to any one of first to ninth aspects, the target air/fuel ratio is the theoretical air/fuel ratio.

DETAILED DESCRIPTION OF THE INVENTION

Figure 1:
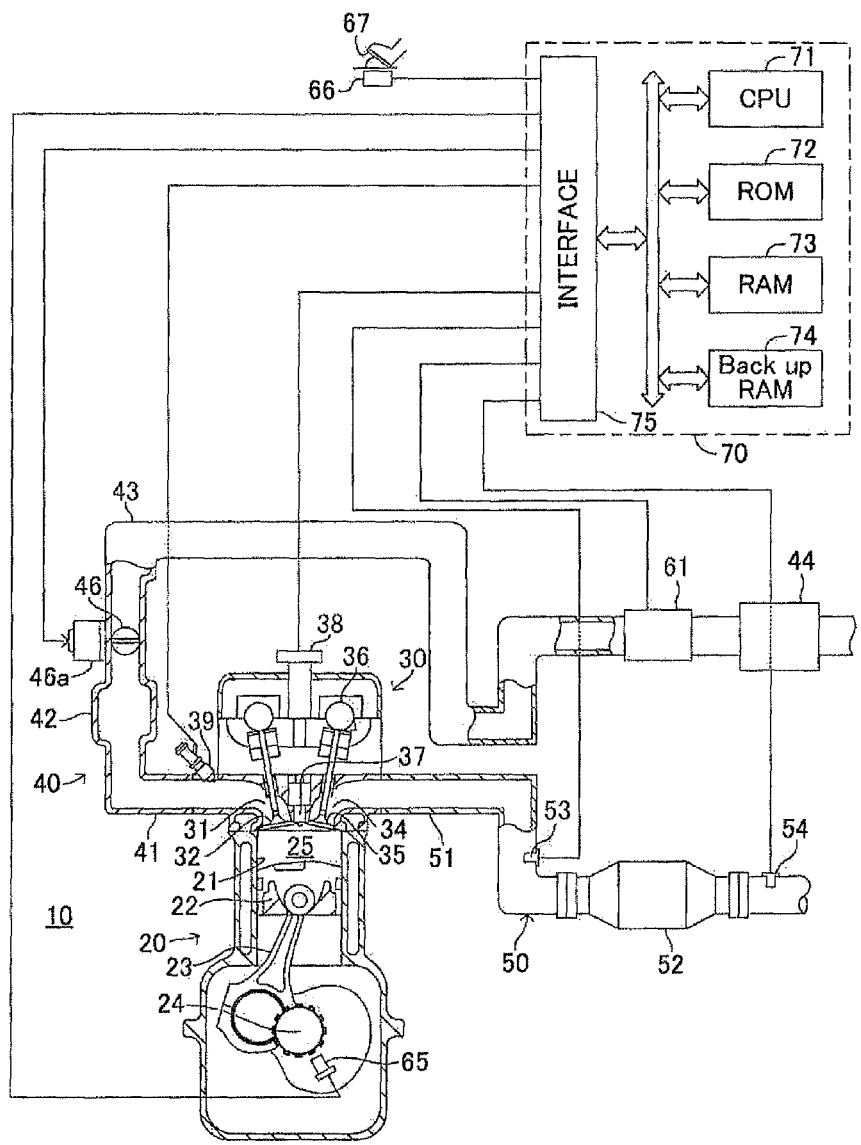
FIG. 1 is an entire diagram illustrating a spark ignited internal-combustion engine which adopts an air/fuel ratio control device of the invention.

Hereinafter, embodiments of an air/fuel ratio control device of the invention will be described by referring to the drawings. FIG. 1 illustrates a spark ignited internal-combustion engine which adopts an air/fuel ratio control device of the invention. An internal-combustion engine 10 includes: a cylinder block portion 20 which includes a cylinder block, a cylinder block lower casing, an oil pan, and the like; a cylinder head portion 30 which is fixed onto the cylinder block portion 20; an intake passage 40 which supplies an air/fuel mixture with fuel and air to the cylinder block portion 20; and an exhaust passage 50 through which an exhaust gas from the cylinder block portion 20 is discharged to the outside.

The cylinder block portion 20 includes a cylinder 21, a piston 22, a con rod 23, and a crank shaft 24. The piston 22 moves in a reciprocating manner inside the cylinder 21, and the reciprocating movement of the piston 22 is transmitted to the crank shaft 24 through the con rod 23, thereby rotating the crank shaft 24. Further, a combustion chamber 25 is formed by the inner wall surface of the cylinder 21, the upper wall surface of the piston 22, and the lower wall surface of the cylinder head portion 30.

The cylinder head portion 30 includes: an intake port 31 which communicates with the combustion chamber 25; an intake valve 32 which opens and closes the intake port 31; an exhaust port 34 which communicates with the combustion chamber 25; and an exhaust valve 25 which opens and closes the exhaust port 34. Furthermore, the cylinder head portion 30 includes: an ignition plug 37 which ignites fuel inside the combustion chamber 25; an igniter 38 which includes an ignition coil for applying a high voltage to the ignition plug 37; and a fuel injection valve 39 which injects fuel into the intake port 31.

The intake passage 40 includes: an intake branch pipe 41 which is connected to the intake port 31; a surge tank 42 which is connected to the intake branch pipe 41; and an intake duct 43 which is connected to the surge tank 42. Furthermore, the intake duct 43 is provided with an air filter 44, a throttle valve 46, and a throttle valve driving actuator 46a for driving the throttle valve 46 are arranged in this order from the upstream end of the intake duct 43 toward the downstream (that is, toward the surge tank 42). Further, the intake duct 43 is provided with an air flow meter 61 which detects the amount of air flowing inside the intake duct 43.

The throttle valve 46 is rotatably attached to the intake duct 43, and is driven by the throttle valve driving actuator 46a so that the opening degree thereof is adjusted.

Further, the exhaust passage 50 includes an exhaust pipe 51 which includes an exhaust branch pipe connected to the exhaust port 34 and a three-way catalyst 52 which is disposed in the exhaust pipe 51. An air/fuel ratio sensor 53 which detects the air/fuel ratio of the exhaust gas (hereinafter, the air/fuel ratio sensor will be referred to as an 'upstream air/fuel ratio sensor') is attached to the exhaust pipe 51 on the upstream of the three-way catalyst 52. On the other hand, an air/fuel ratio sensor 54 which detects the air/fuel ratio of the exhaust gas (hereinafter, the air/fuel ratio sensor will be referred to as a 'downstream air/fuel ratio sensor') is also attached to the exhaust pipe 51 on the downstream of the three-way catalyst 52.

Figure 2:
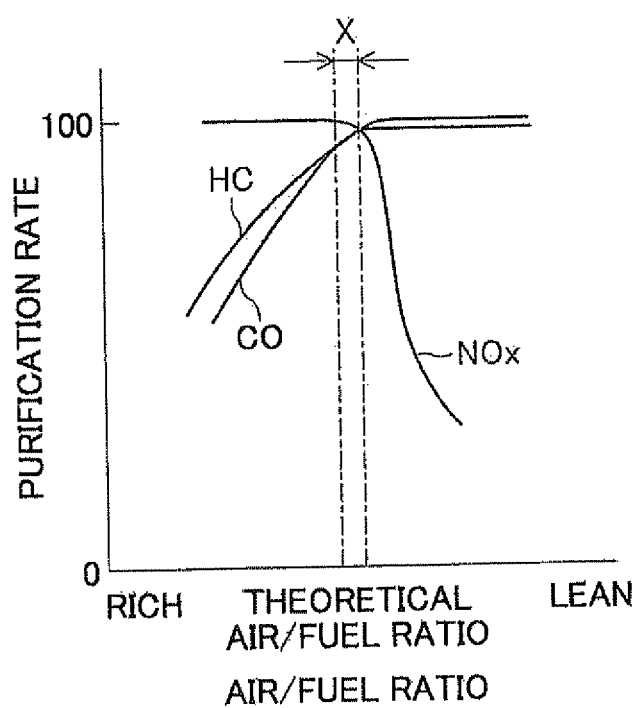
FIG. 2 is a diagram illustrating purification characteristics of a three-way catalyst.

As illustrated in FIG. 2, when the temperature of the three-way catalyst 52 is higher than a certain temperature (that is, an activating temperature) and the air/fuel ratio of the exhaust gas flowing thereinto is within a region X near the theoretical air/fuel ratio, the three-way catalyst 52 may simultaneously purify nitrogen oxide (NOx), carbon monoxide (indicated by CO), and hydrocarbon (HC) contained in the exhaust gas at a high purification rate. On the other hand, the three-way catalyst 52 has an oxygen absorbing and discharging ability in which the three-way catalyst 52 absorbs oxygen in the exhaust gas when the air/fuel ratio of the exhaust gas which flows into the three-way catalyst 52 is leaner than the theoretical air/fuel ratio and the three-way catalyst 52 discharges oxygen absorbed thereto when the air/fuel ratio of the exhaust gas flowing thereinto is richer than the theoretical air/fuel ratio. Accordingly, even when the air/fuel ratio of the exhaust gas which flows into the three-way catalyst 52 is leaner than the theoretical air/fuel ratio or richer than the theoretical air/fuel ratio as long as the oxygen absorbing and discharging ability is normal, the atmosphere inside the three-way catalyst 52 is substantially maintained around the theoretical air/fuel ratio, and hence NOx, CO, and HC contained in the exhaust gas are simultaneously purified at a high purification rate in the three-way catalyst 52.

Further, the internal-combustion engine 10 includes: a crank position sensor 65 which detects the phase angle of the crank shaft 24; an accelerator opening degree sensor 66 which detects the stepping amount of an accelerator pedal 67; and an electric control unit (ECU) 70. The crank position sensor 65 generates a pulse signal with a narrow width whenever the crank shaft 24 rotates by 10° and generates a pulse signal with a wide width whenever the crank shaft 24 rotates by 360°. The number of rotations of the engine (the number of rotations of the internal-combustion engine) may be calculated based on the pulse signal which is generated by the crank position sensor 65.

The electric control unit (ECU) 70 is configured as a microcomputer, and includes a microprocessor (CPU) 71 which is connected via a bidirectional bus, a Read Only Memory (ROM) 72, a Random Access Memory (RAM) 73, a back-up RAM 54, and an interface 75 with an AD converter. The interface 75 is connected to the igniter 38, the fuel injection valve 39, the throttle valve driving actuator 46a, the upstream air/fuel ratio sensor 53, the downstream air/fuel ratio sensor 54, and the air flow meter 61.

Furthermore, the opening degree of the throttle valve 46 is basically controlled in response to the stepping amount of the accelerator pedal 67 detected by the accelerator opening degree sensor 66. That is, the throttle valve driving actuator 46a may be operated so that the opening degree of the throttle valve 46 becomes larger as the stepping amount of the accelerator pedal 67 becomes larger, that is, the amount of air suctioned to the combustion chamber 25 through the throttle valve 46 (hereinafter, the amount of air will be referred to as an 'air intake amount') becomes larger. The throttle valve driving actuator 46a may be operated so that the opening degree of the throttle valve 46 becomes smaller as the stepping amount of the accelerator pedal 67 becomes smaller, that is, the air intake amount becomes smaller.

Incidentally, as described above, the three-way catalyst 52 may simultaneously purify NOx, CO, and HC at a high purification rate when the air/fuel ratio of the exhaust gas which flows thereinto is near the theoretical air/fuel ratio. Accordingly, from the viewpoint that the high purification rate in the three-way catalyst is ensured, it is desirable that the air/fuel ratio of the air/fuel mixture formed in the combustion chamber 25 be controlled to be the theoretical air/fuel ratio. Therefore, in the embodiment (hereinafter, referred to as a 'first embodiment'), when the running state of the internal-combustion engine (hereinafter, this will be referred to as an 'engine running state') is in a normal state, stoichiometric control is executed as below so that the air/fuel ratio of the air/fuel mixture is controlled to be the theoretical air/fuel ratio.

That is, in the normal stoichiometric control of the first embodiment, the amount of air which is suctioned to the combustion chamber 25, that is, the air intake amount is calculated. Here, the air intake amount basically matches the amount of air flowing inside the intake duct 43 detected by the air flow meter 61. However, air which passes through the air flow meter 61 flows inside the air passage 40 of a given length until the air is actually suctioned to the combustion chamber 25. For this reason, the amount of air detected by the air flow meter 61 may not match the air intake amount. Therefore, in the first embodiment, in consideration of this, a coefficient which allows the amount of air detected by the air flow meter 61 to match the air intake amount (hereinafter, the coefficient will be referred to as an 'air intake amount calculating coefficient') is separately calculated, and the air intake amount calculating coefficient is multiplied by the amount of air detected by the air flow meter 61, thereby calculating the air intake amount.

Furthermore, on the assumption that the air intake amount calculating coefficient is indicated by 'KG', the amount of air detected by the air flow meter 61 is indicated by 'GA', the target fuel injection amount is indicated by 'TQ', and the air/fuel ratio detected by the air/fuel ratio sensor 53 is indicated by 'A/F', the air intake amount calculating coefficient KG is a coefficient which is sequentially calculated by the following equation 1 and is stored as a learned value in the ECU 70.

$$KG=(GA/TQ)/A/F \qquad (1)$$

Subsequently, in order to control the air/fuel ratio of the air/fuel mixture at the theoretical air/fuel ratio based on the air intake amount calculated as described above, the amount of fuel to be injected from the fuel injection valve 39 (hereinafter, the amount of fuel to be injected from the fuel injection valve will be referred to as a 'fuel injection amount') is calculated as a standard fuel injection amount, basically the calculated standard fuel injection amount is set as a target fuel injection amount, and the operation of the fuel injection valve 39 is controlled so that fuel of the set target fuel injection amount is injected from the fuel injection valve 39.

Then, during the stoichiometric control, an air/fuel ratio which is detected by the upstream air/fuel ratio sensor 53 (hereinafter, the air/fuel ratio will be referred to as a 'detected air/fuel ratio') is compared with the target air/fuel ratio, that is, the theoretical air/fuel ratio. When the detected air/fuel ratio is richer than the theoretical air/fuel ratio, that is, the air/fuel ratio of the air/fuel mixture is richer than the theoretical air/fuel ratio, the amount of fuel injected from the fuel injection valve 39 (hereinafter, the amount of fuel injected from the fuel injection valve will be referred to as a 'fuel injection amount') decreases so that the air/fuel ratio of the air/fuel mixture becomes leaner than the theoretical air/fuel ratio. On the other hand, when the detected air/fuel ratio is leaner than the theoretical air/fuel ratio, that is, the air/fuel ratio of the air/fuel mixture is leaner than the theoretical air/fuel ratio, the fuel injection amount increases so that the air/fuel ratio of the air/fuel mixture becomes richer than the theoretical air/fuel ratio. Thus, according to the stoichiometric control of the first embodiment, the air/fuel mixture with the air/fuel ratio which is leaner than the theoretical air/fuel ratio and the air/fuel mixture with the air/fuel ratio which is richer than the theoretical air/fuel ratio are alternately formed in the combustion chamber 25, so that the entire air/fuel ratio of the air/fuel mixture is controlled to be the theoretical air/fuel ratio.

Further, in this way, when the air/fuel mixture which is leaner than the theoretical air/fuel ratio and the air/fuel ratio which is richer than the theoretical air/fuel ratio are alternately formed in the combustion chamber 25, the exhaust gas which is leaner than the theoretical air/fuel ratio and the exhaust gas which is richer than the theoretical air/fuel ratio alternately flow into the three-way catalyst 52. Accordingly, the absorption of oxygen to the three-way catalyst and the discharge of oxygen from the three-way catalyst are normally executed, and the air/fuel ratio inside the three-way catalyst is maintained around the theoretical air/fuel ratio regardless of the air/fuel ratio of the exhaust gas which flows into the three-way catalyst. For this reason, the high purification performance of the three-way catalyst is maintained.

Incidentally, as described above, the three-way catalyst 52 has an oxygen absorbing and discharging ability. Then, when the air/fuel ratio of the exhaust gas which flows into the three-way catalyst is richer than the theoretical air/fuel ratio, the oxygen which is absorbed to the three-way catalyst is discharged, so that the air/fuel ratio of the exhaust gas inside the three-way catalyst becomes the theoretical air/fuel ratio. On the other hand, when the air/fuel ratio of the exhaust gas which flows into the three-way catalyst is leaner than the theoretical air/fuel ratio, the three-way catalyst absorbs oxygen in the exhaust gas, so that the air/fuel ratio of the exhaust gas inside the three-way catalyst becomes the theoretical air/fuel ratio. In this way, when the three-way catalyst discharges oxygen or absorbs oxygen in response to the air/fuel ratio of the exhaust gas flowing thereinto, the air/fuel ratio of the exhaust gas inside the three-way catalyst is maintained at the theoretical air/fuel ratio. In other words, when the air/fuel ratio of the exhaust gas which flows into the three-way catalyst is richer than the theoretical air/fuel ratio, the three-way catalyst needs to discharge oxygen. On the other hand, when the air/fuel ratio of the exhaust gas which flows into the three-way catalyst is leaner than the theoretical air/fuel ratio, the three-way catalyst needs to absorb oxygen. Otherwise, the air/fuel ratio of the exhaust gas inside the three-way catalyst may not be reliably maintained at the theoretical air/fuel ratio.

Accordingly, in order that the air/fuel ratio of the exhaust gas inside the three-way catalyst is reliably maintained at the theoretical air/fuel ratio and the high purification performance of the three-way catalyst is maintained, the three-way catalyst needs to be able to discharge and absorb oxygen at any time.

Here, when the three-way catalyst 52 may not discharge oxygen or the amount of oxygen which may be discharged from the three-way catalyst is extremely small, that is, the oxygen discharging ability of the three-way catalyst is not normally exhibited according to its designed ability, there is a tendency that the air/fuel ratio of the exhaust gas which flows out of the three-way catalyst becomes richer than the theoretical air/fuel ratio. Accordingly, at this time, the downstream air/fuel ratio sensor 54 detects the air/fuel ratio which is richer than the theoretical air/fuel ratio. On the other hand, when the three-way catalyst may not absorb oxygen or the amount of oxygen which may be absorbed to the three-way catalyst is extremely small, that is, the oxygen absorbing ability of the three-way catalyst is not exhibited according to its designed ability, there is a tendency that the air/fuel ratio of the exhaust gas which flows out of the three-way catalyst becomes leaner than the theoretical air/fuel ratio. Accordingly, at this time, the downstream air/fuel ratio sensor detects the air/fuel ratio which is leaner than the theoretical air/fuel ratio.

On the other hand, when the amount of oxygen absorbed to the three-way catalyst 52 is 0 or extremely small, even if the air/fuel ratio of the exhaust gas which flows into the three-way catalyst is richer than the theoretical air/fuel ratio, the three-way catalyst may not discharge oxygen or the amount of oxygen which may be discharged from the three-way catalyst becomes extremely small. In this case, when the exhaust gas with the air/fuel ratio which is leaner than the theoretical air/fuel ratio is supplied to the three-way catalyst, the three-way catalyst may absorb a sufficient amount of oxygen. Then, even when the air/fuel ratio of the exhaust gas which flows into the three-way catalyst becomes richer than the theoretical air/fuel ratio later, the three-way catalyst may discharge oxygen enough for adjusting the air/fuel ratio of the exhaust gas therein to the theoretical air/fuel ratio. On the other hand, when the amount of oxygen absorbed to the three-way catalyst is an absorption limit amount or extremely larger, even if the air/fuel ratio of the exhaust gas which flows into the three-way catalyst becomes leaner than the theoretical air/fuel ratio, the three-way catalyst may not absorb oxygen or the amount of oxygen which may be absorbed to the three-way catalyst becomes extremely small. In this case, when the exhaust gas with the air/fuel ratio which is richer than the theoretical air/fuel ratio is supplied to the three-way catalyst, the three-way catalyst may discharge a sufficient amount of oxygen. Then, even when the air/fuel ratio of the exhaust gas which flows into the three-way catalyst becomes leaner than the theoretical air/fuel ratio later, the three-way catalyst may absorb oxygen enough for adjusting the air/fuel ratio of the exhaust gas therein to the theoretical air/fuel ratio.

That is, when the period during which the downstream air/fuel ratio sensor 54 detects the air/fuel ratio which is richer than the theoretical air/fuel ratio is comparatively long, the exhaust gas with the air/fuel ratio which is leaner than the theoretical air/fuel ratio is supplied to the three-way catalyst 52. On the other hand, when the period during which the downstream air/fuel ratio sensor detects the air/fuel ratio which is leaner than the theoretical air/fuel ratio is comparatively long, the exhaust gas with the air/fuel ratio which is richer than the theoretical air/fuel ratio is supplied to the three-way catalyst. In this way, the oxygen absorbing and discharging ability of the three-way catalyst may be exhibited according to its designed ability.

Therefore, in the first embodiment, in a case where the air/fuel ratio of the air/fuel mixture is controlled to be the theoretical air/fuel ratio, basically, as described above, when the air/fuel ratio detected by the upstream air/fuel ratio sensor 53 is richer than the theoretical air/fuel ratio, the fuel injection amount is decreased. On the other hand, when the air/fuel ratio detected by the upstream air/fuel ratio sensor is leaner than the theoretical air/fuel ratio, the fuel injection amount is increased. However, when the period during which the air/fuel ratio detected by the downstream air/fuel ratio sensor 54 is richer than the theoretical air/fuel ratio is comparatively long, even when the air/fuel ratio of the exhaust gas detected by the upstream air/fuel ratio sensor is leaner than the theoretical air/fuel ratio, the fuel injection amount is not increased, and the air/fuel ratio of the air/fuel mixture is maintained so as to be leaner than the theoretical air/fuel ratio. On the other hand, when the period during which the air/fuel ratio detected by the downstream air/fuel ratio sensor is leaner than the theoretical air/fuel ratio is comparatively long, even when the air/fuel ratio of the exhaust gas detected by the upstream air/fuel ratio sensor is richer than the theoretical air/fuel ratio, the fuel injection amount is not decreased, and the air/fuel ratio of the air/fuel mixture is maintained so as to be richer than the theoretical air/fuel ratio. That is, in the first embodiment, in a case where the air/fuel ratio of the air/fuel mixture is controlled to be the theoretical air/fuel ratio, when the period during which the air/fuel ratio detected by the downstream air/fuel ratio sensor is richer than the theoretical air/fuel ratio is comparatively long, the air/fuel ratio of the air/fuel mixture is maintained so as to be leaner than the theoretical air/fuel ratio for a given period, so that the average air/fuel ratio of the exhaust gas which flows into the three-way catalyst is maintained so as to be leaner than the theoretical air/fuel ratio. On the other hand, when the period during which the air/fuel ratio detected by the downstream air/fuel ratio sensor is leaner than the theoretical air/fuel ratio is comparatively long, the air/fuel ratio of the air/fuel mixture may be maintained so as to be richer than the theoretical air/fuel ratio for a given period, so that the average air/fuel ratio of the exhaust gas which flows into the three-way catalyst is maintained so as to be richer than the theoretical air/fuel ratio.

Incidentally, as described above, in the stoichiometric control of the first embodiment, when the air/fuel ratio of the air/fuel mixture is richer than the theoretical air/fuel ratio, the fuel injection amount is decreased so that the air/fuel ratio of the air/fuel mixture becomes leaner than the theoretical air/fuel ratio. When the air/fuel ratio of the air/fuel mixture is leaner than the theoretical air/fuel ratio, the fuel injection amount is increased so that the air/fuel ratio of the air/fuel mixture becomes richer than the theoretical air/fuel ratio. Here, the stoichiometric control of the first embodiment allows the degree in which the air/fuel ratio of the air/fuel mixture becomes leaner than the theoretical air/fuel ratio when the air/fuel ratio of the air/fuel mixture is richer than the theoretical air/fuel ratio to be equal to the degree in which the air/fuel ratio of the air/fuel mixture becomes richer than the theoretical air/fuel ratio when the air/fuel ratio of the air/fuel mixture is leaner than the theoretical air/fuel ratio.

That is, in the stoichiometric control of the first embodiment, the air/fuel ratio of the air/fuel mixture becomes leaner than the theoretical air/fuel ratio or becomes richer than the theoretical air/fuel ratio by a given degree with respect to the theoretical air/fuel ratio as the target air/fuel ratio. That is, the air/fuel ratio of the air/fuel mixture is controlled so as to alternately repeat the air/fuel ratio which is leaner than the theoretical air/fuel ratio by a given degree and the air/fuel ratio which is richer than the theoretical air/fuel ratio by a given degree with respect to the theoretical air/fuel ratio. In other words, the air/fuel ratio of the air/fuel mixture is controlled so as to alternately repeat the air/fuel ratio which is leaner than the theoretical air/fuel ratio and the air/fuel ratio which is richer than the theoretical air/fuel ratio with a given amplitude with respect to the theoretical air/fuel ratio.

Incidentally, as described above, in the stoichiometric control of the first embodiment, the air/fuel ratio of the air/fuel mixture is controlled so as to alternately repeat the air/fuel ratio which is leaner than the theoretical air/fuel ratio and the air/fuel ratio which is richer than the theoretical air/fuel ratio with a given amplitude with respect to the theoretical air/fuel ratio. Here, as the amplitude of the air/fuel ratio when the air/fuel ratio of the air/fuel mixture is alternately repeated as the air/fuel ratio leaner than the theoretical air/fuel ratio and the air/fuel ratio richer than the theoretical air/fuel ratio with respect to the theoretical air/fuel ratio (hereinafter, this amplitude will be simply referred to as an 'amplitude of an air/fuel ratio') becomes larger, the degree in which the air/fuel ratio of the air/fuel mixture becomes leaner than the theoretical air/fuel ratio becomes larger when the air/fuel ratio of the air/fuel mixture becomes leaner than the theoretical air/fuel ratio. Accordingly, the amount of oxygen in the exhaust gas which flows into the three-way catalyst 52 when the air/fuel ratio of the air/fuel mixture becomes leaner than the theoretical air/fuel ratio becomes larger as the amplitude of the air/fuel ratio becomes larger. On the other hand, as the amplitude of the air/fuel ratio becomes larger, the degree in which the air/fuel ratio of the air/fuel mixture becomes richer than the theoretical air/fuel ratio when the air/fuel ratio of the air/fuel mixture becomes richer than the theoretical air/fuel ratio becomes larger. Accordingly, the amount of unburned fuel in the exhaust gas which flows into the three-way catalyst when the air/fuel ratio of the air/fuel mixture becomes richer than the theoretical air/fuel ratio becomes larger as the amplitude of the air/fuel mixture becomes larger. In this way, as the amplitude of the air/fuel ratio becomes larger, the amounts of oxygen and unburned fuel flowing into the three-way catalyst become larger and the combustion amount of unburned fuel in the three-way catalyst becomes larger. Accordingly, the heat generation amount generated by the combustion of the unburned fuel in the three-way catalyst becomes larger as the amplitude of the air/fuel ratio becomes larger. Here, when the heat generation amount generated by the combustion of the unburned fuel in the three-way catalyst is large and the temperature of the three-way catalyst (hereinafter, this temperature will be referred to as a 'catalyst temperature') is high, there is a possibility that thermal degradation in the three-way catalyst may occur. Further, since the unburned fuel in the three-way catalyst is immediately burnt as the catalyst temperature increases, there is an increasing possibility that thermal degradation in the three-way catalyst may occur as the catalyst temperature increases. Accordingly, in order to suppress thermal degradation in the three-way catalyst, it is natural that the amount of oxygen in the exhaust gas flowing into the three-way catalyst and the amount of unburned fuel in the exhaust gas flowing into the three-way catalyst are decreased when the catalyst temperature is high. Therefore, in the stoichiometric control of the first embodiment, the amplitude of the air/fuel ratio is set as below.

Figure 3:
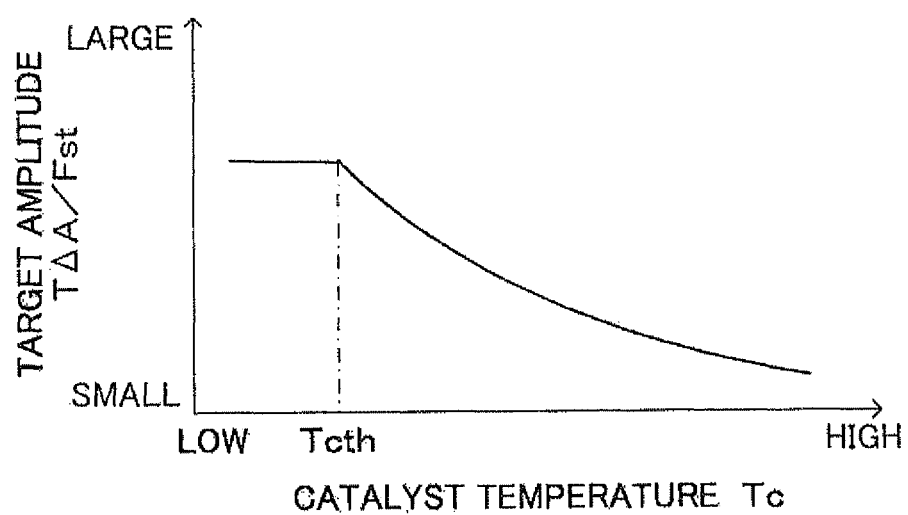
FIG. 3 is a diagram illustrating a map which is used to determine a target amplitude for stoichiometric control.

That is, as described above, when the amounts of oxygen and unburned fuel flowing into the three-way catalyst are unchanged, there is an increasing possibility that thermal degradation in the three-way catalyst may occur as the catalyst temperature (the temperature of the three-way catalyst 52) increases. Therefore, in the first embodiment, the width between the air/fuel ratio of the air/fuel mixture when the air/fuel ratio of the air/fuel mixture becomes leaner than the theoretical air/fuel ratio and the air/fuel ratio of the air/fuel mixture when the air/fuel ratio of the air/fuel mixture becomes richer than the theoretical air/fuel ratio, that is, the amplitude of the air/fuel ratio of the air/fuel mixture is obtained in advance by an experiment or the like in response to the catalyst temperature, and the ECU 70 stores the amplitude as a target amplitude TΔA/Fst in the form of a map of a function of a catalyst temperature Tc as illustrated in FIG. 3, where the air/fuel ratio of the air/fuel mixture corresponds to the amounts of oxygen and unburned fuel which do not cause thermal degradation in the three-way catalyst even when those flow into the three-way catalyst. Here, as understood from FIG. 3, the target amplitude TΔA/Fst which is stored in this way takes a comparatively large given value when the catalyst temperature Tc is lower than the certain temperature Tcth, and takes a small value as the catalyst temperature Tc increases when the catalyst temperature Tc is higher than the certain temperature Tcth.

Then, in the first embodiment, during the stoichiometric control, the target amplitude TΔA/Fst in response to the catalyst temperature Tc is read out from the map of FIG. 3, and the standard fuel injection amount calculated as described above is corrected so as to attain the read target amplitude TΔA/Fst. Specifically, when the air/fuel ratio of the air/fuel mixture is richer than the theoretical air/fuel ratio, the standard fuel injection amount calculated as described above decreases so as to attain the target amplitude TΔA/Fst. When the air/fuel ratio of the air/fuel mixture is leaner than the theoretical air/fuel ratio, the standard fuel injection amount calculated as described above increases so as to attain the target amplitude TΔA/Fst.

Then, in the stoichiometric control of the first embodiment, the standard fuel injection amount corrected in this way is set as a target fuel injection amount, and the operation of the fuel injection valve is controlled so that fuel of the target fuel injection amount is injected from the fuel injection valve 39.

In this way, when the amount of fuel which is injected from the fuel injection valve 39 is controlled in response to the catalyst temperature (the temperature of the three-way catalyst 52), thermal degradation in the three-way catalyst is suppressed.

Furthermore, the method of correcting the standard fuel injection amount so as to attain the target amplitude in this way may be applied to the case of the first embodiment described above. That is, the method may be applied to the case where the air/fuel ratio of the air/fuel mixture is maintained so as to be leaner than the theoretical air/fuel ratio for a given period when the period during which the air/fuel ratio detected by the downstream air/fuel ratio sensor is richer than the theoretical air/fuel ratio is comparatively long and the air/fuel ratio of the air/fuel mixture is maintained so as to be richer than the theoretical air/fuel ratio for a given period when the period during which the air/fuel ratio detected by the downstream air/fuel ratio sensor is leaner than the theoretical air/fuel ratio is comparatively long.

Next, an example of a flowchart which executes the control of the air/fuel ratio of the air/fuel mixture according to the first embodiment will be described. In the control of the air/fuel ratio of the air/fuel mixture of the first embodiment, the flowcharts of FIGS. 4 and 5 are used.

Figure 4:
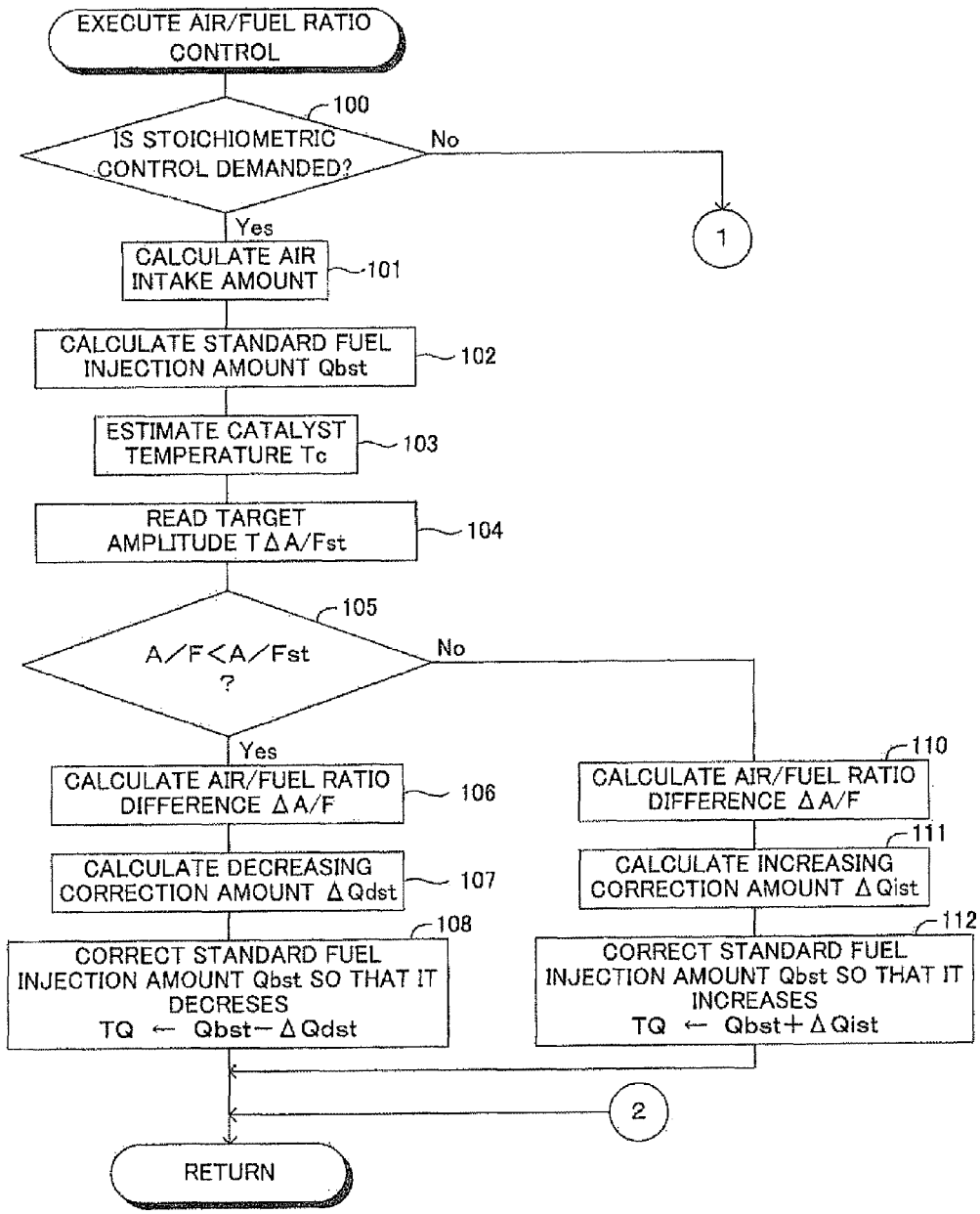
FIGS. 4 and 5 are diagrams illustrating an example of a flowchart which executes air/fuel ratio control according to a first embodiment.
Figure 5:
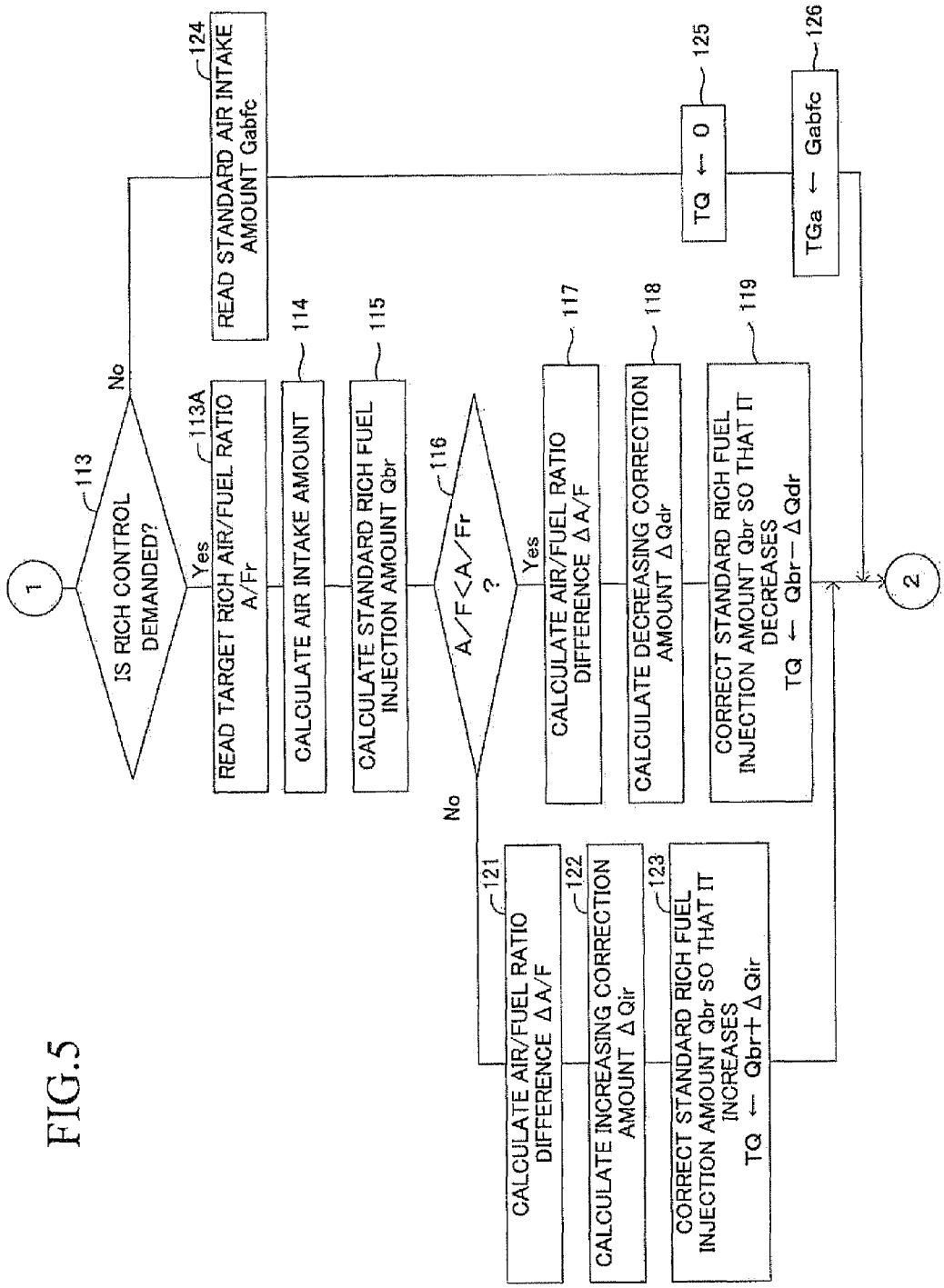

When the routine of FIG. 4 is started, first, in step 100, it is determined whether the execution of the stoichiometric control is demanded. Here, when it is determined that the execution of the stoichiometric control is demanded, the routine proceeds to step 101 and the steps thereafter, so that the stoichiometric control is executed. On the other hand, when it is determined that the execution of the stoichiometric control is not demanded, the routine proceeds to step 113 and the steps thereafter of FIG. 5, and the control in which the air/fuel ratio of the air/fuel mixture is controlled to be the air/fuel ratio richer than the theoretical air/fuel ratio (hereinafter, this control will be referred to as 'rich control') is executed or control in which the injection of fuel from the fuel injection valve 39 is stopped, that is, control in which the fuel injection amount is controlled to be zero (hereinafter, this will be referred to as 'fuel cut control') is executed.

In step 100 of FIG. 4, when it is determined that the execution of the stoichiometric control is demanded and the routine proceeds to step 101, the air intake amount is calculated by multiplying the amount of air detected by the air flow meter 61 by the air intake amount calculating coefficient. Subsequently, in step 102, the amount of fuel to be injected from the fuel injection valve 39 is calculated as a standard fuel injection amount Qbst so that the air/fuel ratio of the air/fuel mixture becomes the theoretical air/fuel ratio based on the air intake amount calculated in step 101. Subsequently, in step 103, the catalyst temperature (the temperature of the three-way catalyst 52) Tc is estimated. Subsequently, in step 104, the target amplitude TΔA/Fst in response to the catalyst temperature Tc estimated in step 103 is read out from the map of FIG. 3. Subsequently, in step 105, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 106 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 109 and the steps thereafter, and a process which allows the air/fuel ratio of the air/fuel mixture to be richer than the theoretical air/fuel ratio is executed.

In step 105 of FIG. 4, when it is determined that the relation of A/F<A/Fst is established, that is, the air/fuel ratio of the air/fuel mixture is richer than the theoretical air/fuel ratio and the routine proceeds to step 106, a difference between the air/fuel ratio of the air/fuel mixture and the theoretical air/fuel ratio (hereinafter, this difference will be referred to as an 'air/fuel ratio difference') ΔA/F is calculated. Subsequently, in step 107, an amount by which the standard fuel injection amount Qbst calculated in step 102 is decreased (hereinafter, this amount will be referred to as a 'decreasing correction amount') ΔQdst is calculated so that the air/fuel ratio of the air/fuel mixture becomes leaner than the theoretical air/fuel ratio and the target amplitude TΔA/Fst read out in step 104 is attained in consideration of the target amplitude TΔA/Fst read out in step 104 and the air/fuel ratio difference ΔA/F calculated in step 106. Subsequently, in step 108, the standard fuel injection amount Qbst calculated in step 102 decreases by the decreasing correction amount ΔQdst calculated in step 107 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 108 of FIG. 4 is injected from the fuel injection valve 39. Accordingly, since only oxygen of an amount which does not cause thermal degradation in the three-way catalyst flows into the three-way catalyst in response to the catalyst temperature (the temperature of the three-way catalyst 52), thermal degradation in the three-way catalyst is suppressed.

On the other hand, in step 105 of FIG. 4, when it is determined that the relation of A/F≥A/Fst is established, that is, the air/fuel ratio of the air/fuel mixture is leaner than the theoretical air/fuel ratio and the routine proceeds to step 110, a difference between the air/fuel ratio of the air/fuel mixture and the theoretical air/fuel ratio (air/fuel ratio difference) ΔA/F is calculated. Subsequently, in step 111, an amount by which the standard fuel injection amount Qbst calculated in step 102 is increased (hereinafter, this amount will be referred to as a 'increasing correction amount') ΔQist is calculated so that the air/fuel ratio of the air/fuel mixture becomes richer than the theoretical air/fuel ratio and the target amplitude TΔA/Fst read out in step 104 is attained in consideration of the target amplitude TΔA/Fst read out in step 104 and the air/fuel ratio difference ΔA/F calculated in step 110. Subsequently, in step 112, the standard fuel injection amount Qbst calculated in step 102 increases by the increasing correction amount ΔQist calculated in step 111 (Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 112 of FIG. 4 is injected from the fuel injection valve 39. Accordingly, since only unburned fuel of an amount which does not cause thermal degradation in the three-way catalyst flows into the three-way catalyst in response to the catalyst temperature (the temperature of the three-way catalyst 52), thermal degradation in the three-way catalyst is suppressed.

On the other hand, in step 100 of FIG. 4, when it is determined that the execution of the stoichiometric control is not demanded and the routine proceeds to step 113 of FIG. 5, it is determined whether there is a demand for the execution of the rich control in which the air/fuel ratio of the air/fuel mixture is controlled to be the air/fuel ratio richer than the theoretical air/fuel ratio. Here, when it is determined that the execution of the rich control is demanded, the routine proceeds to step 113A and the steps thereafter, and the rich control is executed. On the other hand, when it is determined that the execution of the rich control is not demanded, that is, the execution of the fuel cut control in which the fuel injection amount becomes zero is demanded, the routine proceeds to step 122 and the steps thereafter, and the fuel cut control is executed.

Figure 9:
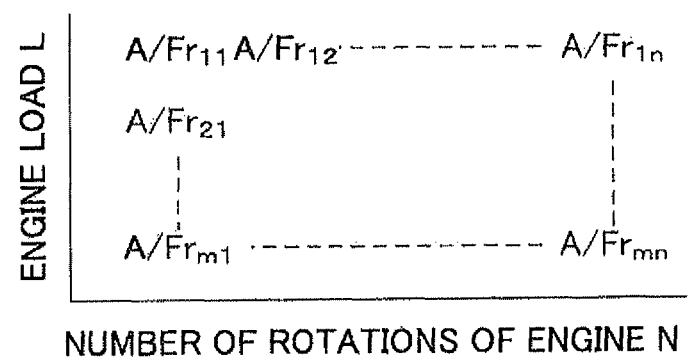
FIG. 9 is a diagram illustrating a map which is used to determine a target rich air/fuel ratio for rich control.

In step 113 of FIG. 5, when it is determined that the execution of the rich control is demanded and the routine proceeds to step 113A, the rich air/fuel ratio to be a target in response to the number of rotations of the engine N and the engine load L (hereinafter, the air/fuel ratio will be referred to as a 'target rich air/fuel ratio') A/Fr is read out from the map of FIG. 9. Here, in the map of FIG. 9, the optimal rich air/fuel ratio is obtained by an experiment or the like in advance in response to the engine running state of the rich control, and the ECU 70 stores the rich air/fuel ratio as the target rich air/fuel ratio A/Fr in the form of a map of a function of the number of rotations of the engine N and the engine load L. In step 114 subsequent to step 113A, the air intake amount is calculated by multiplying the amount of air detected by the air flow meter 61 by the air intake amount calculating coefficient. Subsequently, in step 115, the amount of fuel to be injected from the fuel injection valve 39 is calculated as a standard rich fuel injection amount Qbr so that the air/fuel ratio of the air/fuel mixture becomes the target rich air/fuel ratio A/Fr read out in step 113A based on the air intake amount calculated in step 114. Subsequently, in step 116, it is determined whether the detected air/fuel ratio (the air/fuel ratio detected by the upstream air/fuel ratio sensor 53), that is, the air/fuel ratio of the air/fuel mixture is smaller than the target rich air/fuel ratio A/Fr (A/F<A/Fr), that is, the air/fuel ratio of the air/fuel mixture is richer than the target rich air/fuel ratio. Here, when it is determined that the relation of A/F<A/Fr is established, the routine proceeds to step 117 and the steps thereafter, and a process which allows the air/fuel ratio of the air/fuel mixture to be leaner than the target rich air/fuel ratio is executed. On the other hand, when it is determined that the relation of A/F>A/Fr is established, the routine proceeds to step 121 and the steps thereafter, and a process which allows the air/fuel ratio of the air/fuel mixture to be richer than the target rich air/fuel ratio is executed.

In step 116 of FIG. 5, when it is determined that the relation of A/F<A/Fr is established, that is, the air/fuel ratio of the air/fuel mixture is richer than the target rich air/fuel ratio and the routine proceeds to step 117, a difference between the air/fuel ratio of the air/fuel mixture and the target rich air/fuel ratio (air/fuel ratio difference) ΔA/F is calculated. Subsequently, in step 118, an amount which decreases the standard rich fuel injection amount Qbr calculated in step 115 (decreasing correction amount) ΔQdr is calculated so that the air/fuel ratio of the air/fuel mixture becomes leaner than the target rich air/fuel ratio in consideration of the air/fuel ratio difference ΔA/F calculated in step 117. Subsequently, in step 119, the standard rich fuel injection amount Qbr calculated in step 115 decreases by the decreasing correction amount ΔQdr calculated in step 118 (Qbr−ΔQdr), the decreased standard rich fuel injection amount is input to the target fuel injection amount TQ, and the routine is ended.

Then, in this case, the operation of the fuel injection valve is controlled so that fuel of the target fuel injection amount TQ set in step 119 of FIG. 5 is injected from the fuel injection valve 39.

On the other hand, in step 116 of FIG. 5, when it is determined that the relation of A/F≥A/Fr is established, that is, the air/fuel ratio of the air/fuel mixture is leaner than the theoretical air/fuel ratio and the routine proceeds to step 121, a difference between the air/fuel ratio of the air/fuel mixture and the target rich air/fuel ratio (air/fuel ratio difference) ΔA/F is calculated. Subsequently, in step 122, an amount which increases the standard rich fuel injection amount Qbr calculated in step 115 (increasing correction amount) ΔQir is calculated so that the air/fuel ratio of the air/fuel mixture becomes richer than the target rich air/fuel ratio in consideration of the air/fuel ratio difference ΔA/F calculated in step 121. Subsequently, in step 123, the standard rich fuel injection amount Qbr calculated in step 115 increases by the increasing correction amount ΔQir calculated in step 122 (Qbr+ΔQir), the increased standard rich fuel injection amount is input to the target fuel injection amount TQ, and the routine is ended.

Then, in this case, the operation of the fuel injection valve is controlled so that fuel of the target fuel injection amount TQ set in step 123 of FIG. 5 is injected from the fuel injection valve 39.

On the other hand, in step 113 of FIG. 5, when it is determined that the execution of the rich control is not demanded, that is, the execution of the fuel cut control is demanded and the routine proceeds to step 124, the optimal air intake amount is read out as a standard air intake amount Gabfc from the ECU 70 in the fuel cut control. Here, with regard to the standard air intake amount Gabfc, the optimal air intake amount is obtained in advance by an experiment or the like in the fuel cut control, and the air intake amount is stored as a standard air intake amount in the ECU 70. In step 125 subsequent to step 124, zero is input to the target fuel injection amount TQ. Subsequently, in step 126, the standard air intake amount Gabfc read out in step 124 is input to the target air intake amount TGa, and the routine is ended.

Then, in this case, since the target fuel injection amount TQ is set to zero in step 125 of FIG. 5, fuel is not injected from the fuel injection valve 39, and the opening degree of the throttle valve 46 is controlled so that air of the target air intake amount TGa set in step 126 is suctioned to the combustion chamber 25.

Next, another example of a flowchart which executes the control of the air/fuel ratio of the air/fuel mixture according to the first embodiment will be described. In this example, the flowcharts of FIGS. 6 to 8 and 5 are used. Furthermore, since the flowchart of FIG. 5 has been already described, the detailed description thereof will not be repeated.

Figure 6:
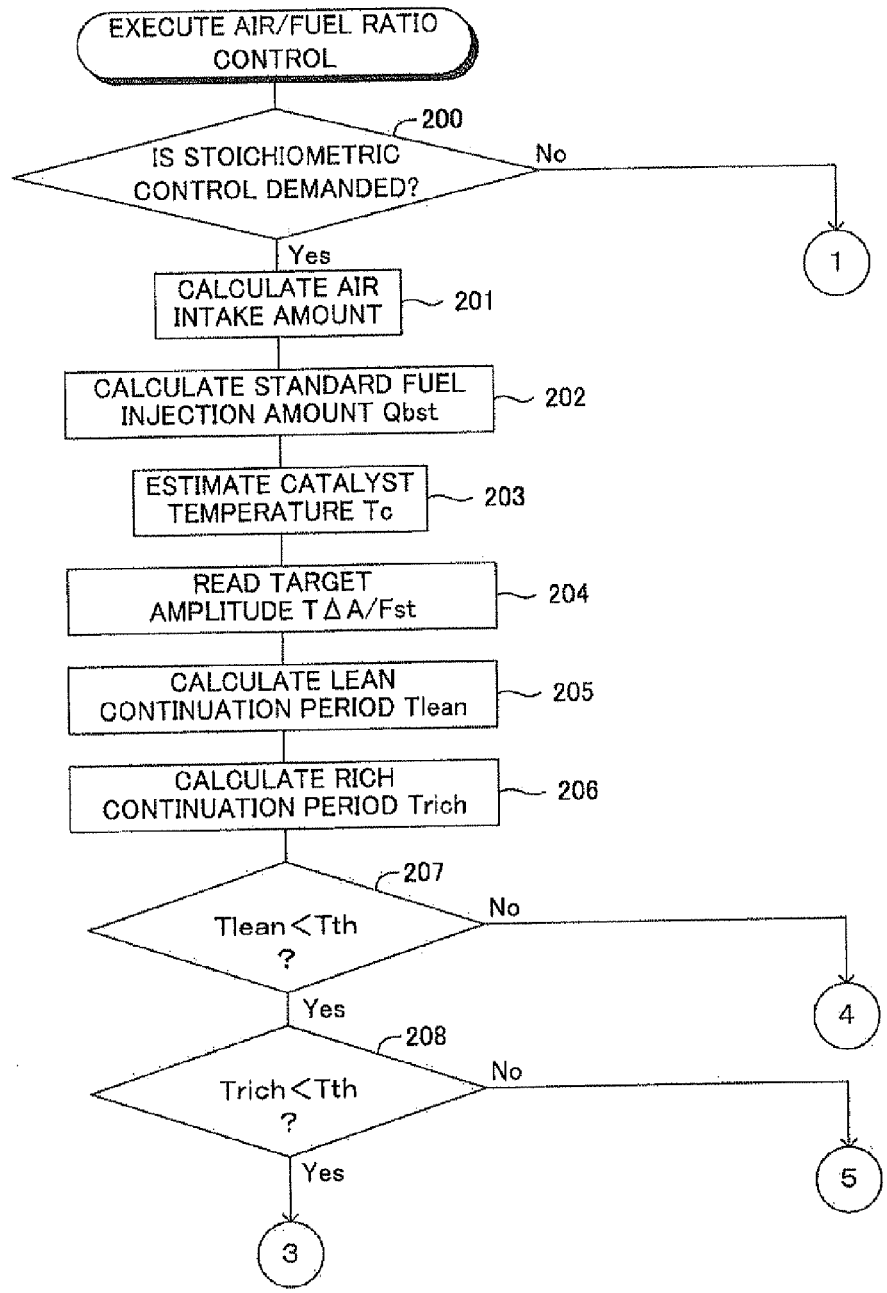
FIGS. 6 to 8 are diagrams partly illustrating another example of a flowchart which executes the air/fuel ratio control according to the first embodiment.

When the routine of FIG. 6 is started, first, in step 200, it is determined whether the execution of the stoichiometric control is demanded. Here, when it is determined that the execution of the stoichiometric control is demanded, the routine proceeds to step 201 and the steps thereafter. On the other hand, when it is determined that the execution of the stoichiometric control is not demanded, the routine proceeds to step 113 and the steps thereafter of FIG. 5 and the rich control is executed or the fuel cut control is executed.

In step 200 of FIG. 6, when it is determined that the execution of the stoichiometric control is demanded and the routine proceeds to step 201, the air intake amount is calculated by multiplying the amount of air detected by the air flow meter 61 by the air intake amount calculating coefficient. Subsequently, in step 202, the amount of fuel to be injected from the fuel injection valve 39 is calculated as the standard fuel injection amount Qbst so that the air/fuel ratio of the air/fuel mixture becomes the theoretical air/fuel ratio based on the air intake amount calculated in step 201. Subsequently, in step 203, the catalyst temperature (the temperature of the three-way catalyst 52) Tc is estimated. Subsequently, in step 204, the target amplitude TΔA/Fst in response to the catalyst temperature Tc estimated in step 203 is read out from the map of FIG. 3. Subsequently, in step 205, the period during which the downstream air/fuel ratio sensor 54 keeps detecting the air/fuel ratio leaner than the theoretical air/fuel ratio (hereinafter, this period will be referred to as a 'lean continuation period') Tlean is calculated. Subsequently, in step 206, the period during which the downstream air/fuel ratio sensor keeps detecting the air/fuel ratio richer than the theoretical air/fuel ratio (hereinafter, this period will be referred to as a 'rich continuation period') Trich is calculated. Subsequently, in step 207, it is determined whether the lean continuation period Tlean calculated in step 205 is shorter than a predetermined period Tth (Tlean<Tth). Here, when it is determined that the relation of Tlean<Tth is established, the routine proceeds to step 208. On the other hand, when it is determined that the relation of Tlean≥Tth is established, the routine proceeds to step 223 of FIG. 8.

In step 207 of FIG. 6, when it is determined that the relation of Tlean<Tth is established, that is, the lean continuation period is shorter than a predetermined period and the routine proceeds to step 208, it is determined whether the rich continuation period Trich calculated in step 206 is shorter than the predetermined period Tth (Trich<Tth). Here, when it is determined that the relation of Trich<Tth is established, the routine proceeds to step 209 of FIG. 7. On the other hand, when it is determined that the relation of Trich≥Tth is established, the routine proceeds to step 217 of FIG. 8.

Figure 7:
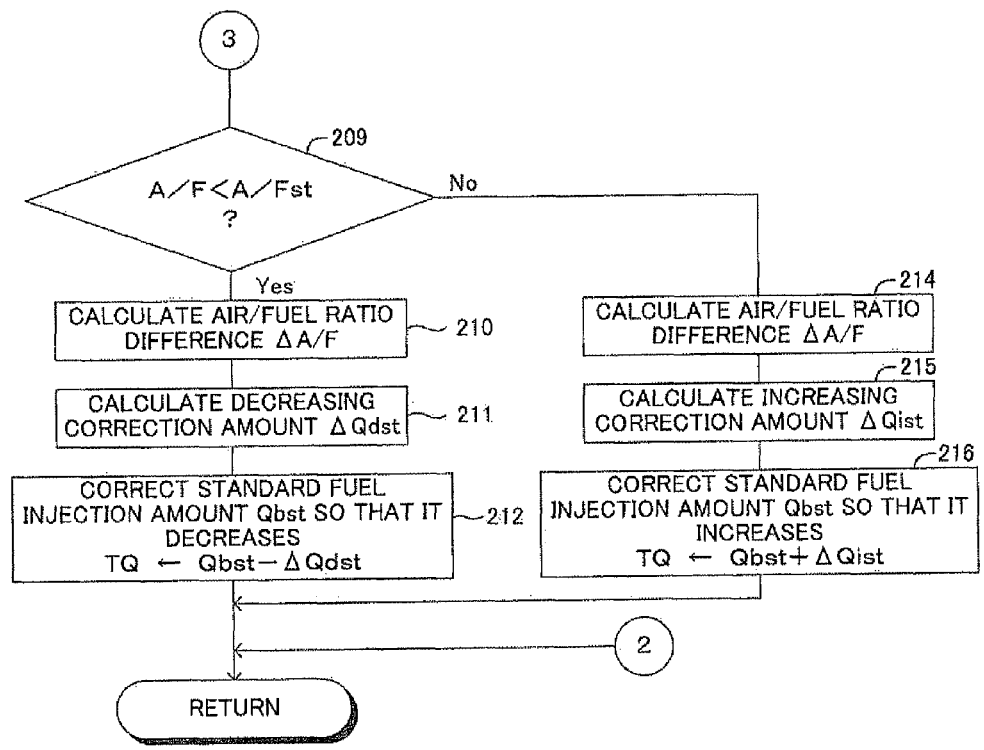

When it is determined that the relation of Tlean<Tth is established in step 207 of FIG. 6, the relation of Trich<Tth is established in step 208 of FIG. 6, that is, the lean continuation period and the rich continuation period are shorter than a predetermined period, and the routine proceeds to step 209 of FIG. 7, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 210 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 214 and the steps thereafter, and a process which allows the air/fuel ratio of the air/fuel mixture to be richer than the theoretical air/fuel ratio is executed.

In step 209 of FIG. 7, when it is determined that the relation of A/F<A/Fst is established, that is, the air/fuel ratio of the air/fuel mixture is richer than the theoretical air/fuel ratio and the routine proceeds to step 210, a difference between the air/fuel ratio of the air/fuel mixture and the theoretical air/fuel ratio (air/fuel ratio difference) ΔA/F is calculated. Subsequently, in step 211, an amount which decreases the standard fuel injection amount Qbst calculated in step 202 of FIG. 6 (decreasing correction amount) ΔQdst is calculated so that the air/fuel ratio of the air/fuel mixture becomes leaner than the theoretical air/fuel ratio and the target amplitude TΔA/Fst read out in step 204 is attained in consideration of the target amplitude TΔA/Fst read out in step 204 of FIG. 6 and the air/fuel ratio difference ΔA/F calculated in step 210. Subsequently, in step 212, the standard fuel injection amount Qbst calculated in step 202 decreases by the decreasing correction amount ΔQdst calculated in step 211 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 212 of FIG. 7 is injected from the fuel injection valve 39. Accordingly, since only oxygen of an amount which does not cause thermal degradation in the three-way catalyst flows into the three-way catalyst in response to the catalyst temperature (the temperature of the three-way catalyst 52), thermal degradation in the three-way catalyst is suppressed.

On the other hand, in step 209 of FIG. 7, when it is determined that the relation of A/F≥A/Fst is established, that is, the air/fuel ratio of the air/fuel mixture is leaner than the theoretical air/fuel ratio and the routine proceeds to step 214, a difference between the air/fuel ratio of the air/fuel mixture and the theoretical air/fuel ratio (air/fuel ratio difference) ΔA/F is calculated. Subsequently, in step 215, an amount which increases the standard fuel injection amount Qbst calculated in step 202 of FIG. 6 (increasing correction amount) ΔQist is calculated so that the air/fuel ratio of the air/fuel mixture becomes richer than the theoretical air/fuel ratio and the target amplitude TΔA/Fst read out in step 204 is attained in consideration of the target amplitude TΔA/Fst read out in step 204 of FIG. 6 and the air/fuel ratio difference ΔA/F calculated in step 214. Subsequently, in step 216, the standard fuel injection amount Qbst calculated in step 202 increases by the increasing correction amount ΔQist calculated in step 215

(Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 216 of FIG. 7 is injected from the fuel injection valve 39. Accordingly, since only unburned fuel of an amount which does not cause thermal degradation in the three-way catalyst flows into the three-way catalyst in response to the catalyst temperature (the temperature of the three-way catalyst 52), thermal degradation in the three-way catalyst is suppressed.

Figure 8:
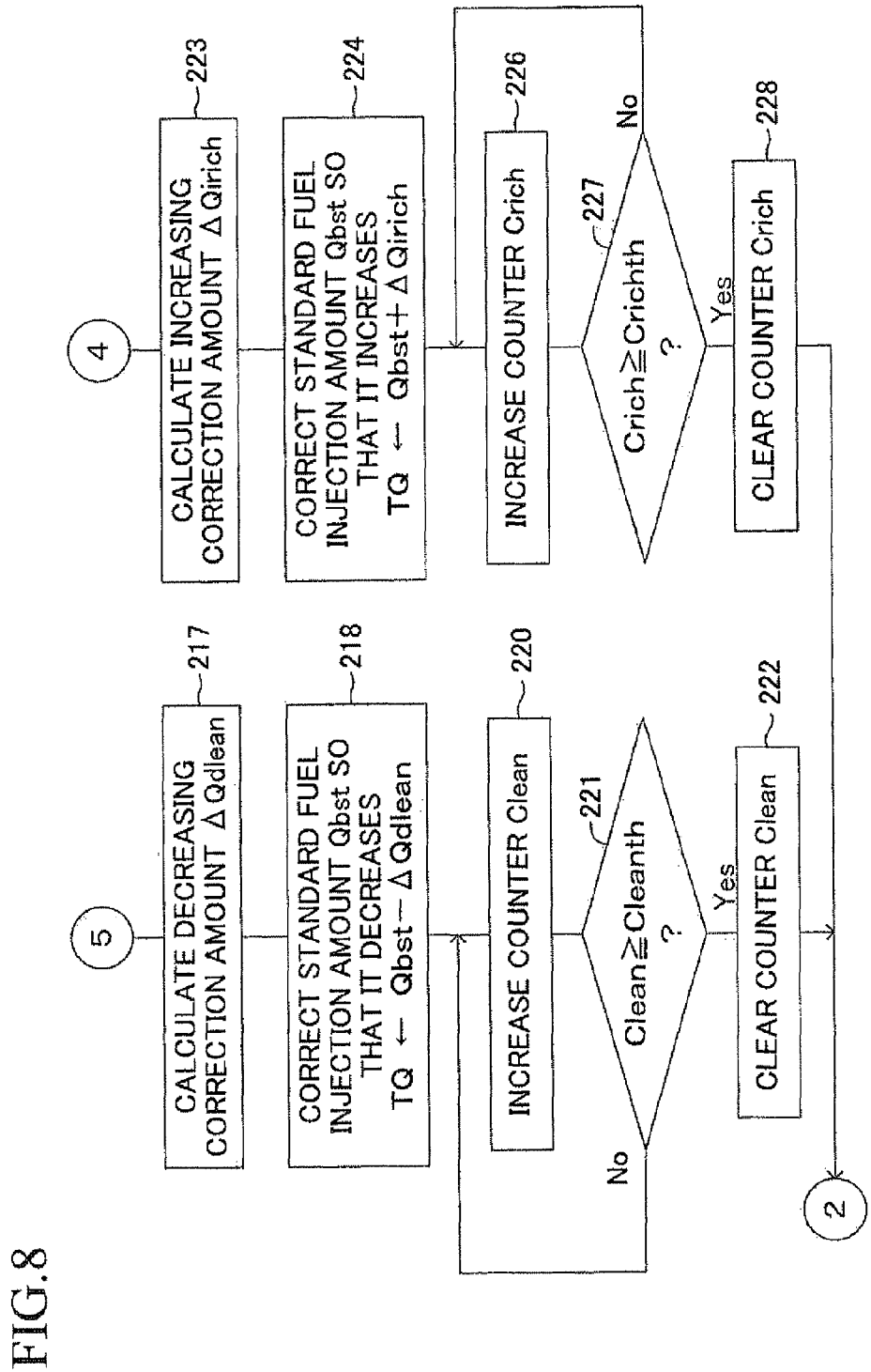

On the other hand, in step 207 of FIG. 6, when it is determined that the relation of Tlean≥Tth is established, that is, the lean continuation period is longer than or equal to a predetermined period and the routine proceeds to step 223 of FIG. 8, an amount which increases the standard fuel injection amount Qbst calculated in step 202 of FIG. 6 (increasing correction amount) ΔQirich is calculated so that the air/fuel ratio of the air/fuel mixture becomes richer than the theoretical air/fuel ratio and the target amplitude TΔA/Fst read out in step 204 of FIG. 6 is attained. Subsequently, in step 224, the standard fuel injection amount Qbst calculated in step 202 increases by the increasing correction amount ΔQirich calculated in step 223 (Qbst+ΔQirich), the increased standard fuel injection amount is input to the target fuel injection amount TQ. Subsequently, in step 226, the counter Crich which represents the period during which the air/fuel ratio of the air/fuel mixture is maintained so as to be richer than the theoretical air/fuel ratio increases. Subsequently, in step 227, it is determined whether the counter Crich which increases in step 226 is larger than or equal to a predetermined value Crichth (Crich≥Crichth). Here, when it is determined that the relation of Crich<Crichth is established, the routine returns to step 226, and the counter Crich further increases. On the other hand, when it is determined that the relation of Crich≥Crichth is established, the routine proceeds to step 228, the counter Crich is cleared, and the routine is ended.

That is, at this time, in step 227, the operation of the fuel injection valve is continuously controlled so that fuel of the target fuel injection amount TQ set in step 224 is injected from the fuel injection valve 39 until the counter Crich becomes larger than or equal to the predetermined value Crichth. Accordingly, oxygen which is larger than or equal to the necessary amount and is absorbed to the three-way catalyst 52 is discharged, the oxygen absorbing ability of the three-way catalyst is recovered, and only unburned fuel of an amount which does not cause thermal degradation in the three-way catalyst flows into the three-way catalyst in response to the catalyst temperature (the temperature of the three-way catalyst), thermal degradation in the three-way catalyst is suppressed.

On the other hand, in step 208 of FIG. 6, when it is determined that the relation of Trich≥Tth is established, that is, the rich continuation period is longer than or equal to a predetermined period and the routine proceeds to step 217 of FIG. 8, an amount which decreases the standard fuel injection amount Qbst calculated in step 202 of FIG. 6 (decreasing correction amount) ΔQdlean is calculated so that the air/fuel ratio of the air/fuel mixture becomes leaner than the theoretical air/fuel ratio and the target amplitude TΔA/Fst read out in step 204 of FIG. 6 is attained. Subsequently, in step 218, the standard fuel injection amount Qbst calculated in step 202 decreases by the decreasing correction amount ΔQdlean calculated in step 217 (Qbst−ΔQdlean), and the decreased standard fuel injection amount is input to the target fuel injection amount TQ. Subsequently, in step 220, the counter Clean which represents the period during which the air/fuel ratio of the air/fuel mixture is maintained so as to be leaner than the theoretical air/fuel ratio increases. Subsequently, in step 221, it is determined whether the counter Clean which increases in step 220 is larger than or equal to a predetermined value Cleanth (Clean≥Cleanth). Here, when it is determined that the relation of Clean<Cleanth is established, the routine returns to step 220, and the counter Clean further increases. On the other hand, when it is determined that the relation of Clean≥Cleanth is established, the routine proceeds to step 222, the counter Clean is cleared, and the routine is ended.

That is, at this time, in step 221, the operation of the fuel injection valve is continuously controlled so that fuel of the target fuel injection amount TQ set in step 218 is injected from the fuel injection valve 39 until the counter Clean is larger than or equal to the predetermined value Cleanth. Accordingly, the three-way catalyst 52 absorbs a sufficient amount of oxygen, the oxygen discharging ability of the three-way catalyst is recovered, and only oxygen of an amount which does not cause thermal degradation in the three-way catalyst flows into the three-way catalyst in response to the catalyst temperature (the temperature of the three-way catalyst), thermal degradation in the three-way catalyst is suppressed.

Incidentally, in the stoichiometric control of the first embodiment, the amplitude of the air/fuel ratio of the air/fuel mixture to be a target, that is, the target amplitude is set in response to only the catalyst temperature (the temperature of the three-way catalyst 52) so as to attain a degree (a target lean degree) in which the air/fuel ratio of the air/fuel mixture becomes leaner than the theoretical air/fuel ratio when the air/fuel ratio of the air/fuel mixture is richer than the theoretical air/fuel ratio and a degree (a target rich degree) in which the air/fuel ratio of the air/fuel mixture becomes richer than the theoretical air/fuel ratio when the air/fuel ratio of the air/fuel mixture is leaner than the theoretical air/fuel ratio. However, the target amplitude may be set as below.

That is, as described above, the three-way catalyst 52 has the oxygen absorbing and discharging ability in which the three-way catalyst absorbs oxygen in the exhaust gas when the air/fuel ratio of the exhaust gas flowing thereinto is leaner than the theoretical air/fuel ratio and discharges oxygen absorbed thereto when the air/fuel ratio of the exhaust gas flowing thereinto is richer than the theoretical air/fuel ratio. Accordingly, when the air/fuel ratio of the exhaust gas which flows into the three-way catalyst is leaner than the theoretical air/fuel ratio, the three-way catalyst absorbs oxygen in the exhaust gas. However, there is a limitation in the amount of oxygen which may be absorbed to the three-way catalyst by the unit of time. For this reason, even when the air/fuel ratio of the exhaust gas flowing into the three-way catalyst is leaner than the theoretical air/fuel ratio, there is a possibility that the three-way catalyst may not absorb the entire oxygen in the exhaust gas when the amount of the exhaust gas flowing into the three-way catalyst is large. Accordingly, as described above, in order to maintain the high purification performance of the three-way catalyst, it is desirable that the air/fuel mixture leaner than the theoretical air/fuel ratio and the air/fuel mixture richer than the theoretical air/fuel ratio be alternately formed in the combustion chamber 25 with respect to the theoretical air/fuel ratio. However, even when the amplitude of the air/fuel ratio of the air/fuel mixture at this time is excessively large, the purification performance of the three-way catalyst does not become higher than a given purification rate. On the other hand, when the amplitude of the air/fuel ratio of the air/fuel mixture is excessively large and there is oxygen which is not absorbed to the three-way catalyst, the unburned fuel accumulated in the three-way catalyst is burned by the oxygen. Here, when there is a large amount of oxygen which is not absorbed by the three-way catalyst 52, there is a possibility that the unburned fuel accumulated in the three-way catalyst may be immediately burned. Then, when the unburned fuel is immediately burned, there is a possibility that thermal degradation in the three-way catalyst may occur. Accordingly, in order to suppress thermal degradation in the three-way catalyst, it is natural that the amount of oxygen in the exhaust gas which flows into the three-way catalyst is decreased when the amount of the exhaust gas flowing into the three-way catalyst is large, that is, the amount of air suctioned to the combustion chamber 25 (the air intake amount) is large. Therefore, in the stoichiometric control of the embodiment (hereinafter, referred to as a second embodiment), the amplitude of the air/fuel ratio, that is, the amplitude in which the air/fuel ratio of the air/fuel mixture is alternately repeated as the air/fuel ratio leaner than the theoretical air/fuel ratio and the air/fuel ratio richer than the theoretical air/fuel ratio with respect to the theoretical air/fuel ratio is set as below.

Figure 10:
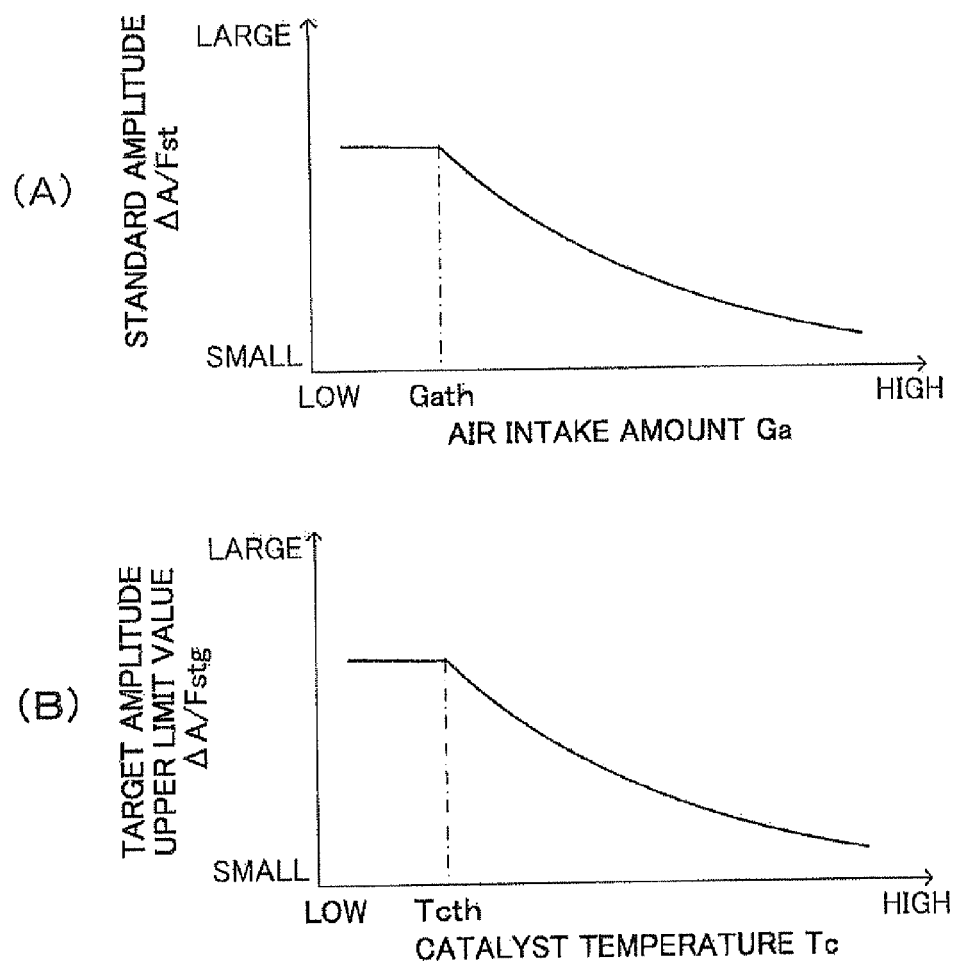
FIG. 10(A) is a diagram illustrating a map which is used to determine a standard amplitude for stoichiometric control in response to an air intake amount.
FIG. 10(B) is a diagram illustrating a map which is used to determine a standard amplitude for stoichiometric control in response to a catalyst temperature.

That is, as described above, there is an increasing possibility that thermal degradation in the three-way catalyst may occur as the amount of the exhaust gas flowing into the three-way catalyst 52, that is, the amount of air suctioned to the combustion chamber 25 (the air intake amount) increases. Therefore, in the second embodiment, the width between the air/fuel ratio of the air/fuel mixture when the air/fuel ratio of the air/fuel mixture is leaner than the theoretical air/fuel ratio and the air/fuel ratio of the air/fuel mixture when the air/fuel ratio of the air/fuel mixture is richer than the theoretical air/fuel ratio, that is, the amplitude of the air/fuel ratio of the air/fuel mixture is obtained in advance by an experiment or the like in response to the air intake amount, and as illustrated in FIG. 10(A), the ECU 70 stores the amplitude as the standard amplitude $\Delta A/Fst$ in the form of a map of a function of the air intake amount Ga, where the air/fuel ratio of the air/fuel mixture corresponds to the amounts of oxygen and unburned fuel which do not cause thermal degradation in the three-way catalyst even when those flow into the three-way catalyst. Here, as understood from FIG. 10(A), the standard amplitude $\Delta A/Fst$ which is stored in this way takes a comparatively large given value when the air intake amount Ga is smaller than a certain amount Gath, and takes a small value as the air intake amount Ga increases when the air intake amount Ga is larger than the certain amount Gath.

Incidentally, as described in the first embodiment, the catalyst temperature (the temperature of the three-way catalyst) needs to be also considered in order to suppress thermal degradation in the three-way catalyst 52. That is, since the unburned fuel in the three-way catalyst is immediately burned as the catalyst temperature increases, there is an increasing possibility that thermal degradation in the three-way catalyst may occur as the catalyst temperature increases. Accordingly, even in the standard amplitude $\Delta A/Fst$ which is read out from the map of FIG. 10(A) in response to the air intake amount Ga, there is a possibility that thermal degradation in the three-way catalyst may occur in response to the catalyst temperature when the air/fuel ratio of the air/fuel mixture becomes leaner than the theoretical air/fuel ratio or becomes richer than the theoretical air/fuel ratio. Therefore, in the second embodiment, the upper limit value of the amplitude of the air/fuel ratio which does not cause thermal degradation in the three-way catalyst in consideration of the catalyst temperature is obtained in advance by an experiment or the like in response to the catalyst temperature, and the ECU 70 stores the upper limit value as the target amplitude upper limit value $\Delta A/Fstg$ in the form of a map of a function of the catalyst temperature Tc as illustrated in FIG. 10(B). Here, as understood from FIG. 10(B), the target amplitude upper limit value $\Delta A/Fstg$ which is stored in this way takes a comparatively large given value when the catalyst temperature Tc is lower than the certain temperature Tcth, and takes a small value as the catalyst temperature Tc increases when the catalyst temperature Tc is higher than the certain temperature Tcth.

Then, in the stoichiometric control of the second embodiment, the standard amplitude $\Delta A/Fst$ in response to the air intake amount Ga is read out from the map of FIG. 10(A), and the catalyst temperature Tc in response to the target amplitude upper limit value $\Delta A/Fstg$ is read out from the map of FIG. 10(B). Then, the standard amplitude $\Delta A/Fst$ and the target amplitude upper limit value $\Delta A/Fstg$ are compared with each other. When the standard amplitude is smaller than the target amplitude upper limit value, the standard amplitude $\Delta A/Fst$ read out from the map of FIG. 10(A) is directly set as the target amplitude, and the standard fuel injection amount Qbst calculated as described above is corrected so that the set target amplitude is attained. Specifically, when the air/fuel ratio of the air/fuel mixture is richer than the theoretical air/fuel ratio, the standard fuel injection amount Qbst calculated as described above decreases so as to attain the target amplitude $T\Delta A/Fst$. When the air/fuel ratio of the air/fuel mixture is leaner than the theoretical air/fuel ratio, the standard fuel injection amount Qbst calculated as described above increases so as to attain the target amplitude $T\Delta A/Fst$. Then, the standard fuel injection amount corrected in this way is set as the target fuel injection amount, and the operation of the fuel injection valve is controlled so that fuel of the target fuel injection amount is injected from the fuel injection valve 39.

On the other hand, when the standard amplitude $\Delta A/Fst$ read out from the map of FIG. 10(A) is larger than the target amplitude upper limit value $\Delta A/Fstg$ read out from the map of FIG. 10(B), the target amplitude upper limit value $\Delta A/Fstg$ read out from the map of FIG. 10(B) is set as the target amplitude, and the standard fuel injection amount Gbst calculated as described above is corrected so as to attain the set target amplitude. Specifically, when the air/fuel ratio of the air/fuel mixture is richer than the theoretical air/fuel ratio, the standard fuel injection amount Qbst calculated as described above decreases so as to attain the target amplitude $T\Delta A/Fstg$. When the air/fuel ratio of the air/fuel mixture is leaner than the theoretical air/fuel ratio, the standard fuel injection amount Qbst calculated as described above increases so as to attain the target amplitude $T\Delta A/Fstg$. Then, the standard fuel injection amount corrected in this way is set as the target fuel injection amount, and the operation of the fuel injection valve is controlled so that fuel of the target fuel injection amount is injected from the fuel injection valve 39.

In this way, since the amount of fuel which is injected from the fuel injection valve 39 is controlled in response to the air intake amount and the catalyst temperature (the temperature of the three-way catalyst 52), thermal degradation in the three-way catalyst is suppressed.

Furthermore, the concept of correcting the standard fuel injection amount so as to attain the target amplitude in this way may be applied to the case of the first embodiment described above. That is, the concept may be applied to the case where the air/fuel ratio of the air/fuel mixture is maintained so as to be leaner than the theoretical air/fuel ratio for a given period when the period during which the air/fuel ratio detected by the downstream air/fuel ratio sensor is richer than the theoretical air/fuel ratio is comparatively long and the air/fuel ratio of the air/fuel mixture is maintained so as to be leaner than the theoretical air/fuel ratio for a given period when the period during which the air/fuel ratio detected by the downstream air/fuel ratio sensor is richer than the theoretical air/fuel ratio is comparatively long.

Figure 11:
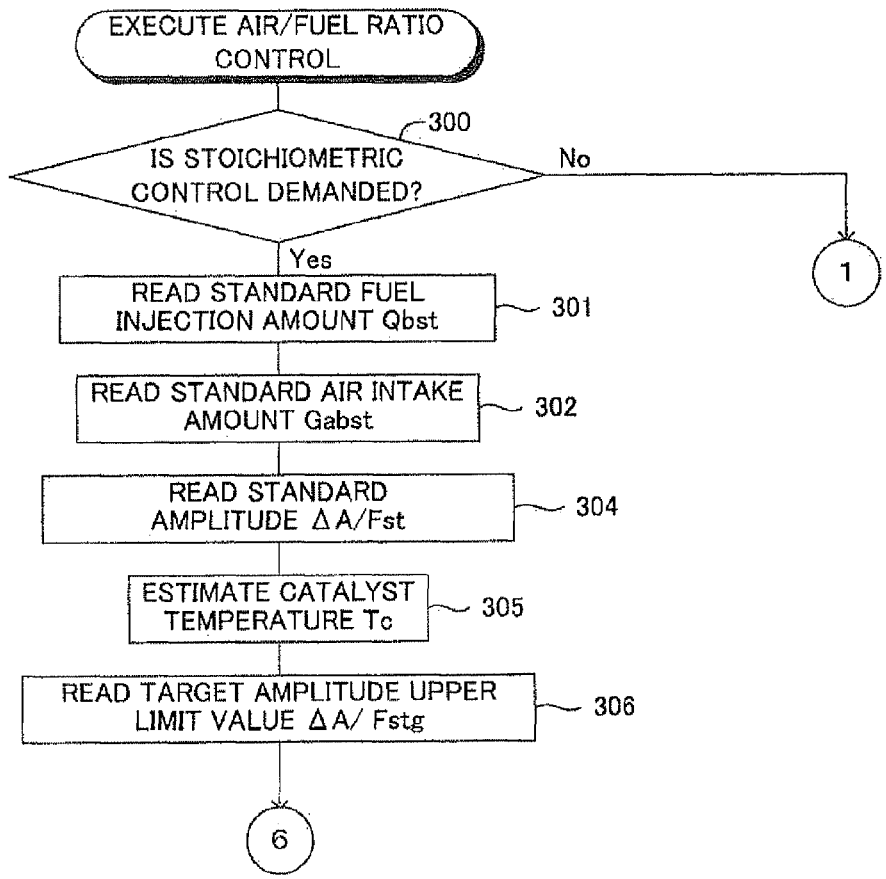
FIGS. 11 and 12 are diagrams partly illustrating an example of a flowchart which executes air/fuel ratio control according to a second embodiment.
Figure 12:
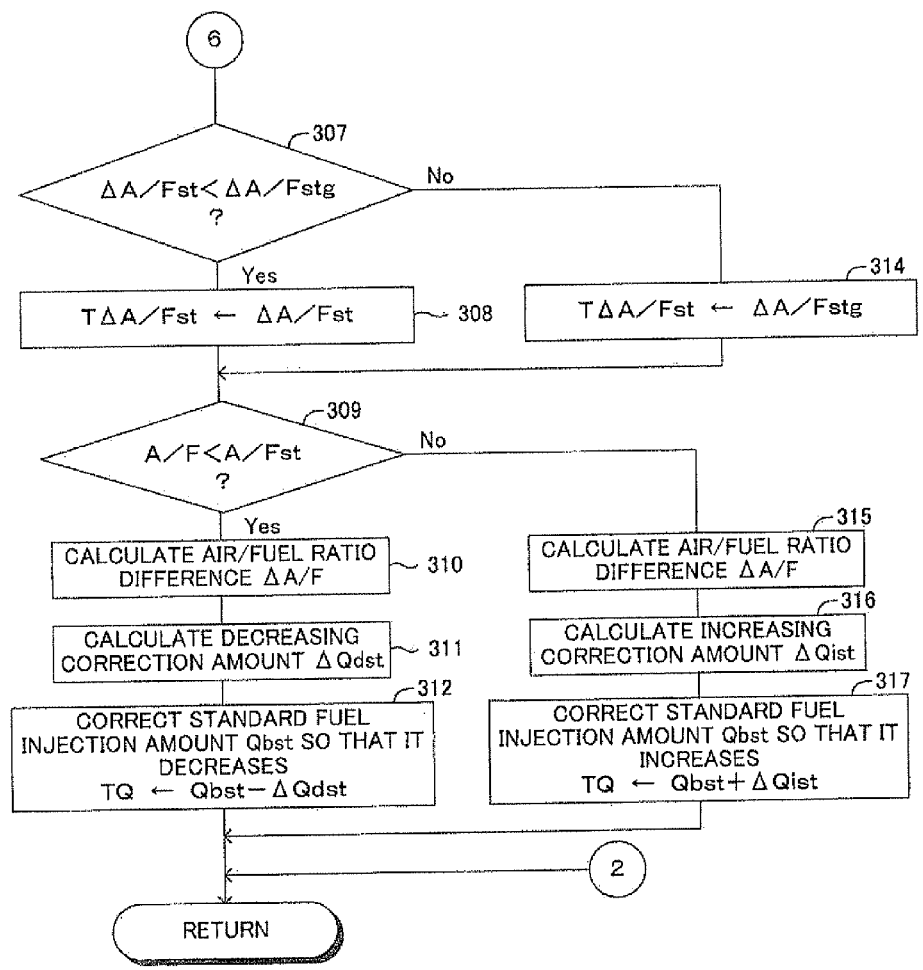

Next, an example of a flowchart which executes the control of the air/fuel ratio of the air/fuel mixture according to the second embodiment will be described. In the control of the air/fuel ratio of the air/fuel mixture of the second embodiment, the flowcharts of FIGS. 11, 12, and 5 are used. Furthermore, since the flowchart of FIG. 5 has been already described, the description thereof will not be repeated.

When the routine of FIG. 11 is started, first, in step 300, it is determined whether the execution of the stoichiometric control is demanded. Here, when it is determined that the execution of the stoichiometric control is demanded, the routine proceeds to step 301 and the steps thereafter, and the stoichiometric control is executed. On the other hand, when it is determined that the execution of the stoichiometric control is not demanded, the routine proceeds to step 113 and the steps thereafter of FIG. 5, and control in which the air/fuel ratio of the air/fuel mixture is controlled to be the air/fuel ratio richer than the theoretical air/fuel ratio (rich control) is executed or control in which the injection of fuel from the fuel injection valve 39 is stopped, that is, the fuel injection amount becomes zero (fuel cut control) is executed.

In step 300 of FIG. 11, when it is determined that the execution of the stoichiometric control is demanded and the routine proceeds to step 301, the air intake amount is calculated by multiplying the amount of air detected by the air flow meter 61 by the air intake amount calculating coefficient. Subsequently, in step 302, the amount of fuel to be injected from the fuel injection valve 39 is calculated as the standard fuel injection amount Qbst so that the air/fuel ratio of the air/fuel mixture becomes the theoretical air/fuel ratio based on the air intake amount calculated in step 301. Subsequently, in step 304, the standard amplitude ΔA/Fst in response to the air intake amount Ga calculated in step 301 is read out from the map of FIG. 10(A). Subsequently, in step 305, the catalyst temperature (the temperature of the three-way catalyst 52) Tc is estimated. Subsequently, in step 306, the target amplitude upper limit value ΔA/Fstg in response to the catalyst temperature Tc estimated in step 305 is read out from the map of FIG. 10(B). Subsequently, in step 307 of FIG. 12, it is determined whether the standard amplitude ΔA/Fst read out in step 304 of FIG. 11 is smaller than the target amplitude upper limit value ΔA/Fstg read out in step 306 of FIG. 11 (ΔA/Fst<ΔA/Fstg). Here, when it is determined that the relation of ΔA/Fst<ΔA/Fstg is established, the routine proceeds to step 308, the standard amplitude ΔA/Fst read out in step 304 of FIG. 11 is input to the target amplitude TΔA/Fst, and the routine proceeds to step 309. On the other hand, when it is determined that the relation of ΔA/Fst≥ΔA/Fstg is established, the routine proceeds to step 314, the target amplitude upper limit value ΔA/Fstg read out in step 306 of FIG. 11 is input to the target amplitude TΔA/Fst, and the routine proceeds to step 309.

when step 308 or step 314 of FIG. 12 is executed and the routine proceeds to step 309, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 310 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 315 and the steps thereafter, and a process which allows the air/fuel ratio of the air/fuel mixture to be richer than the theoretical air/fuel ratio is executed.

In step 309 of FIG. 12, when it is determined that the relation of A/F<A/Fst is established, that is, the air/fuel ratio of the air/fuel mixture is richer than the theoretical air/fuel ratio and the routine proceeds to step 310, a difference between the air/fuel ratio of the air/fuel mixture and the theoretical air/fuel ratio (air/fuel ratio difference) ΔA/F is calculated. Subsequently, in step 311, an amount which decreases the standard fuel injection amount Qbst calculated in step 302 of FIG. 11 (decreasing correction amount) ΔQdst is calculated so that the air/fuel ratio of the air/fuel mixture becomes leaner than the theoretical air/fuel ratio and the target amplitude TΔA/Fst set in step 308 or step 314 is attained in consideration of the target amplitude TΔA/Fst set in step 308 or step 314 and the air/fuel ratio difference ΔA/F calculated in step 310. Subsequently, in step 312, the standard fuel injection amount Qbst calculated in step 302 of FIG. 11 decreases by the decreasing correction amount ΔQdst calculated in step 311 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 312 of FIG. 12 is injected from the fuel injection valve 39. Accordingly, since only oxygen of an amount which does not cause thermal degradation in the three-way catalyst in response to the air intake amount and the catalyst temperature (the temperature of the three-way catalyst 52) flows into the three-way catalyst, thermal degradation in the three-way catalyst is suppressed.

On the other hand, in step 309 of FIG. 12, when it is determined that the relation of A/F≥A/Fst is established, that is, the air/fuel ratio of the air/fuel mixture is leaner than the theoretical air/fuel ratio and the routine proceeds to step 315, a difference between the air/fuel ratio of the air/fuel mixture and the theoretical air/fuel ratio (air/fuel ratio difference) ΔA/F is calculated. Subsequently, in step 316, an amount which increases the standard fuel injection amount Qbst calculated in step 302 of FIG. 11 (increasing correction amount) ΔQist is calculated so that the air/fuel ratio of the air/fuel mixture becomes richer than the theoretical air/fuel ratio and the target amplitude TΔA/Fst set in step 308 or step 314 is attained in consideration of the target amplitude TΔA/Fst set in step 308 or step 314 and the air/fuel ratio difference ΔA/F calculated in step 315. Subsequently, in step 317, the standard fuel injection amount Qbst calculated in step 302 of FIG. 11 increases by the increasing correction amount ΔQist calculated in step 316 (Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 317 of FIG. 12 is injected from the fuel injection valve 39. Accordingly, since only unburned fuel of an amount which does not cause thermal degradation in the three-way catalyst flows into the three-way catalyst in response to the air intake amount and the catalyst temperature (the temperature of the three-way catalyst 52), thermal degradation in the three-way catalyst is suppressed.

Next, another example of a flowchart which executes the control of the air/fuel ratio of the air/fuel mixture according to the second embodiment will be described. In this example, the flowcharts of FIGS. 13 to 15 and 5 are used. Furthermore, since the flowchart of FIG. 5 has been already described, the description thereof will not be repeated.

Figure 13:
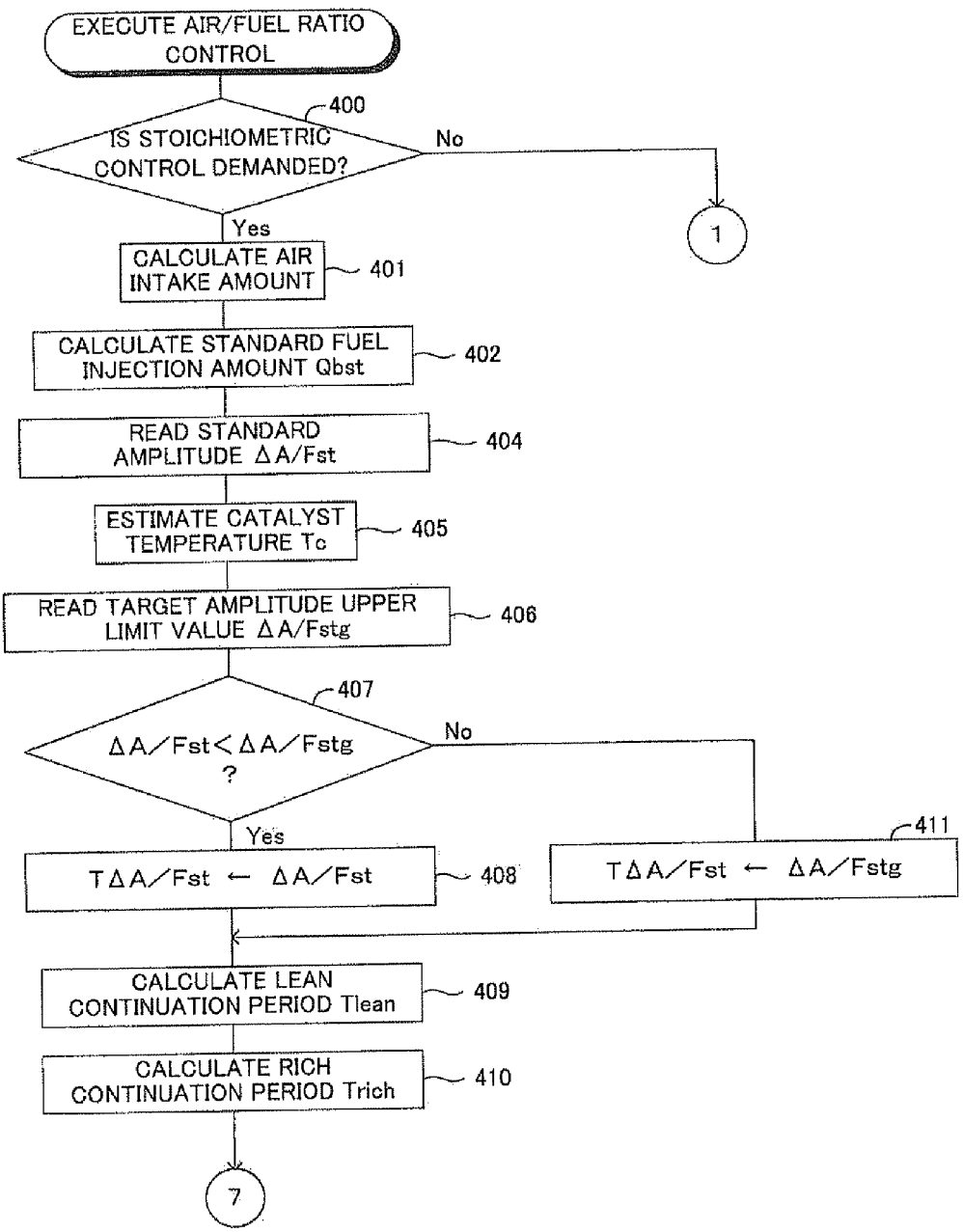
FIGS. 13 to 15 are diagrams partly illustrating another example of a flowchart which executes the air/fuel ratio control according to the second embodiment.

When the routine of FIG. 13 is started, first, in step 400, it is determined whether the execution of the stoichiometric control is demanded. Here, when it is determined that the execution of the stoichiometric control is demanded, the routine proceeds to step 401 and the steps thereafter. On the other hand, when it is determined that the execution of the stoichiometric control is not demanded, the routine proceeds to step 113 and the steps thereafter of FIG. 5 and the rich control is executed or the fuel cut control is executed.

In step 400 of FIG. 13, when it is determined that the execution of the stoichiometric control is demanded and the routine proceeds to step 401, the air intake amount is calculated by multiplying the amount of air detected by the air flow meter 61 by the air intake amount calculating coefficient. Subsequently, in step 402, the amount of fuel to be injected from the fuel injection valve 39 is calculated as the standard fuel injection amount Qbst so that the air/fuel ratio of the air/fuel mixture becomes the theoretical air/fuel ratio based on the air intake amount calculated in step 401. Subsequently, in step 404, the standard amplitude ΔA/Fst in response to the air intake amount Ga calculated in step 401 is read out from the map of FIG. 10(A). Subsequently, in step 405, the catalyst temperature (the temperature of the three-way catalyst 52) Tc is estimated. Subsequently, in step 406, the target amplitude upper limit value ΔA/Fstg in response to the catalyst temperature Tc estimated in step 405 is read out from the map of FIG. 10(B). Subsequently, in step 407, it is determined whether the standard amplitude ΔA/Fst read out in step 404 is smaller than the target amplitude upper limit value ΔA/Fstg read out in step 406 (ΔA/Fst<ΔA/Fstg). Here, when it is determined that the relation of ΔA/Fst<ΔA/Fstg is established, the routine proceeds to step 408, the standard amplitude ΔA/Fst read out in step 404 is input to the target amplitude TΔA/Fst, and the routine proceeds to step 409. On the other hand, when it is determined that the relation of ΔA/Fst≥ΔA/Fstg is established, the routine proceeds to step 411, the target amplitude upper limit value ΔA/Fstg read out in step 406 is input to the target amplitude TΔA/Fst, and the routine proceeds to step 409.

When step 408 or step 411 of FIG. 13 is executed and the routine proceeds to step 409, the period during which the downstream air/fuel ratio sensor 54 keeps detecting the air/fuel ratio leaner than the theoretical air/fuel ratio (the lean continuation period) Tlean is calculated. Subsequently, in step 410, the period during which the downstream air/fuel ratio sensor keeps detecting the air/fuel ratio richer than the theoretical air/fuel ratio (the rich continuation period) Trich is calculated. Subsequently, in step 412 of FIG. 14, it is determined whether the lean continuation period Tlean calculated in step 409 of FIG. 13 is shorter than a predetermined period Tth (Tlean<Tth). Here, when it is determined that the relation of Tlean<Tth is established, the routine proceeds to step 413. On the other hand, when it is determined that the relation of Tlean≥Tth is established, the routine proceeds to step 428 of FIG. 15.

Figure 14:
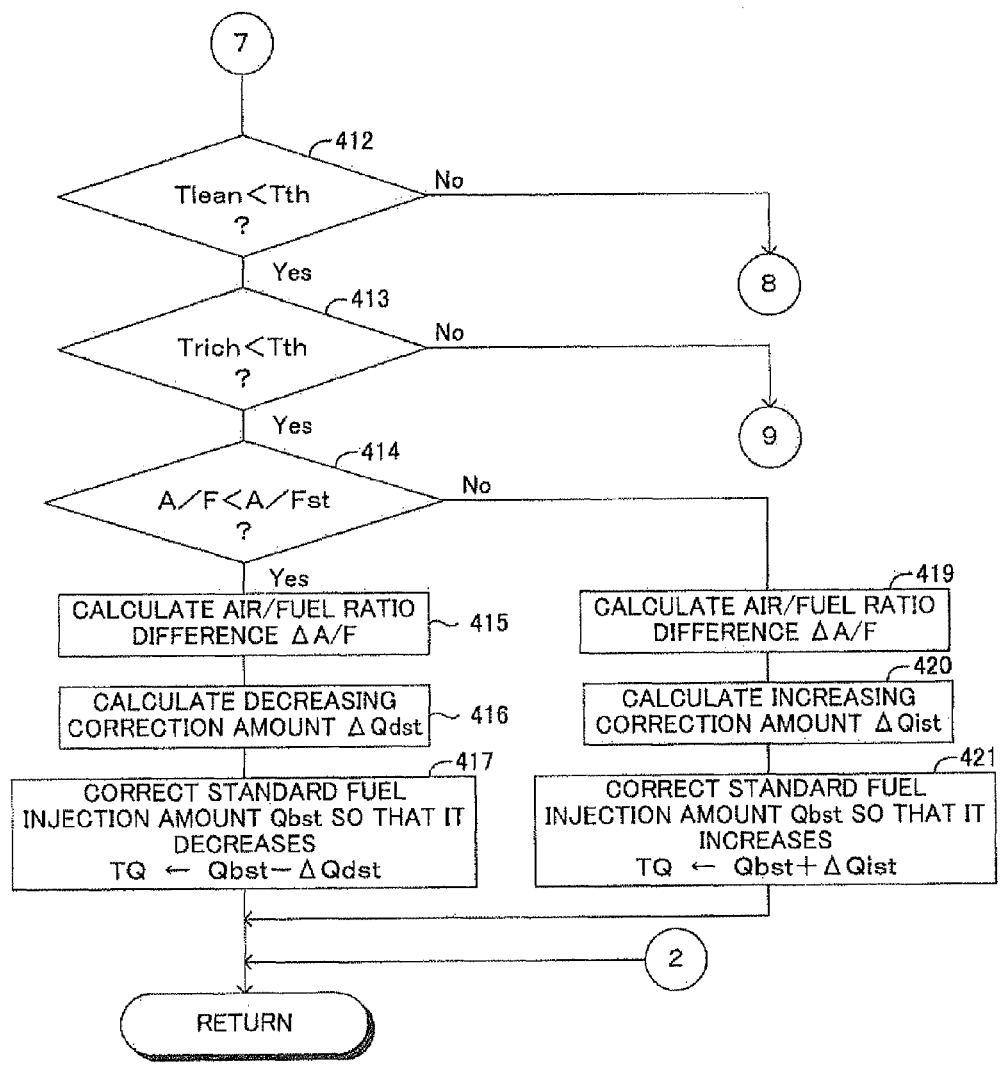

In step 412 of FIG. 14, when it is determined that the relation of Tlean<Tth is established, that is, the lean continuation period is shorter than a predetermined period and the routine proceeds to step 413, it is determined whether the rich continuation period Trich calculated in step 410 of FIG. 13 is shorter than a predetermined period Tth (Trich<Tth). Here, when it is determined that the relation of Trich<Tth is established, the routine proceeds to step 422 of FIG. 15. On the other hand, when it is determined that the relation of Trich≥Tth is established, the routine proceeds to step 414.

When it is determined that the relation of Tlean<Tth is established in step 412 of FIG. 14, the relation of Trich<Tth is established in step 413 of FIG. 14, that is, the lean continuation period and the rich continuation period are shorter than a predetermined period, and the routine proceeds to step 414, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 415 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 419 and the steps thereafter, and a process which allows the air/fuel ratio of the air/fuel mixture to be richer than the theoretical air/fuel ratio is executed.

In step 414 of FIG. 14, when it is determined that the relation of A/F<A/Fst is established, that is, the air/fuel ratio of the air/fuel mixture is richer than the theoretical air/fuel ratio and the routine proceeds to step 415, a difference between the air/fuel ratio of the air/fuel mixture and the theoretical air/fuel ratio (air/fuel ratio difference) ΔA/F is calculated. Subsequently, in step 416, an amount which decreases the standard fuel injection amount Qbst calculated in step 402 of FIG. 13 (decreasing correction amount) ΔQdst is calculated so that the air/fuel ratio of the air/fuel mixture becomes leaner than the theoretical air/fuel ratio and the target amplitude TΔA/Fst set in step 408 or step 411 is attained in consideration of the target amplitude TΔA/Fst set in step 408 or step 411 of FIG. 13 and the air/fuel ratio difference ΔA/F calculated in step 415. Subsequently, in step 417, the standard fuel injection amount Qbst calculated in step 402 of FIG. 13 decreases by the decreasing correction amount ΔQdst calculated in step 416 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 417 of FIG. 14 is injected from the fuel injection valve 39. Accordingly, since only oxygen of an amount which does not cause thermal degradation in the three-way catalyst in response to the air intake amount and the catalyst temperature (the temperature of the three-way catalyst 52) flows into the three-way catalyst, thermal degradation in the three-way catalyst is suppressed.

On the other hand, when it is determined that the relation of A/F≥A/Fst is established in step 414 of FIG. 14, that is, the air/fuel ratio of the air/fuel mixture is leaner than the theoretical air/fuel ratio and the routine proceeds to step 419, a difference between the air/fuel ratio of the air/fuel mixture and the theoretical air/fuel ratio (air/fuel ratio difference) ΔA/F is calculated. Subsequently, in step 420, an amount which increases the standard fuel injection amount Qbst calculated in step 402 of FIG. 13 (increasing correction amount) ΔQist is calculated so that the air/fuel ratio of the air/fuel mixture becomes richer than the theoretical air/fuel ratio and the target amplitude TΔA/Fst set in step 408 or step 411 is attained in consideration of the target amplitude TΔA/Fst set in step 408 or step 411 and the air/fuel ratio difference ΔA/F calculated in step 419. Subsequently, in step 421, the standard fuel injection amount Qbst calculated in step 402 of FIG. 13 increases by the increasing correction amount ΔQist calculated in step 420 (Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 421 of FIG. 14 is injected from the fuel injection valve 39. Accordingly, since only unburned fuel of an amount which does not cause thermal degradation in the three-way catalyst flows into the three-way catalyst in response to the air intake amount and the catalyst temperature (the temperature of the three-way catalyst 52), thermal degradation in the three-way catalyst is suppressed.

Figure 15:
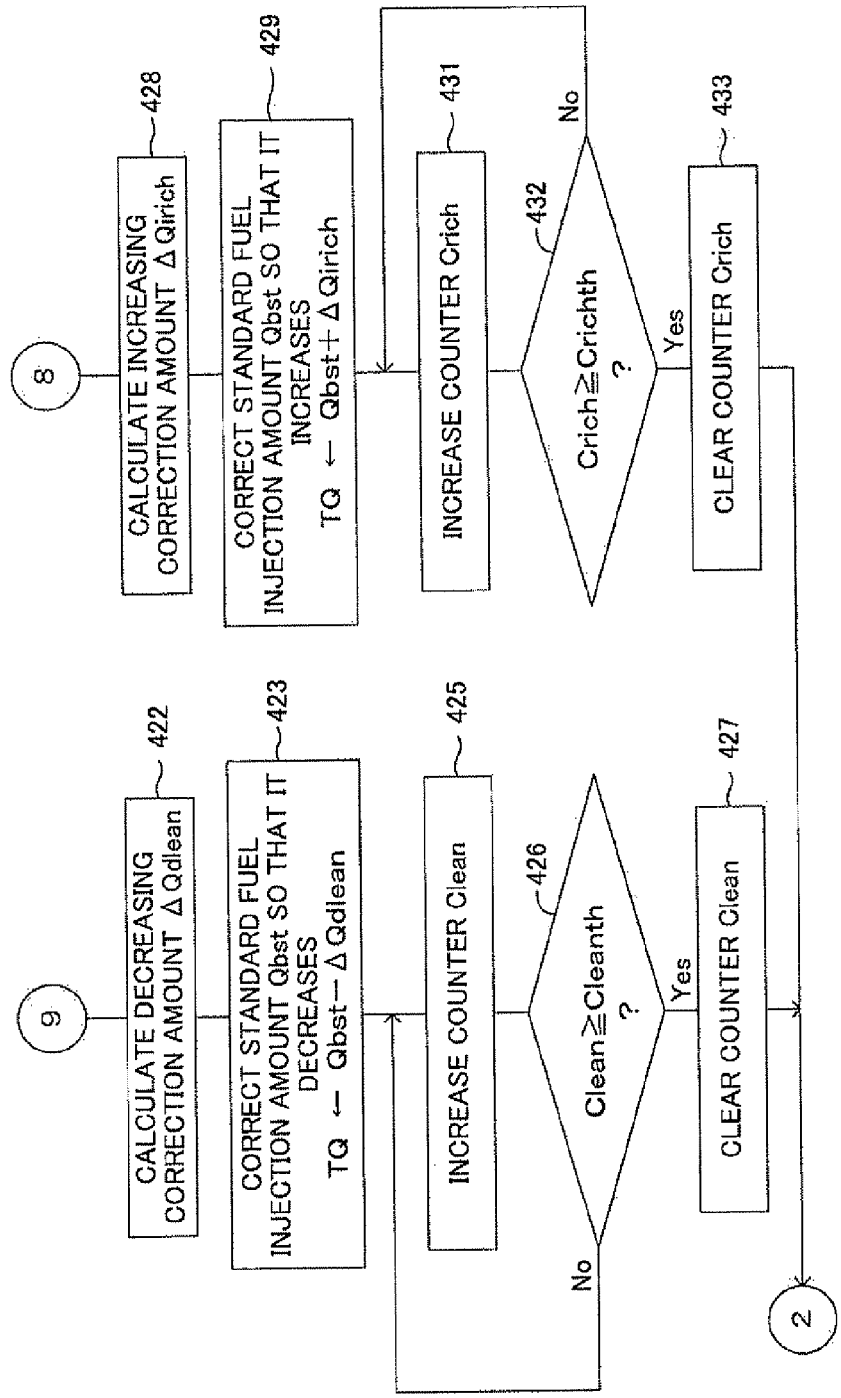

On the other hand, in step 412 of FIG. 14, when it is determined that the relation of Tlean≥Tth is established, that is, the lean continuation period is longer than or equal to a predetermined period and the routine proceeds to step 428 of FIG. 15, an amount which increases the standard fuel injection amount Qbst calculated in step 402 of FIG. 13 (increasing correction amount) ΔQirich is calculated so that the air/fuel ratio of the air/fuel mixture becomes richer than the theoretical air/fuel ratio and the target amplitude TΔA/Fst set in step 408 or step 411 of FIG. 13 is attained. Subsequently, in step 429, the standard fuel injection amount Qbst calculated in step 402 increases by the increasing correction amount ΔQirich calculated in step 428 (Qbst+ΔQirich), and the increased standard fuel injection amount is input to the target fuel injection amount TQ. Subsequently, in step 431, the counter Crich which represents the period during which the air/fuel ratio of the air/fuel mixture is maintained so as to be richer than the theoretical air/fuel ratio increases. Subsequently, in step 432, it is determined whether the counter Crich which increases in step 431 is larger than or equal to a predetermined value Crichth (Crich≥Crichth). Here, when it is determined that the relation of Crich<Crichth is established, the routine returns to step 431, and the counter Crich further increases. On the other hand, when it is determined that the relation of Crich≥Crichth is established, the routine proceeds to step 433, the counter Crich is cleared, and the routine is ended.

That is, at this time, in step 432, the operation of the fuel injection valve is continuously controlled so that fuel of the target fuel injection amount TQ set in step 429 is injected from the fuel injection valve 39 until the counter Crich becomes larger than or equal to the predetermined value Crichth. Accordingly, oxygen which is larger than or equal to the necessary amount and is absorbed to the three-way catalyst 52 is discharged, the oxygen absorbing ability of the three-way catalyst is recovered, and only unburned fuel of an amount which does not cause thermal degradation in the three-way catalyst flows into the three-way catalyst in response to the catalyst temperature (the temperature of the three-way catalyst), thermal degradation in the three-way catalyst is suppressed.

On the other hand, in step 413 of FIG. 14, when it is determined that the relation of Trich≥Tth is established, that is, the rich continuation period is longer than or equal to a predetermined period and the routine proceeds to step 422 of FIG. 15, an amount which decreases the standard fuel injection amount Qbst calculated in step 402 of FIG. 13 (decreasing correction amount) ΔQdlean is calculated so that the air/fuel ratio of the air/fuel mixture becomes leaner than the theoretical air/fuel ratio and the target amplitude TΔA/Fst set in step 408 or step 411 of FIG. 13 is attained. Subsequently, in step 423, the standard fuel injection amount Qbst calculated in step 402 decreases by the decreasing correction amount ΔQdlean calculated in step 422 (Qbst−ΔQdlean), and the decreased standard fuel injection amount is input to the target fuel injection amount TQ. Subsequently, in step 425, the counter Clean which represents the period during which the air/fuel ratio of the air/fuel mixture is maintained so as to be leaner than the theoretical air/fuel ratio increases. Subsequently, in step 426, it is determined whether the counter Clean which increases in step 425 is larger than or equal to the predetermined value Cleanth (Clean≥Cleanth). Here, when it is determined that the relation of Clean<Cleanth is established, the routine returns to step 425, and the counter Clean further increases. On the other hand, when it is determined that the relation of Clean≥Cleanth is established, the routine proceeds to step 427, the counter Clean is cleared, and the routine is ended.

That is, at this time, in step 426, the operation of the fuel injection valve is continuously controlled so that fuel of the target fuel injection amount TQ set in step 423 is injected from the fuel injection valve 39 until the counter Clean becomes larger than or equal to the predetermined value Cleanth. Accordingly, the three-way catalyst 52 absorbs a sufficient amount of oxygen, the oxygen discharging ability of the three-way catalyst is recovered, and only oxygen of an amount which does not cause thermal degradation in the three-way catalyst flows into the three-way catalyst in response to the catalyst temperature (the temperature of the three-way catalyst), thermal degradation in the three-way catalyst is suppressed.

Furthermore, as described in the first embodiment, when the air/fuel mixture leaner than the theoretical air/fuel ratio and the air/fuel ratio richer than the theoretical air/fuel ratio are alternately formed in the combustion chamber 25 so that the exhaust gas leaner than the theoretical air/fuel ratio and the exhaust gas richer than the theoretical air/fuel ratio alternately flow into the three-way catalyst 52, the high purification performance of the three-way catalyst is maintained. Here, in general, as the amplitude of the air/fuel ratio, that is, the amplitude in which the air/fuel ratio of the air/fuel mixture is alternately repeated as the air/fuel ratio leaner than the theoretical air/fuel ratio and the air/fuel ratio richer than the theoretical air/fuel ratio with respect to the theoretical air/fuel ratio increases, the high purification performance of the three-way catalyst is maintained. Accordingly, in consideration of this view point, in the stoichiometric control of the first embodiment and the second embodiment, since the amplitude of the air/fuel ratio decreases in response to the catalyst temperature, it may be supposed that the purification performance of the three-way catalyst decreases by the decreasing amount. However, in general, the purification performance of the three-way catalyst becomes higher as the catalyst temperature becomes higher. Then, in the stoichiometric control of the first embodiment and the second embodiment, the amplitude of the air/fuel ratio becomes smaller as the catalyst temperature becomes higher. Accordingly, in the first embodiment and the second embodiment, since the amplitude of the air/fuel ratio decreases when the catalyst temperature is high and the purification performance of the three-way catalyst is high, the sufficiently high purification performance of the three-way catalyst is maintained.

Further, in the first embodiment, the amplitude of the air/fuel ratio of the air/fuel mixture is controlled in response to the catalyst temperature in the stoichiometric control in which the air/fuel ratio of the air/fuel mixture is controlled to be the theoretical air/fuel ratio. Then, in the second embodiment, the amplitude of the air/fuel ratio of the air/fuel mixture is controlled in response to the air intake amount and the catalyst temperature in the stoichiometric control in which the air/fuel ratio of the air/fuel mixture is controlled to be the theoretical air/fuel ratio. However, the concept of setting the amplitude of the air/fuel ratio in the stoichiometric control of the first embodiment or the second embodiment may be applied to the control in which the air/fuel ratio of the air/fuel mixture is controlled to be the air/fuel ratio richer than the theoretical air/fuel ratio. That is, in the control in which the air/fuel ratio of the air/fuel mixture is controlled to be leaner than the target rich air/fuel ratio and to be leaner than the theoretical air/fuel ratio when the air/fuel ratio as a target becomes the air/fuel ratio richer than the theoretical air/fuel ratio (hereinafter, the air/fuel ratio will be referred to as a target rich air/fuel ratio) and the air/fuel ratio of the air/fuel mixture is richer than the target rich air/fuel ratio, and the air/fuel ratio of the air/fuel mixture is controlled to be richer than the target rich air/fuel ratio and to be richer than the theoretical air/fuel ratio when the air/fuel ratio of the air/fuel mixture is leaner than the target rich air/fuel ratio, the concept of setting the amplitude in the stoichiometric control of the first embodiment or the second embodiment may be also applied to the setting of the amplitude in which the air/fuel ratio of the air/fuel mixture is alternately repeated as the air/fuel ratio leaner than the target rich air/fuel ratio by a given degree and the air/fuel ratio richer than the target rich air/fuel ratio by a given degree with respect to the target rich air/fuel ratio.

Further, the concept of setting the amplitude of the air/fuel ratio of the air/fuel mixture in the stoichiometric control of the first embodiment or the second embodiment may be applied to the control in which the air/fuel ratio of the air/fuel mixture is controlled to be the air/fuel ratio leaner than the theoretical air/fuel ratio. That is, in the control in which the air/fuel ratio of the air/fuel mixture is controlled to be leaner than the target lean air/fuel ratio and to be leaner than the theoretical air/fuel ratio when the air/fuel ratio as a target becomes the air/fuel ratio leaner than the theoretical air/fuel ratio (hereinafter, the air/fuel ratio will be referred to as a target lean air/fuel ratio) and the air/fuel ratio of the air/fuel mixture is richer than the target lean air/fuel ratio, and the air/fuel ratio of the air/fuel mixture is controlled to be richer than the target lean air/fuel ratio and to be richer than the theoretical air/fuel ratio when the air/fuel ratio of the air/fuel mixture is leaner than the target lean air/fuel ratio, the concept of setting the amplitude of the air/fuel ratio of the air/fuel mixture in the stoichiometric control of the first embodiment or the second embodiment may be also applied to the setting of the amplitude in which the air/fuel ratio of the air/fuel mixture is alternately repeated as the air/fuel ratio leaner than the target lean air/fuel ratio by a given amount and the air/fuel ratio richer than the target lean air/fuel ratio by a given amount with respect to the target lean air/fuel ratio.

Further, the first embodiment and the second embodiment relate to the setting of the amplitude of the air/fuel ratio of the air/fuel mixture in the stoichiometric control in which the air/fuel mixture leaner than the theoretical air/fuel ratio and the air/fuel mixture richer than the theoretical air/fuel ratio are alternately formed in the combustion chamber in order to maintain the high purification performance of the three-way catalyst by exhibiting the oxygen absorbing and discharging ability of the three-way catalyst. However, the concept of setting the amplitude of the air/fuel ratio of the air/fuel mixture of the first embodiment and the second embodiment may be also applied to the case where the air/fuel mixture leaner than the theoretical air/fuel ratio and the air/fuel mixture richer than the theoretical air/fuel ratio are alternately formed in the combustion chamber for a specific purpose.

Further, in the stoichiometric control of the first embodiment, the amplitude of the air/fuel ratio of the air/fuel mixture which is normally set in response to the catalyst temperature regardless of the catalyst temperature (the temperature of the three-way catalyst) is used as the target amplitude. However, only when the catalyst temperature is higher than a certain temperature, the amplitude of the air/fuel ratio of the air/fuel mixture set in response to the catalyst temperature may be used, and when the catalyst temperature is lower than the certain temperature, the amplitude of the air/fuel ratio of the air/fuel mixture set by parameters other than the catalyst temperature may be used.

Further, in the stoichiometric control of the first embodiment, the amplitude of the air/fuel ratio of the air/fuel mixture which is set in response to the catalyst temperature (the temperature of the three-way catalyst) is set to a value which becomes smaller as the catalyst temperature becomes higher except for the case where the catalyst temperature is lower than the comparatively low certain temperature. However, when the catalyst temperature is higher than the comparatively low certain temperature and is lower than the comparatively high certain temperature, the amplitude of the air/fuel ratio of the air/fuel mixture is set as a comparatively large given amplitude. Then, when the catalyst temperature is higher than the comparatively high certain temperature, the amplitude of the air/fuel ratio of the air/fuel mixture may be set as a comparatively small given amplitude.

Further, in the stoichiometric control of the second embodiment, the amplitude of the air/fuel ratio of the air/fuel mixture which is set in response to the air intake amount is set to a value which becomes smaller as the air intake amount becomes larger except for the case where the air intake amount is smaller than the comparatively small certain amount. However, when the air intake amount is larger than the comparatively small certain amount and smaller than the comparatively large certain amount, the amplitude of the air/fuel ratio of the air/fuel mixture may be set as a comparatively large given amplitude, and when the air intake amount is larger than the comparatively large certain amount, the amplitude of the air/fuel ratio of the air/fuel mixture may be set as a comparatively small given amplitude.

Further, in the first embodiment, the amplitude of the air/fuel ratio which is normally set in response to the catalyst temperature during the stoichiometric control regardless of the catalyst temperature (the temperature of the three-way catalyst) (the amplitude of the air/fuel ratio when the air/fuel ratio of the air/fuel mixture is alternately repeated as the air/fuel ratio leaner than the theoretical air/fuel ratio and the air/fuel ratio richer than the theoretical air/fuel ratio with respect to the theoretical air/fuel ratio) is set as the target amplitude. However, during the stoichiometric control, only when the catalyst temperature is higher than a predetermined temperature, the target amplitude may be set according to the first embodiment, and when the catalyst temperature is lower than a predetermined temperature, the amplitude of a given value may be set as the target amplitude regardless of the catalyst temperature.

Further, even in the second embodiment, during the stoichiometric control, the amplitude of the air/fuel ratio is normally set in response to the air intake amount regardless of the catalyst temperature, the amplitude of the air/fuel ratio is set in response to the catalyst temperature, and any one of the amplitudes is set as the target amplitude. However, during the stoichiometric control, only when the catalyst temperature is higher than a predetermined temperature, the target amplitude may be set according to the second embodiment, and when the catalyst temperature is lower than a predetermined temperature, the amplitude of a given value may be set as the target amplitude regardless of the catalyst temperature.

Finally, an example of a flowchart which executes the control of the air/fuel ratio of the air/fuel mixture according to the embodiment (hereinafter, referred to as a third embodiment) will be described. In the air/fuel ratio of the air/fuel mixture control of the third embodiment, for example, the flowcharts of FIGS. 5 and 16 to 18 are used. Furthermore, since the flowchart of FIG. 5 has been already described, the description thereof will not be repeated.

Figure 16:
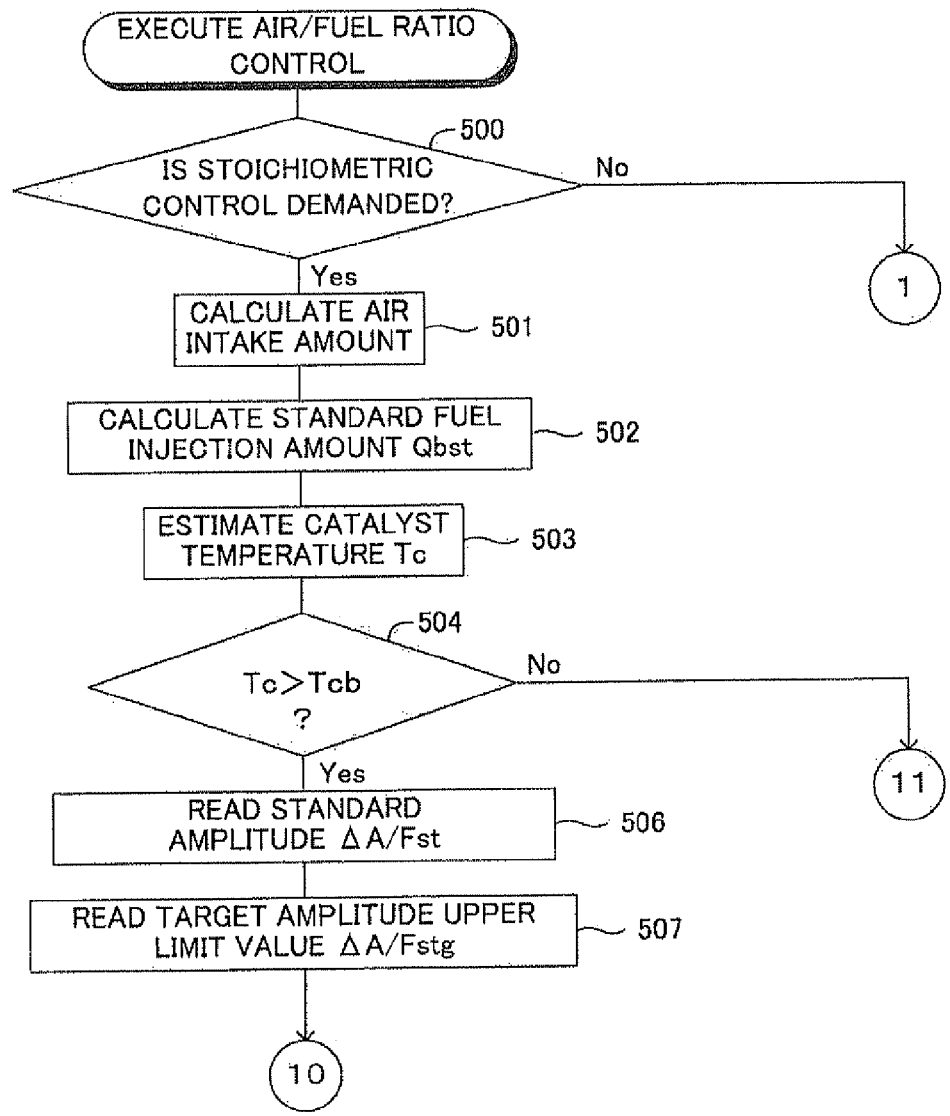
FIGS. 16 to 18 are diagrams partly illustrating an example of a flowchart which executes air/fuel ratio control according to a third embodiment.

When the routine of FIG. 16 is started, first, in step 500, it is determined whether the execution of the stoichiometric control is demanded. Here, when it is determined that the execution of the stoichiometric control is demanded, the routine proceeds to step 501 and the steps thereafter, and the stoichiometric control is executed. On the other hand, when it is determined that the execution of the stoichiometric control is not demanded, the routine proceeds to step 113 and the steps thereafter of FIG. 5, and control in which the air/fuel ratio of the air/fuel mixture is controlled to be richer than the theoretical air/fuel ratio (the rich control) is executed or control in which the injection of fuel from the fuel injection valve 39 is stopped, that is, the fuel injection amount becomes zero (the fuel cut control) is executed.

In step 500 of FIG. 16, when it is determined that the execution of the stoichiometric control is demanded and the routine proceeds to step 501, the air intake amount is calculated by multiplying the amount of air detected by the air flow meter 61 by the air intake amount calculating coefficient. Subsequently, in step 502, the amount of fuel to be injected from the fuel injection valve 39 is calculated as the standard fuel injection amount Qbst so that the air/fuel ratio of the air/fuel mixture becomes the theoretical air/fuel ratio based on the air intake amount calculated in step 501. Subsequently, in step 503, the catalyst temperature (the temperature of the three-way catalyst 52) Tc is estimated. Subsequently, in step 504, it is determined whether the catalyst temperature Tc estimated in step 503 is higher than a predetermined temperature Tcb (Tc>Tcb). Here, when it is determined that the relation of Tc>Tcb is established, the routine proceeds to step 506 and the steps thereafter. On the other hand, when it is determined that the relation of Tc≤Tcb is established, the routine proceeds to step 519 of FIG. 18.

In step 504 of FIG. 16, when it is determined that the relation of Tc>Tcb is established and the routine proceeds to step 506, the standard amplitude ΔA/Fst in response to the air intake amount Ga calculated in step 501 is read out from the map of FIG. 10(A). Subsequently, in step 507, the target amplitude upper limit value ΔA/Fstg in response to the catalyst temperature Tc estimated in step 503 is read out from the map of FIG. 10(B). Subsequently, in step 508 of FIG. 17, it is determined whether the standard amplitude ΔA/Fst read out in step 506 of FIG. 16 is smaller than the target amplitude upper limit value ΔA/Fstg read out in step 507 of FIG. 16 (ΔA/Fst<ΔA/Fstg). Here, when it is determined that the relation of ΔA/Fst<ΔA/Fstg is established, the routine proceeds to step 509, the standard amplitude ΔA/Fst read out in step 506 of FIG. 16 is input to the target amplitude TΔA/Fst, and the routine proceeds to step 510. On the other hand, when it is determined that the relation of ΔA/Fst≥ΔA/Fstg is established, the routine proceeds to step 515, the target amplitude upper limit value ΔA/Fstg read out in step 507 of FIG. 16 is input to the target amplitude TΔA/Fst, and the routine proceeds to step 510.

Figure 17:
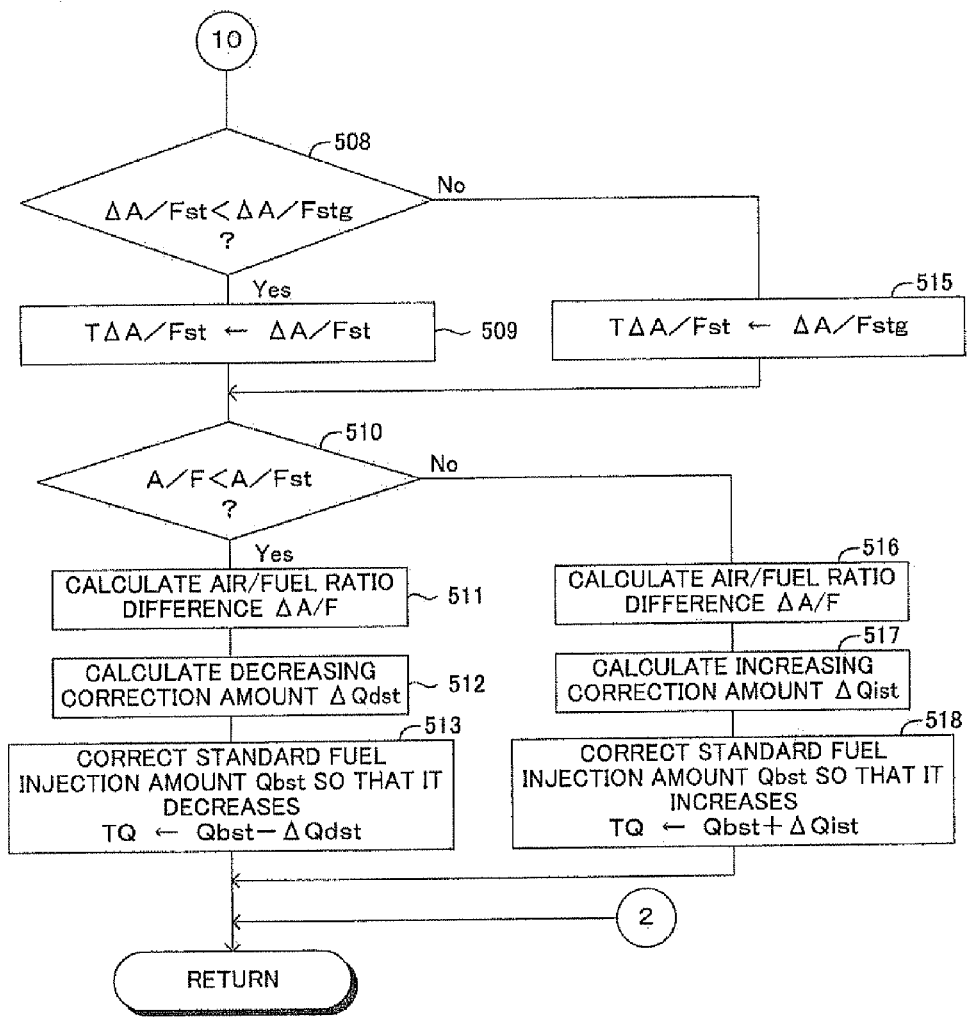

When step 509 or step 515 of FIG. 17 is executed and the routine proceeds to step 510, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 511 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 516 and the steps thereafter, and a process which allows the air/fuel ratio of the air/fuel mixture to be richer than the theoretical air/fuel ratio is executed.

In step 510 of FIG. 17, when it is determined that the relation of A/F<A/Fst is established, that is, the air/fuel ratio of the air/fuel mixture is richer than the theoretical air/fuel ratio and the routine proceeds to step 511, a difference between the air/fuel ratio of the air/fuel mixture and the theoretical air/fuel ratio (the air/fuel ratio difference) ΔA/F is calculated. Subsequently, in step 512, an amount which decreases the standard fuel injection amount Qbst calculated in step 502 of FIG. 16 (decreasing correction amount) ΔQdst is calculated so that the air/fuel ratio of the air/fuel mixture becomes leaner than the theoretical air/fuel ratio and the target amplitude TΔA/Fst set in step 509 or step 515 is attained in consideration of the target amplitude TΔA/Fst set in step 509 or step 515 and the air/fuel ratio difference ΔA/F calculated in step 511. Subsequently, in step 513, the standard fuel injection amount Qbst calculated in step 502 of FIG. 16 decreases by the decreasing correction amount ΔQdst calculated in step 512 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 513 of FIG. 17 is injected from the fuel injection valve 39. Accordingly, since only oxygen of an amount which does not cause thermal degradation in the three-way catalyst in response to the air intake amount and the catalyst temperature (the temperature of the three-way catalyst 52) flows into the three-way catalyst, thermal degradation in the three-way catalyst is suppressed.

On the other hand, in step 510 of FIG. 17, when it is determined that the relation of A/F≥A/Fst is established, that is, the air/fuel ratio of the air/fuel mixture is leaner than the theoretical air/fuel ratio and the routine proceeds to step 516, a difference between the air/fuel ratio of the air/fuel mixture and the theoretical air/fuel ratio (the air/fuel ratio difference) ΔA/F is calculated. Subsequently, in step 517, an amount which increases the standard fuel injection amount Qbst calculated in step 502 of FIG. 16 (increasing correction amount) ΔQist is calculated so that the air/fuel ratio of the air/fuel mixture becomes richer than the theoretical air/fuel ratio and the target amplitude TΔA/Fst set in step 509 or step 515 is attained in consideration of the target amplitude TΔA/Fst set in step 509 or step 515 and the air/fuel ratio difference ΔA/F calculated in step 516. Subsequently, in step 518, the standard fuel injection amount Qbst calculated in step 502 of FIG. 16 increases by the increasing correction amount ΔQist calculated in step 517 (Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 518 of FIG. 17 is injected from the fuel injection valve 39. Accordingly, since only unburned fuel of an amount which does not cause thermal degradation in the three-way catalyst flows into the three-way catalyst in response to the air intake amount and the catalyst temperature (the temperature of the three-way catalyst 52), thermal degradation in the three-way catalyst is suppressed.

Figure 18:
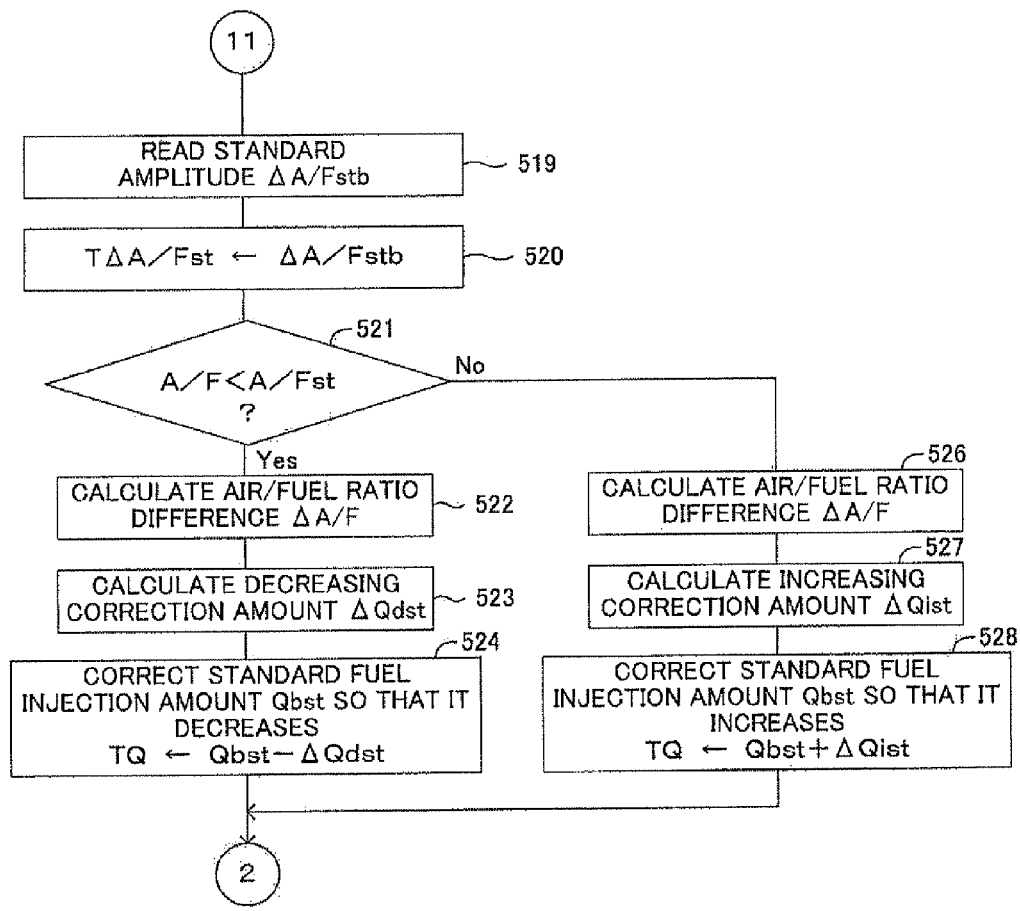

On the other hand, in step 504 of FIG. 16, when it is determined that the relation of Tc≤Tcb is established and the routine proceeds to step 519 of FIG. 18, the amplitude of the air/fuel ratio of the air/fuel mixture which is optimal in the stoichiometric control when the catalyst temperature Tc is lower than or equal to the predetermined temperature Tcb is read out as the standard amplitude ΔA/Fstb from the ECU 70. Here, with regard to the standard amplitude ΔA/Fstb, the amplitude of the air/fuel ratio of the air/fuel mixture which is optimal in the stoichiometric control when the catalyst temperature is lower than or equal to a predetermined temperature is obtained in advance by an experiment or the like, and the amplitude is stored as the standard amplitude in the ECU 70. In step 520 subsequent to step 519, the standard amplitude ΔA/Fstb read out in step 519 is input to the target amplitude TΔA/Fst. Subsequently, in step 521, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 522 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 526 and the steps thereafter, and a process which allows the air/fuel ratio of the air/fuel mixture to be richer than the theoretical air/fuel ratio is executed.

In step 521 of FIG. 18, when it is determined that the relation of A/F<A/Fst is established, that is, the air/fuel ratio of the air/fuel mixture is richer than the theoretical air/fuel ratio and the routine proceeds to step 522, a difference between the air/fuel ratio of the air/fuel mixture and the theoretical air/fuel ratio (the air/fuel ratio difference) Δis calculated. Subsequently, in step 523, an amount which decreases the standard fuel injection amount Qbst calculated in step 502 of FIG. 16 (decreasing correction amount) ΔQdst is calculated so that the air/fuel ratio of the air/fuel mixture becomes leaner than the theoretical air/fuel ratio and the target amplitude TΔA/Fst set in step 520 is attained in consideration of the target amplitude TΔA/Fst set in step 520 and the air/fuel ratio difference ΔA/F calculated in step 522. Subsequently, in step 524, the standard fuel injection amount Qbst calculated in step 502 of FIG. 16 decreases by the decreasing correction amount ΔQdst calculated in step 523 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 524 is injected from the fuel injection valve 39.

On the other hand, in step 521 of FIG. 18, when it is determined that the relation of A/F≥A/Fst is established, that is, the air/fuel ratio of the air/fuel mixture is leaner than the theoretical air/fuel ratio and the routine proceeds to step 526, a difference between the air/fuel ratio of the air/fuel mixture and the theoretical air/fuel ratio (the air/fuel ratio) ΔA/F is calculated. Subsequently, in step 527, an amount which increases the standard fuel injection amount Qbst calculated in step 502 of FIG. 16 (increasing correction amount) ΔQist is calculated so that the air/fuel ratio of the air/fuel mixture become richer than the theoretical air/fuel ratio and the target amplitude TΔA/Fst set in step 520 is attained in consideration of the target amplitude TΔA/Fst set in step 520 and the air/fuel ratio difference ΔA/F calculated in step 526. Subsequently, in step 528, the standard fuel injection amount Qbst calculated in step 502 of FIG. 16 increases by the increasing correction amount ΔQist calculated in step 527 (Qbst+ΔQist), the increased standard fuel injection amount is input to the target fuel injection amount TQ, and the routine is ended.

Then, in this case, the operation of the fuel injection valve is controlled so that fuel of the target fuel injection amount TQ set in step 528 of FIG. 18 is injected from the fuel injection valve 39.

Next, another example of a flowchart which executes the control of the air/fuel ratio of the air/fuel mixture according to the third embodiment will be described. In this example, the flowcharts of FIGS. 19 to 22 and 5 are used. Furthermore, since the flowchart of FIG. 5 has been already described, the description thereof will not be repeated.

Figure 19:
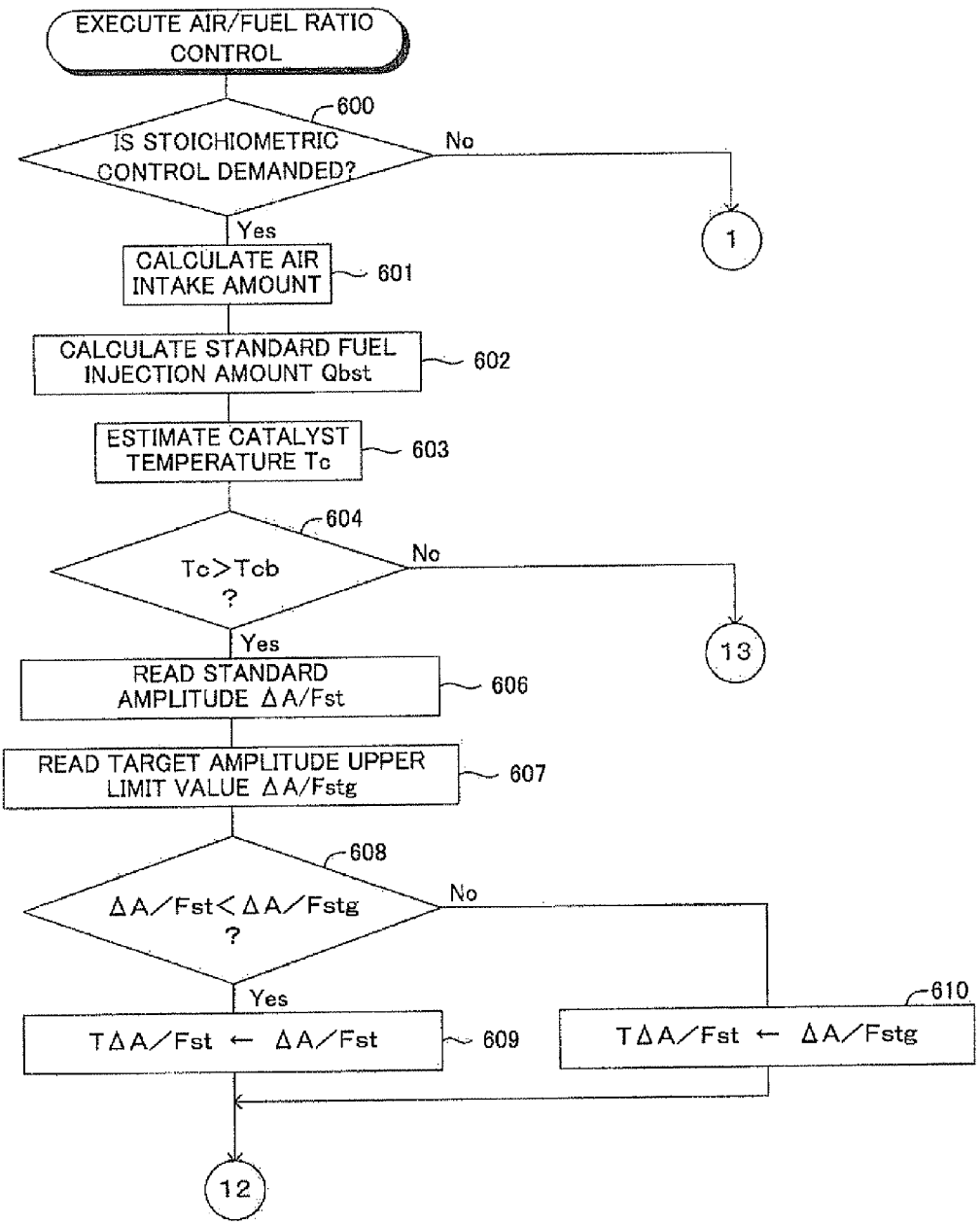
FIGS. 19 to 22 are diagrams partly illustrating another example of a flowchart which executes the air/fuel ratio control according to the third embodiment.

When the routine of FIG. 19 is started, first, in step 600, it is determined whether the execution of the stoichiometric control is demanded. Here, when it is determined that the execution of the stoichiometric control is demanded, the routine proceeds to step 601 and the steps thereafter. On the other hand, when it is determined that the execution of the stoichiometric control is not demanded, the routine proceeds to step 113 and the steps thereafter of FIG. 5 and the rich control is executed or the fuel cut control is executed.

In step 600 of FIG. 19, when it is determined that the execution of the stoichiometric control is demanded and the routine proceeds to step 601, the air intake amount is calculated by multiplying the amount of air detected by the air flow meter 61 by the air intake amount calculating coefficient. Subsequently, in step 602, the amount of fuel to be injected from the fuel injection valve 39 is calculated as the standard fuel injection amount Qbst so that the air/fuel ratio of the air/fuel mixture becomes the theoretical air/fuel ratio based on the air intake amount calculated in step 601. Subsequently, in step 603, the catalyst temperature (the temperature of the three-way catalyst 52) Tc is estimated. Subsequently, in step 604, it is determined whether the catalyst temperature Tc estimated in step 603 is higher than the predetermined temperature Tcb (Tc>Tcb). Here, when it is determined that the relation of Tc>Tcb is established, the routine proceeds to step 606 and the steps thereafter. On the other hand, when it is determined that the relation of Tc≤Tcb is established, the routine proceeds to step 623 of FIG. 21.

In step 604 of FIG. 19, when it is determined that the relation of Tc>Tcb is established and the routine proceeds to step 606, the standard amplitude ΔA/Fst in response to the air intake amount Ga calculated in step 601 is read out from the map of FIG. 10(A). Subsequently, in step 607, the target amplitude upper limit value ΔA/Fstg in response to the catalyst temperature Tc estimated in step 603 is read out from the map of FIG. 10(B). Subsequently, in step 608, it is determined whether the standard amplitude ΔA/Fst read out in step 606 is smaller than the target amplitude upper limit value ΔA/Fstg read out in step 607 (ΔA/Fst<ΔA/Fstg). Here, when it is determined that the relation of ΔA/Fst<ΔA/Fstg is established, the routine proceeds to step 609, the standard amplitude ΔA/Fst read out in step 606 is input to the target amplitude TΔA/Fst, and the routine proceeds to step 611 of FIG. 20. On the other hand, when it is determined that the relation of ΔA/Fst≥ΔA/Fstg is established, the routine proceeds to step 610, the target amplitude upper limit value ΔA/Fstg read out in step 607 is input to the target amplitude TΔA/Fst, and the routine proceeds to step 611 of FIG. 20.

Figure 20:
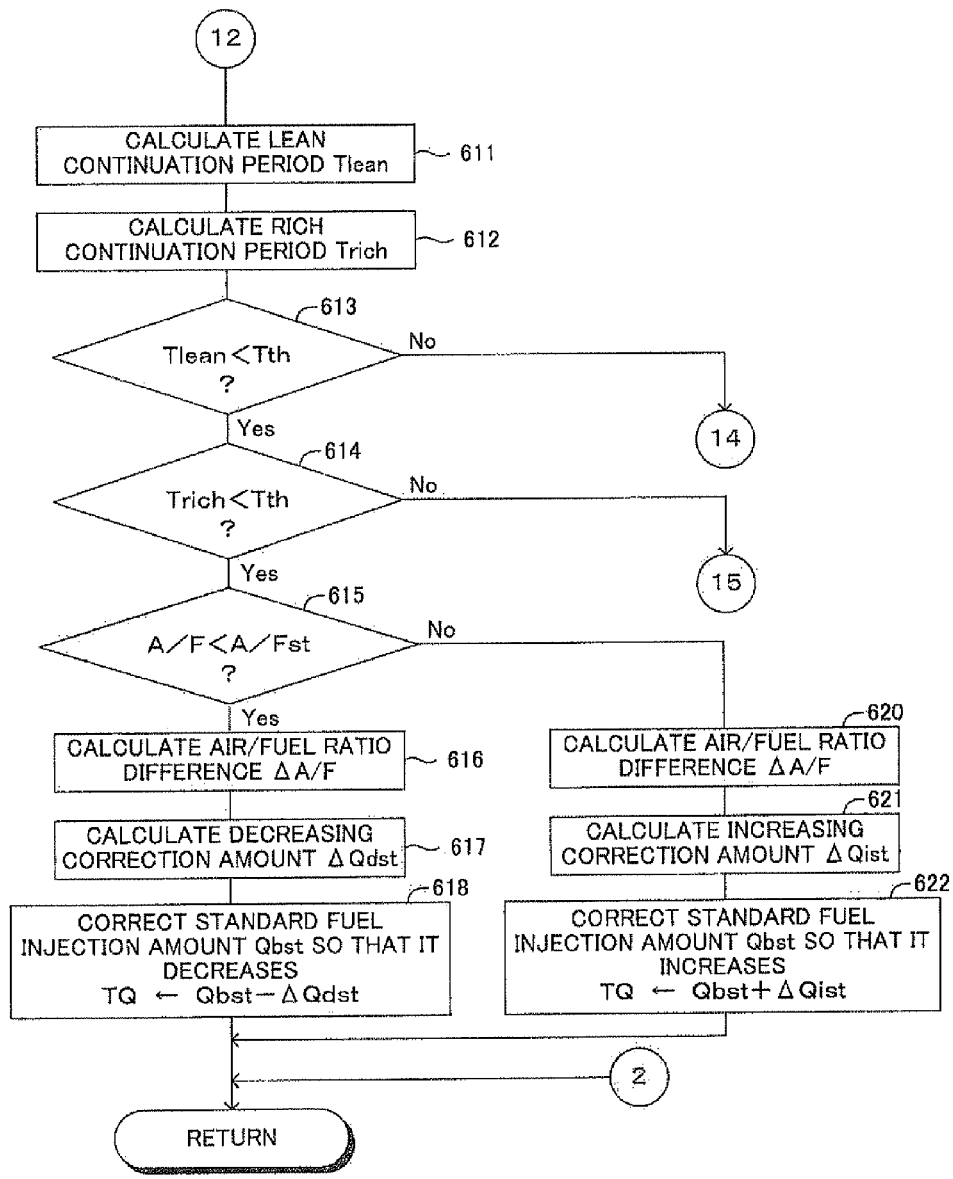

When step 609 or step 610 of FIG. 19 is executed and the routine proceeds to step 611 of FIG. 20, the period during which the downstream air/fuel ratio sensor 54 keeps detecting the air/fuel ratio leaner than the theoretical air/fuel ratio (the lean continuation period) Tlean is calculated. Subsequently, in step 612, the period during which the downstream air/fuel ratio sensor keeps detecting the air/fuel ratio richer than the theoretical air/fuel ratio (the rich continuation period) Trich is calculated. Subsequently, in step 613, it is determined whether the lean continuation period Tlean calculated in step 611 is shorter than the predetermined period Tth (Tlean<Tth). Here, when it is determined that the relation of Tlean<Tth is established, the routine proceeds to step 614. On the other hand, when it is determined that the relation of Tlean≥Tth is established, the routine proceeds to step 643 of FIG. 22.

In step 613 of FIG. 20, when it is determined that the relation of Tlean<Tth is established, that is, the lean continuation period is shorter than a predetermined period and the routine proceeds to step 614, it is determined whether the rich continuation period Trich calculated in step 612 is shorter than the predetermined period Tth (Trich<Tth). Here, when it is determined that the relation of Trich<Tth is established, the routine proceeds to step 615. On the other hand, when it is determined that the relation of Trich≥Tth is established, the routine proceeds to step 637 of FIG. 22.

When it is determined that the relation of Tlean<Tth is established in step 613 of FIG. 20, the relation of Trich<Tth is established in step 614 of FIG. 20, that is, the lean continuation period and the rich continuation period are shorter than a predetermined period, and the routine proceeds to step 615, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 616 and the steps thereafter, and a process which allows the air/fuel ratio of the air/fuel mixture to be leaner than the theoretical air/fuel ratio is executed. On the other hand, when it is determined that the relation of A/F≥A/Fst is established, that is, the air/fuel ratio of the air/fuel mixture is leaner than the theoretical air/fuel ratio, the routine proceeds to step 620 and the steps thereafter, and a process which allows the air/fuel ratio of the air/fuel mixture to be richer than the theoretical air/fuel ratio is executed.

In step 615 of FIG. 20, when it is determined that the relation of A/F<A/Fst is established, that is, the air/fuel ratio of the air/fuel mixture is richer than the theoretical air/fuel ratio and the routine proceeds to step 616, a difference between the air/fuel ratio of the air/fuel mixture and the theoretical air/fuel ratio (the air/fuel ratio difference) ΔA/F is calculated. Subsequently, in step 617, an amount which decreases the standard fuel injection amount Qbst calculated in step 602 of FIG. 19 (decreasing correction amount) ΔQdst is calculated so that the air/fuel ratio of the air/fuel mixture becomes leaner than the theoretical air/fuel ratio and the target amplitude TΔA/Fst set in step 609 or step 610 is attained in consideration of the target amplitude TΔA/Fst set in step 609 or step 610 of FIG. 19 and the air/fuel ratio difference ΔA/F calculated in step 616. Subsequently, in step 618, the standard fuel injection amount Qbst calculated in step 602 of FIG. 19 decreases by the decreasing correction amount ΔQdst calculated in step 617 (Qbst−ΔQdst), the decreased standard fuel injection amount is input to the target fuel injection amount TQ, and the routine is ended.

Then, in this case, the operation of the fuel injection valve is controlled so that fuel of the target fuel injection amount TQ set in step 618 of FIG. 20 is injected from the fuel injection valve 39. Accordingly, since only oxygen of an amount which does not cause thermal degradation in the three-way catalyst in response to the air intake amount and the catalyst temperature (the temperature of the three-way catalyst 52) flows into the three-way catalyst, thermal degradation in the three-way catalyst is suppressed.

On the other hand, in step 615 of FIG. 20, when it is determined that the relation of A/F≥A/Fst is established, that is, the air/fuel ratio of the air/fuel mixture is leaner than the theoretical air/fuel ratio and the routine proceeds to step 620, a difference between the air/fuel ratio of the air/fuel mixture and the theoretical air/fuel ratio (the air/fuel ratio difference) ΔA/F is calculated. Subsequently, in step 621, an amount which increases the standard fuel injection amount Qbst calculated in step 602 of FIG. 19 (increasing correction amount) ΔQist is calculated so that the air/fuel ratio of the air/fuel mixture becomes richer than the theoretical air/fuel ratio and the target amplitude TΔA/Fst set in step 609 or step 610 is attained in consideration of the target amplitude TΔA/Fst set in step 609 or step 610 and the air/fuel ratio difference ΔA/F calculated in step 620. Subsequently, in step 622, the standard fuel injection amount Qbst calculated in step 602 of FIG. 19 increases by the increasing correction amount ΔQist calculated in step 621 (Qbst+ΔQist), the increased standard fuel injection amount is input the target fuel injection amount TQ, and the routine is ended.

Then, in this case, the operation of the fuel injection valve is controlled so that fuel of the target fuel injection amount TQ set in step 622 of FIG. 20 is injected from the fuel injection valve 39. Accordingly, since only unburned fuel of an amount which does not cause thermal degradation in the three-way catalyst flows into the three-way catalyst in response to the air intake amount and the catalyst temperature (the temperature of the three-way catalyst 52), thermal degradation in the three-way catalyst is suppressed.

Figure 21:
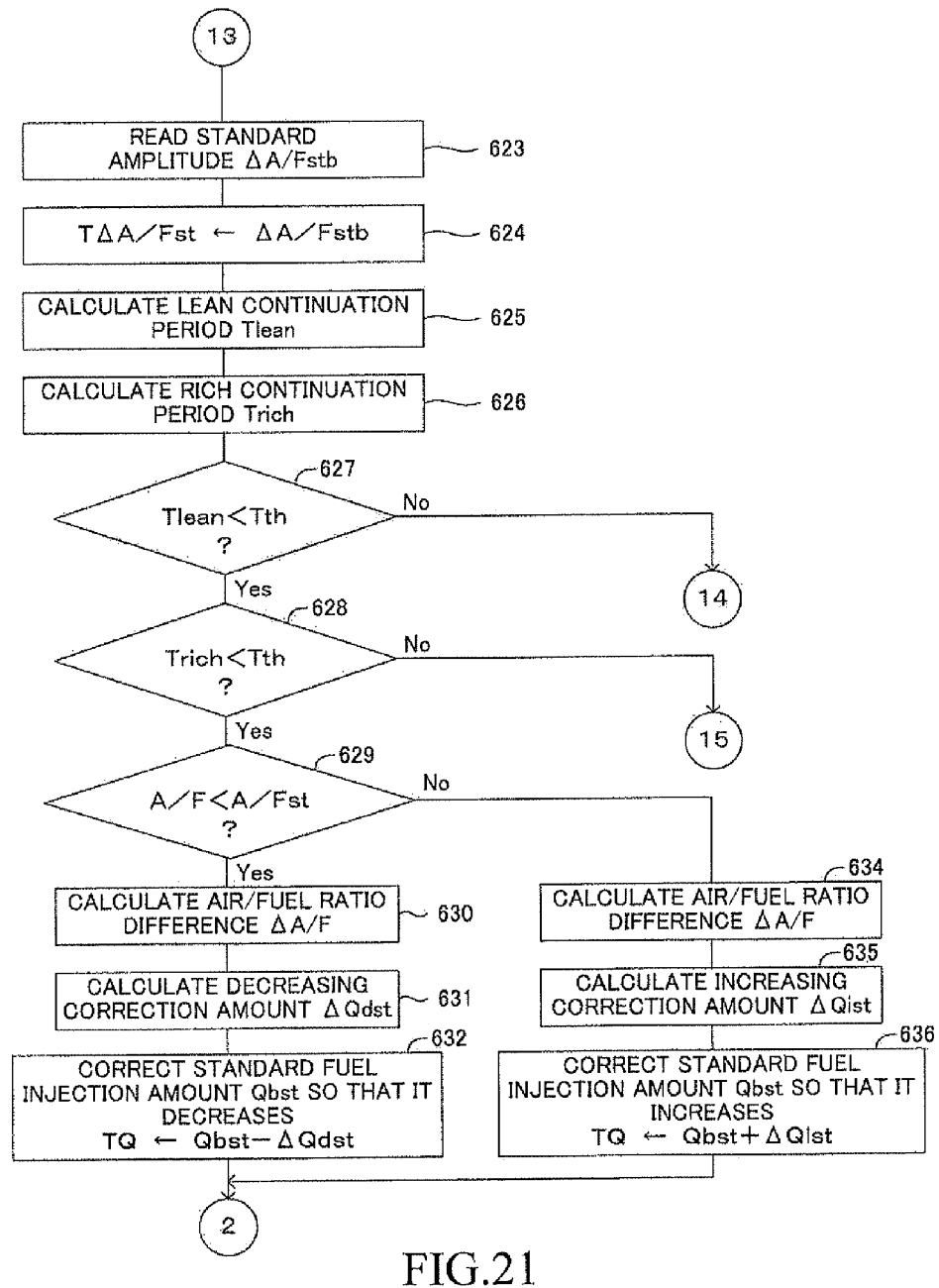

On the other hand, in step 604 of FIG. 19, when it is determined that the relation of Tc≤Tcb is established and the routine proceeds to step 623 of FIG. 21, the amplitude of the air/fuel ratio of the air/fuel mixture which is optimal in the stoichiometric control when the catalyst temperature Tc is lower than or equal to the predetermined temperature Tcb is read out as the standard amplitude ΔA/Fstb from the ECU 70. Here, with regard to the standard amplitude ΔA/Fstb, the amplitude of the air/fuel ratio of the air/fuel mixture which is optimal in the stoichiometric control when the catalyst temperature is lower than or equal to the predetermined temperature is obtained in advance by an experiment or the like, and the amplitude is stored as the standard amplitude in the ECU 70. In step 624 subsequent to step 623, the standard amplitude ΔA/Fstb read out in step 623 is input to the target amplitude TΔA/Fst. Subsequently, in step 625, the period during which the downstream air/fuel ratio sensor 54 keeps detecting the air/fuel ratio leaner than the theoretical air/fuel ratio (the lean continuation period) Tlean is calculated. Subsequently, in step 626, the period during which the downstream air/fuel ratio sensor keeps detecting the air/fuel ratio richer than the theoretical air/fuel ratio (the rich continuation period) Trich is calculated. Subsequently, in step 627, it is determined whether the lean continuation period Tlean calculated in step 625 is shorter than the predetermined period Tth (Tlean<Tth). Here, when it is determined that the relation of Tlean<Tth is established, the routine proceeds to step 628. On the other hand, when it is determined that the relation of Tlean≥Tth is established, the routine proceeds to step 643 of FIG. 22.

In step 627 of FIG. 21, when it is determined that the relation of Tlean<Tth is established, that is, the lean continuation period is shorter than a predetermined period and the routine proceeds to step 628, it is determined whether the rich continuation period Trich calculated in step 626 is shorter than the predetermined period Tth (Trich<Tth). Here, when it is determined that the relation of Trich<Tth is established, the routine proceeds to step 629. On the other hand, when it is determined that the relation of Trich≥Tth is established, the routine proceeds to step 637 of FIG. 22.

When it is determined that the relation of Tlean<Tth is established in step 627 of FIG. 21, the relation of Trich<Tth is established in step 628 of FIG. 21, that is, the lean continuation period and the rich continuation period are shorter than a predetermined period, and the routine proceeds to step 629, it is determined whether the detected air/fuel ratio (the air/fuel ratio detected by the upstream air/fuel ratio sensor 53), that is, the air/fuel ratio of the air/fuel mixture is smaller than the theoretical air/fuel ratio as the target air/fuel ratio (A/F<A/Fst), that is, the air/fuel ratio of the air/fuel mixture is richer than the theoretical air/fuel ratio. Here, when it is determined that the relation of A/F<A/Fst is established, the routine proceeds to step 630 and the steps thereafter, and a process which allows the air/fuel ratio of the air/fuel mixture to be leaner than the theoretical air/fuel ratio is executed. On the other hand, when it is determined that the relation of A/F<A/Fst is established, that is, the air/fuel ratio of the air/fuel mixture is leaner than the theoretical air/fuel ratio, the routine proceeds to step 634 and the steps thereafter, and a process which allows the air/fuel ratio of the air/fuel mixture to be richer than the theoretical air/fuel ratio is executed.

In step 629 of FIG. 21, when it is determined that the relation of A/F<A/Fst is established, that is, the air/fuel ratio of the air/fuel mixture is richer than the theoretical air/fuel ratio and the routine proceeds to step 630, a difference between the air/fuel ratio of the air/fuel mixture and the theoretical air/fuel ratio (the air/fuel ratio difference) $\Delta A/F$ is calculated. Subsequently, in step 631, an amount which decreases the standard fuel injection amount Qbst calculated in step 602 of FIG. 19 (decreasing correction amount) $\Delta Qdst$ is calculated so that the air/fuel ratio of the air/fuel mixture becomes leaner than the theoretical air/fuel ratio and the target amplitude $T\Delta A/Fst$ set in step 624 is attained in consideration of the target amplitude $T\Delta A/Fst$ set in step 624 and the air/fuel ratio difference $\Delta A/F$ calculated in step 630. Subsequently, in step 632, the standard fuel injection amount Qbst calculated in step 602 of FIG. 19 decreases by the decreasing correction amount $\Delta Qdst$ calculated in step 631 (Qbst−$\Delta Qdst$), the decreased standard fuel injection amount is input to the target fuel injection amount TQ, and the routine is ended.

Then, in this case, the operation of the fuel injection valve is controlled so that fuel of the target fuel injection amount TQ set in step 632 is injected from the fuel injection valve 39.

On the other hand, in step 629 of FIG. 21, when it is determined that the relation of A/F≥A/Fst is established, that is, the air/fuel ratio of the air/fuel mixture is leaner than the theoretical air/fuel ratio and the routine proceeds to step 634, a difference between the air/fuel ratio of the air/fuel mixture and the theoretical air/fuel ratio (the air/fuel ratio) $\Delta A/F$ is calculated. Subsequently, in step 635, an amount which increases the standard fuel injection amount Qbst calculated in step 602 of FIG. 19 (increasing correction amount) $\Delta Qist$ is calculated so that the air/fuel ratio of the air/fuel mixture becomes richer than the theoretical air/fuel ratio and the target amplitude $T\Delta A/Fst$ set in step 624 is attained in consideration of the target amplitude $T\Delta A/Fst$ set in step 624 and the air/fuel ratio difference $\Delta A/F$ calculated in step 634. Subsequently, in step 636, the standard fuel injection amount Qbst calculated in step 602 of FIG. 19 increases by the increasing correction amount $\Delta Qist$ calculated in step 635 (Qbst+$\Delta Qist$), the increased standard fuel injection amount is input to the target fuel injection amount TQ, and the routine is ended.

Then, in this case, the operation of the fuel injection valve is controlled so that fuel of the target fuel injection amount TQ set in step 636 of FIG. 21 is injected from the fuel injection valve 39.

Figure 22:
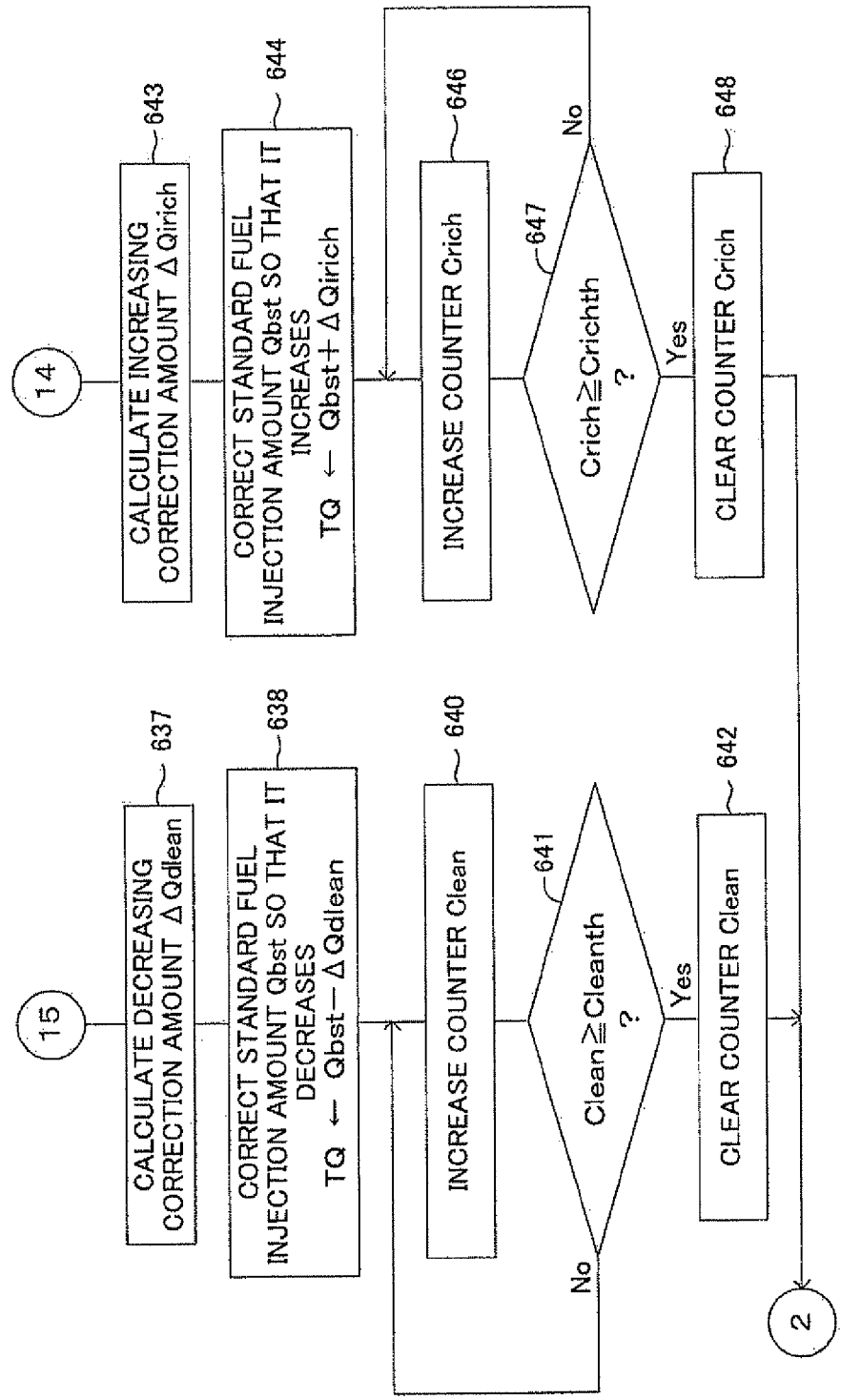

On the other hand, in step 613 of FIG. 20, when it is determined that the relation of Tlean≥Tth is established, that is, the lean continuation period is longer than or equal to a predetermined period and the routine proceeds to step 643 of FIG. 22, an amount which increases the standard fuel injection amount Qbst calculated in step 602 of FIG. 19 (increasing correction amount) $\Delta Qirich$ is calculated so that the air/fuel ratio of the air/fuel mixture becomes richer than the theoretical air/fuel ratio and the target amplitude $T\Delta A/Fst$ set in step 609 or step 610 of FIG. 19 is attained. Subsequently, in step 644, the standard fuel injection amount Qbst calculated in step 602 increases by the increasing correction amount $\Delta Qirich$ calculated in step 643 (Qbst+$\Delta Qirich$), and the increased standard fuel injection amount is input to the target fuel injection amount TQ. Subsequently, in step 646, the counter Crich which represents the period during which the air/fuel ratio of the air/fuel mixture is maintained so as to be richer than the theoretical air/fuel ratio increases. Subsequently, in step 647, it is determined whether the counter Crich which increases in step 646 is larger than or equal to the predetermined value Crichth (Crich≥Crichth). Here, when it is determined that the relation of Crich<Crichth is established, the routine returns to step 646, and the counter Crich further increases. On the other hand, when it is determined that the relation of Crich≥Crichth is established, the routine proceeds to step 648, the counter Crich is cleared, and the routine is ended.

That is, at this time, in step 647, the operation of the fuel injection valve is continuously controlled so that fuel of the target fuel injection amount TQ set in step 644 is injected from the fuel injection valve 39 until the counter Crich becomes larger than or equal to the predetermined value Crichth. Accordingly, oxygen which is larger than or equal to the necessary amount and is absorbed to the three-way catalyst 52 is discharged, the oxygen absorbing ability of the three-way catalyst is recovered, and only unburned fuel of an amount which does not cause thermal degradation in the three-way catalyst flows into the three-way catalyst in response to the catalyst temperature (the temperature of the three-way catalyst), thermal degradation in the three-way catalyst is suppressed.

On the other hand, in step 614 of FIG. 20, when it is determined that the relation of Trich≥Tth is established, that is, the rich continuation period is longer than or equal to a predetermined period and the routine proceeds to step 637 of FIG. 22, an amount which decreases the standard fuel injection amount Qbst calculated in step 602 of FIG. 19 (decreasing correction amount) $\Delta Qdlean$ is calculated so that the air/fuel ratio of the air/fuel mixture becomes leaner than the theoretical air/fuel ratio and the target amplitude $T\Delta A/Fst$ set in step 609 or step 610 of FIG. 19 is attained. Subsequently, in step 638, the standard fuel injection amount Qbst calculated in step 602 decreases by the decreasing correction amount $\Delta Qdlean$ calculated in step 637 (Qbst−$\Delta Qdlean$), and the decreased standard fuel injection amount is input to the target fuel injection amount TQ. Subsequently, in step 640, the counter Clean which represents the period during which the air/fuel ratio of the air/fuel mixture is maintained so as to be leaner than the theoretical air/fuel ratio increases. Subsequently, in step 641, it is determined whether the counter Clean which increases in step 640 becomes larger than or equal to the predetermined value Cleanth (Clean≥Cleanth). Here, when it is determined that the relation of Clean<Cleanth is established, the routine returns to step 640, and the counter Clean further increases. On the other hand, when it is determined that the relation of Clean≥Cleanth is established, the routine proceeds to step 642, the counter Clean is cleared, and the routine is ended.

That is, at this time, in step 641, the operation of the fuel injection valve is continuously controlled so that fuel of the target fuel injection amount TQ set in step 638 is injected from the fuel injection valve 39 until the counter Clean becomes larger than or equal to the predetermined value Cleanth. Accordingly, the three-way catalyst 52 absorbs a sufficient amount of oxygen, the oxygen discharging ability of the three-way catalyst is recovered, and only oxygen of an amount which does not cause thermal degradation in the three-way catalyst flows into the three-way catalyst in response to the catalyst temperature (the temperature of the three-way catalyst), thermal degradation in the three-way catalyst is suppressed.

On the other hand, in step 627 of FIG. 21, when it is determined that the relation of Tlean≥Tth is established, that is, the lean continuation period is longer than or equal to a predetermined period and the routine proceeds to step 643 of FIG. 22, an amount which increases the standard fuel injection amount Qbst calculated in step 602 of FIG. 19 (increasing correction amount) ΔQirich is calculated so that the air/fuel ratio of the air/fuel mixture becomes richer than the theoretical air/fuel ratio and the target amplitude TΔA/Fst set in step 624 of FIG. 21 is attained. Thereafter, as described above, step 644 to step 648 are executed.

Even at this time, in step 647, the operation of the fuel injection valve is continuously controlled so that fuel of the target fuel injection amount TQ set in step 644 is injected from the fuel injection valve 39 until the counter Crich becomes larger than or equal to the predetermined value Crichth. Accordingly, oxygen which is larger than or equal to the necessary amount and is absorbed to the three-way catalyst 52 is discharged, the oxygen absorbing ability of the three-way catalyst is recovered, and only unburned fuel of an amount which does not cause thermal degradation in the three-way catalyst flows into the three-way catalyst in response to the catalyst temperature (the temperature of the three-way catalyst), thermal degradation in the three-way catalyst is suppressed.

On the other hand, in step 628 of FIG. 21, when it is determined that the relation of Trich≥Tth is established, that is, the rich continuation period is longer than or equal to a predetermined period and the routine proceeds to step 637 of FIG. 22, an amount which decreases the standard fuel injection amount Qbst calculated in step 602 of FIG. 19 (decreasing correction amount) ΔQdlean is calculated so that the air/fuel ratio of the air/fuel mixture becomes leaner than the theoretical air/fuel ratio and the target amplitude TΔA/Fst set in step 624 of FIG. 21 is attained. Thereafter, as described above, step 638 to step 642 are executed.

Even at this time, in step 641, the operation of the fuel injection valve is continuously controlled so that fuel of the target fuel injection amount TQ set in step 638 is injected from the fuel injection valve 39 until the counter Clean becomes larger than or equal to the predetermined value Cleanth. Accordingly, the three-way catalyst 52 absorbs a sufficient amount of oxygen, the oxygen discharging ability of the three-way catalyst is recovered, and only oxygen of an amount which does not cause thermal degradation in the three-way catalyst flows into the three-way catalyst in response to the catalyst temperature (the temperature of the three-way catalyst), thermal degradation in the three-way catalyst is suppressed.

The invention claimed is:

1. An air/fuel ratio control device for an internal-combustion engine comprising:

a catalyst which has an oxidizing ability and is provided in an exhaust passage; and an electronic control unit configured to control an air/fuel ratio of an air/fuel mixture formed in a combustion chamber of the internal combustion engine such that (i) when the air/fuel ratio of the air/fuel mixture is richer than a target air/fuel ratio, the air/fuel ratio of the air/fuel mixture is controlled to become leaner than the target air/fuel ratio by a predetermined degree and leaner than a theoretical air/fuel ratio, and (ii) when the air/fuel ratio of the air/fuel mixture is leaner than the target air/fuel ratio. the air/fuel ratio of the air/fuel mixture is controlled to become richer than the target air/fuel ratio by the predetermined degree and richer than the theoretical air/fuel ratio, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the target air/fuel ratio, wherein the electronic control unit adopts, as the predetermined amplitude, an amplitude set according to (a) an air intake amount which is an amount of air suctioned to the combustion chamber or (b) a catalyst temperature which is a temperature of the catalyst, the amplitude set according to the air intake amount when the air intake amount is larger than a predetermined amount is smaller than the amplitude set according to the air intake amount when the air intake amount is smaller than the predetermined amount, the amplitude set according to the catalyst temperature when the catalyst temperature is higher than a predetermined temperature is smaller than the amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

2. An air/fuel ratio control device for an internal-combustion engine comprising:

a catalyst which has an oxidizing ability and is provided in an exhaust passage: and an electronic control unit configured to control an air/fuel ratio of an air/fuel mixture formed in a combustion chamber of internal combustion engine such that (i) when the air/fuel ratio of the air/fuel mixture is richer than a target air/fuel ratio, the air/fuel ratio of the air/fuel mixture is controlled to become leaner than the target air/fuel ratio by a predetermined degree and leaner than a theoretical air/fuel ratio, and (ii) when the air/fuel ratio of the air/fuel mixture is leaner than the target air/fuel ratio, the air/fuel ratio of the air/fuel mixture is controlled to become richer than the target air/fuel ratio by the predetermined degree and richer than the theoretical air/fuel ratio, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the target air/fuel ratio, wherein the electronic control unit adopts, as the predetermined amplitude, an amplitude set according to (a) an air intake amount which is an amount of air suctioned to the combustion chamber or (b) a catalyst temperature which is a temperature of the catalyst, when the catalyst temperature is higher than a predetermined temperature, the amplitude set according to the air intake amount when the air intake amount is larger than a predetermined amount is smaller than the amplitude set according to the air intake amount when the air intake amount is smaller than the predetermined amount, the amplitude set according to the catalyst temperature when the catalyst temperature is higher than the predetermined temperature is smaller than the amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

3. An air/fuel ratio control device for an internal-combustion engine comprising:

a catalyst which has an oxygen absorbing and discharging ability which enables oxygen in an exhaust gas to be absorbed to the catalyst when an air/fuel ratio of the exhaust gas flowing into the catalyst is leaner than a theoretical air/fuel ratio and oxygen absorbed to the catalyst to be discharged from the catalyst when the air/fuel ratio of the exhaust gas flowing into the catalyst is richer than the theoretical air/fuel ratio, the catalyst having an oxidizing ability and being provided in an exhaust passage; and an electronic control unit configured to control an air/fuel ratio of an air/fuel mixture formed in a combustion chamber of the internal combustion engine such that (i) the air/fuel ratio of the air/fuel mixture becomes leaner than the theoretical air/fuel ratio when the catalyst is in an oxygen discharged state where an amount of oxygen absorbed to the catalyst is smaller than a predetermined first oxygen amount and (ii) the air/fuel ratio of the air/fuel mixture becomes richer than the theoretical air/fuel ratio when the catalyst is in an oxygen absorbed state where the amount of oxygen absorbed to the catalyst is larger than a predetermined second oxygen amount, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the theoretical air/fuel ratio, wherein the electronic control unit adopts, as the predetermined amplitude, an amplitude set according to (a) an air intake amount which is an amount of air suctioned to the combustion chamber or (b) a catalyst temperature which is a temperature of the catalyst, the amplitude set according to the air intake amount when the air intake amount is larger than a predetermined amount is smaller than the amplitude set according to the air intake amount when the air intake amount is smaller than the predetermined amount, the amplitude set according to the catalyst temperature when the catalyst temperature is higher than a predetermined temperature is smaller than the amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

4. An air/fuel ratio control device for an internal-combustion engine comprising:

a catalyst which has an oxygen absorbing and discharging ability which enables oxygen in an exhaust gas to be absorbed to the catalyst when an air/fuel ratio of the exhaust gas flowing into the catalyst is leaner than a theoretical air/fuel ratio and oxygen absorbed to the catalyst is discharged from the catalyst when the air/fuel ratio of the exhaust gas flowing into the catalyst is richer than the theoretical air/fuel ratio, the catalyst having an oxidizing ability and being provided in an exhaust passage; and an electronic control unit configured to control an air/fuel ratio of an air/fuel mixture formed in a combustion chamber of the internal combustion engine such that (i) the air/fuel ratio of the air/fuel mixture becomes leaner than the theoretical air/fuel ratio when the catalyst is in an oxygen discharged state where an amount of oxygen absorbed to the catalyst is smaller than a predetermined first oxygen amount and (ii) the air/fuel ratio of the air/fuel mixture becomes richer than the theoretical air/fuel ratio when the catalyst is in an oxygen absorbed state where the amount of oxygen absorbed to the catalyst is larger than a predetermined second oxygen amount, thereby controlling the air/fuel ratio of the air/fuel mixture so that the air/fuel ratio leaner than the theoretical air/fuel ratio and the air/fuel ratio richer than the theoretical air/fuel ratio are alternated with a predetermined amplitude with respect to the theoretical air/fuel ratio, wherein the electronic control unit adopts, as the predetermined amplitude, an amplitude set according to (a) an air intake amount which is an amount of air suctioned to the combustion chamber or (b) a catalyst temperature which is a temperature of the catalyst, when the catalyst temperature is higher than a predetermined temperature, the amplitude set according to the air intake amount when the air intake amount is larger than a predetermined amount is smaller than the amplitude set according to the air intake amount when the air intake amount is smaller than the predetermined amount, the amplitude set according to the catalyst temperature when the catalyst temperature is higher than the predetermined temperature is smaller than the amplitude set according to the catalyst temperature when the catalyst temperature is lower than the predetermined temperature, the amplitude set according to the air intake amount is adopted as the predetermined amplitude when the amplitude set according to the air intake amount is smaller than the amplitude set according to the catalyst temperature, and the amplitude set according to the catalyst temperature is adopted as the predetermined amplitude when the amplitude set according to the air intake amount is larger than the amplitude set according to the catalyst temperature.

5. The air/fuel ratio control device for the internal-combustion engine according claim 1,
    wherein the amplitude set according to the air intake amount becomes smaller as the air intake amount becomes larger.

6. The air/fuel ratio control device for the internal-combustion engine according to claim 1,
    wherein the amplitude set according to the catalyst temperature becomes smaller as the catalyst temperature becomes higher.

7. The air/fuel ratio control device for the internal-combustion engine according to claim 1,
    wherein the catalyst is a three-way catalyst which simultaneously purifies nitrogen oxide, carbon monoxide, and hydrocarbon at a predetermined purification rate when the air/fuel ratio of the exhaust gas flowing into the catalyst is an air/fuel ratio near the theoretical air/fuel ratio, and
    wherein the three-way catalyst has an oxygen absorbing and discharging ability which enables oxygen in the exhaust gas to be absorbed to the catalyst when the air/fuel ratio of the exhaust gas flowing into the catalyst is leaner than the theoretical air/fuel ratio and oxygen absorbed to the catalyst to be discharged therefrom when the air/fuel ratio of the exhaust gas flowing into the catalyst is richer than the theoretical air/fuel ratio.

8. The air/fuel ratio control device for the internal-combustion engine according to claim 1,
    wherein the target air/fuel ratio is the theoretical air/fuel ratio.

* * * * *